United States Patent
Fong et al.

(10) Patent No.: US 6,279,015 B1
(45) Date of Patent: Aug. 21, 2001

(54) METHOD AND APPARATUS FOR PROVIDING A GRAPHICAL USER INTERFACE FOR CREATING AND EDITING A MAPPING OF A FIRST STRUCTURAL DESCRIPTION TO A SECOND STRUCTURAL DESCRIPTION

(75) Inventors: Avery Fong, Hayward; Tetsuro Motoyama, Cupertino; Anurag Bhatnagar, Sunnyvale, all of CA (US)

(73) Assignees: Ricoh Company, Ltd., Tokyo (JP); Ricoh Corporation, San Jose, CA (US)

( * ) Notice: Subject to any disclaimer, the term of this patent is extended or adjusted under 35 U.S.C. 154(b) by 0 days.

(21) Appl. No.: 08/997,705

(22) Filed: Dec. 23, 1997

(51) Int. Cl.$^7$ ..................................................... G06F 17/30
(52) U.S. Cl. ........................... 707/523; 707/513; 707/514
(58) Field of Search ..................................... 707/101, 102, 707/103, 513, 514, 523, 540; 345/326, 339, 356

(56) References Cited

U.S. PATENT DOCUMENTS 5,530,852    6/1996    Meske, Jr. et al. .................. 709/206

OTHER PUBLICATIONS

*SoftQuad:Products:Panorama Publishing Suite* (visited Oct. 23, 1997) <http://www.softquad.com/products/panorama/>.
*Computing Art Inc.* (Visited Jul. 23, 1997) <http://mindlink.net/c-art-w/>.
*Balise 3.0 Product Brief* (03/96) <http://www.balise.com/current/pbrief2.htm>.
*OmniMark LE Description* (visited Oct. 6, 1997) <http://www.omnimark.com/release/omle/31/omlesamp.htm>.
Robin Cover. *Public SGML Software* (last modified Sep. 23, 1997) <http://www.sil.org/sgml/publicSW.html>.
Robin Cover. *SGML: First Freeware SGML Viewer for the World Wide Web* (last modified Jul. 11, 1997) <http://www.sil.org/sgml/free-pan.html>.
*dtd2html* (visited Oct. 6, 1997) <http://www.oac.uci.edu/indiv/ehood/perlSGML/doc/html/dtd2html.html>.
*Grey Matter* (visited Nov. 26, 1997) <http://www.greymatter.co.uk/gmWEB/items/00000370.htm>.

(List continued on next page.)

*Primary Examiner*—Stephen S. Hong
(74) *Attorney, Agent, or Firm*—Oblon, Spivak, McClelland, Maier & Neustadt, P.C.

(57) ABSTRACT

A method, apparatus, and computer program product for providing a graphical user interface for creating and editing a mapping of structured information to different structured information, which allows a user to interactively define the mapping. The present invention operates as a user tool by accepting interactive input from a user of a source input, processing the input to display the source input in a format for accepting user commands to create or edit a transformation map of source components to target components. Interactive user input is accepted for selection of an input file to be transformed and selection of a transformation map for the requested transformation. Interactive user input is accepted for processing for selection of individual components of the first structured information format for mapping, and for selection of options for the target components. Exemplary options for the target components are a null value, the source component itself, a single selected target component, or plural selected target components. Interactive user input is accepted for processing to assign attribute values to components of the second structured information format. Exemplary options for the sources of attribute values are attribute values obtained from the source components, system attribute values, no value, attribute values input interactively by the user through the user interface, and content of element. Interactive user input is then accepted and processed to initiate processing of a transformation of the source input file in the first structured information format to a target output file in the second structured information format.

55 Claims, 38 Drawing Sheets

OTHER PUBLICATIONS

Multidoc Pro® Product Brief (visited Nov. 26, 1997) <http://gopher.sil.org/sgml/multidocPro.html>.

SoftQuad, Inc., SoftQuad HotMetal Pro 3.0 for Microsoft Windows, Second Edition (Jun. 1996), ISBN–1896172–40–7, Product No. SQGBO 04F6F 4C598.

```
22 ──┐<!--    sample1.dtd   >      -->
24 ──┐<!ELEMENT t - - (t1?, t2?, t3?, t4?)*>
26 ──┐<!ELEMENT t1 - - CDATA>
28 ──┐<!ATTLIST t1 name CDATA #REQUIRED>
30 ──┐<!ELEMENT t2 - - CDATA>
32 ──┐<!ELEMENT t3 - - CDATA>
34 ──┘<!ELEMENT t4 - - CDATA>
```

*FIG. 1A*

```
42 ── t--> <html><title>Title</title>
44 ── t1--><H3><A NAME="the source is t1's name">
46 ── t2--> <P>
48 ── t3--> <P>
50 ── t4--> <P><A HREF="# the source is t1's name">
```

*FIG. 1B*

```
60 ── <!DOCTYPE t system "sample1.dtd">
62 ── <t>
64 ── <t1 name="hilarry">1.  Hi Larry</t1>
66 ── <t2> This is the most fun I have ever had.</t2>
68 ── <t3> It must be great for you as well.</t3>
70 ── <t4> (Back to the Hi Larry greeting.)</t4>
72 ── </t>
```

*FIG. 1C*

```
80 ── <DOCTYPE HTML Public "-//W3C//DTD HTML 3.2 Final//EN">
82 ── <html>
84 ── <title>Title</title>
86 ── <H3><A name="hilarry">1.  Hi Larry</A></H3>
88 ── <P> This is the most fun I have ever had.</P>
90 ── <P> It must be great for you as well. </P>
92 ── <P><A HREF="hilarry"> (Back to the Hi Larry greeting.)</A></P>
94 ── </html>
```

| SrcSGMLTagAttr |
|---|
| stringBuffer AtrCurrentSGMLTagName<br>stringBuffer AtrCurrentAttribute<br>stringBuffer AtrCurrentHTMLAttributeSourceValue<br>stringBuffer AtrTagAttrKey<br>map<stringBuffer, list<SGMLTagAttr *>, stringBuffer> AtrKeyOfSGMLTagAndAttribute |
| void registerSGMLTagNameAndAttributeName(SGMLTagAttr *)<br>void unregisterTagAttrKeyAndMapEntry(SGMLTagAttr *)<br>void setValueForAttributeOfTag<br>    (stringBuffer & Tag, stringBuffer & Attribute, stringBuffer & value)<br>void reset(void) |

| SrcSGMLContent |
|---|
| stringBuffer AtrCurrentSGMLTagName<br>stringBuffer AtrCurrentHTMLAttributeSourceVal<br>map<stringBuffer, list<SGMLContent *>, stringBuffer> AtrTableWithSGMLTagKey |
| void registerSGMLTagName(SGMLContent *)<br>void unregisterSGMLTagName(SGMLContent *)<br>void setValueForTag(stringBuffer & Tag, stringBuffer & Value)<br>void reset(void) |

| MapService |
|---|
| Map * AtrCurrentMapPtr<br>MapCreateEditService * AtrMapCreateEditServicePtr<br>MessageDialogService & AtrMessageDialogServicesymblolTable & AtrHTMLSymbolTable<br>symbolTable * AtrSGMLSymbolTablePtr<br>Transformer * AtrTransformerPtr<br>ntEntity AtrCurrentSGMLDoc<br>ntEntity AtrCurrentSGMLDTD<br>SrcSGMLTagAttr * AtrSrcSGMLTagAttrPtr<br>SrcSGMLContent * AtrSrcSGMLContentPtr<br>DTDMapTransformerService * AtrDTDMapTransformerServicePtr<br>MapEdit * AtrMapEditPtr |
| MapService(MessageDialogService &, symbolTable & HTMLSymbolTable)<br>void MapServiceInit()<br>MapCreateEditService & getMapCreateEditServiceObject()<br>void close()<br>Map * getMapObject()<br>void doMapTransform<br>bool getHTMLObject (ntEntity &)<br>bool areThisMapAndTheSGMLDocConsistent(Map & theMap, ntEntity & SGMLNtEntity)<br>bool areThisMapAndTheDTDConsistent(Map & theMap,ntEntity & DTDNtEntity)<br>bool isMapSaved()<br>void setMapSaved()<br>void resetMap(void)<br>void SetMapObject(Map*)<br>void setMapPtr(Map*)<br>void setCurrentSGMLDoc(ntEntity &)<br>ntEntity & getCurrentSGMLDoc(void)<br>void setCurrentSGMLDTD(ntEntity &)<br>ntEntity & getCurrentSGMLDTD(void)<br>bool isEveryObjectReadyForMapEdit(void)<br>void setSGMLSymbolTablePtr(symbolTable*)<br>symbolTable * getSymbolTable(void)<br>symbolTable & getHTMLSymbolTable(void)<br>void createRelatedObjects(void)<br>void resetMapResetRelatedObjects(void)<br>void disconnectCurrentMap(void) |

| MapCreateEditService |
|---|
| Map * AtrCurrentMapPtr<br>MapService & AtrMapService<br>MessageDialogService & AtrMessageDialogService<br>symbolTable & AtrHTMLSymbolTable<br>symbolTable * AtrSGMLSymbolTablePtr<br>MapEdit & AtrMapEdit<br>DTDMapEdit * AtrDTDMapEditPtr |
| void editMap(void)<br>void CreateNewMap()<br>void useThisDTD(ntEntity &)<br>void useThisSGMLDoc(ntEntity &)<br>void useThisSymbolTable(symbolTable *)<br>symbolTable & getMapSymbolTable (void)<br>void useThisMap(Map *)<br>void selectedHTMLTag(stringbuffer &)<br>bool addSelectedHTMLTagToCurrentMappingList(void)<br>bool deleteSelectedHTMLTagFromCurrentMappingList(int listPosition)<br>void selectedSGMLTag(stringBuffer &)<br>void finishOneMapping()<br>void finishCreatingMap()<br>bool getNextSGMLTag(stringbuffer &)<br>bool getFirstExistingHTMLTagInMap(stringBuffer &)<br>bool getNextExistingHTMLTagInMap(stringBuffer &)<br>bool setSelectedSGMLTagToBeNullAssigned(void)<br>bool setSelectedSGMLTagToBeNotAssigned(void)<br>SGMLTagAssignmentType getSGMLTagAssignmentType(void)<br>void getAttributeAssignmentInformationForHTMLAttribute(const stringBuffer &<br>        HTMLAttributeName, HTMLAttributeSourceType & SourceType,<br>        stringBuffer & theFirstData, stringBuffer & theSecondData)<br>void assignHTMLAttributeWithSGMLAttribute(stringBuffer & HTMLAttributeName,<br>        stringBuffer & SGMLTag, stringBuffer & SGMLAttribute)<br>void assignHTMLAttributeWithSGMLContent(stringBuffer & HTMLAttributeName,<br>        stringBuffer & SGMLTag)<br>void assignHTMLAttributeWithSystem(stringBuffer & HTMLAttributeName)<br>void assignHTMLAttributeWithNoValue(stringBuffer & HTMLAttributeName)<br>void assignHTMLAttributeWithUserInput(stringBuffer & HTMLAttributeName,<br>        stringBuffer & theUserInput)<br>void assignDoneSelected(void) |

*FIG. 8C-4*

1400 — XYZ//font::metric::x-offset::622

*FIG. 20A*

1420 — ownername         -> ownername
1422 — ownerdescription  -> ownerdescription
1424 — objectname        -> objectname
1426 — objectdescription -> objectdescription
1428 — '::'              -> ' '
1430 — '//'              -> '_'

*FIG. 20B*

1440 — XYZ_font_metric_x-offset_622

*FIG. 20C*

METHOD AND APPARATUS FOR PROVIDING A GRAPHICAL USER INTERFACE FOR CREATING AND EDITING A MAPPING OF A FIRST STRUCTURAL DESCRIPTION TO A SECOND STRUCTURAL DESCRIPTION

CROSS-REFERENCES TO RELATED APPLICATIONS

This application is related to and being concurrently filed with two other patent applications: U.S. patent application Ser. No. 08/997,707, now U.S. Pat. No. 6,009,436 entitled "Method and Apparatus For Mapping Structured Information to Different Structured Information" and U.S. patent application Ser. No. 08/997,482, entitled "Object-Oriented System and Computer Program Product For Mapping Structured Information to Different Structured Information", each filed on Dec. 23, 1997, and incorporated herein by reference.

BACKGROUND OF THE INVENTION

1. Field of the Invention

This invention relates generally to providing a user interface for mapping structured information to different structured information. The present invention relates more specifically to providing a user interface for processing a document encoded in a markup language format, a database information format, an ISO/IEC 9070 naming scheme, a UNIX file name scheme, or a DOS file name scheme, transforming it into another markup language format, another database information format, an ISO/IEC 9070 naming scheme, a UNIX file name scheme, or a DOS file name scheme. The invention is more specifically related to a method and apparatus for providing a user interface for mapping in which a user interactively defines the mapping for the transformation.

2. Discussion of the Background

Standard Generalized Markup Language ("SGML") is an information management standard adopted by the International Organization for Standardization ("ISO"), as ISO 8879:1986, as a means for providing platform-independent and application-independent documents that retain content, indexing, and linked information. SGML provides a grammarlike mechanism for users to define the structure of their documents and the tags they will use to denote the structure in individual documents. A complete description of SGML is provided in Goldfarb, C. F., *The SGML Handbook*, Oxford University Press, Oxford, 1990, and McGrath, S., Parseme.1st: *SGML for Software Developers*, Prentice Hall PTR, New Jersey, 1998, which are incorporated herein by reference.

HyperText Markup Language ("HTML") is an application of SGML that uses tags to mark elements, such as text or graphics, in a document to indicate how Web browsers should display these elements to the user and should respond to user actions such as activation of a link by means of a key press or mouse click. HTML is used for documents on the World Wide Web. HTML 2.0, defined by the Internet Engineering Task Force ("IETF"), includes features of HTML common to all Web browsers as of 1995, and was the first version of HTML widely used on the World Wide Web. Future HTML development will be carried out by the World Wide Web Consortium ("W3C"). HTML 3.2, the latest proposed standard, incorporates features widely implemented as of early 1996. A description of SGML and HTML features is given in Bradley, N., *The Concise <SGAL> Companion*, Addison Wesley Longman, New York, 1997, which is incorporated herein by reference.

A Graphical User Interface ("GUI") is an environment that represents programs, files, and options by means of icons, menus, and dialog boxes on a screen. An icon is an image, displayed on a screen or other output device, that can be manipulated by a user. By serving as a visual pictorial representation of a function that is available, an icon generates a user-friendly interface by freeing the user of the burden of having to remember commands or type them on a keyboard. A menu is a list of options from which the user can make a selection to perform a desired action. A dialog box is a special window, or area, displayed on a screen or other output device, to solicit a response from the user. In a GUI, the user can select and activate options by pointing and clicking with a mouse or by keystrokes on the keyboard. The preceding descriptions were derived from definitions given in the *Computer Dictionary, Third Edition*, Microsoft Press, Washington, 1997.

ISO and International Electrotechnical Commission ("IEC") form a specialized system for worldwide standardization. ISO/IEC 9070:1991(E) is an international standard which is applied to an assignment of unique owner prefixes to owners of public text conforming to ISO 8879. The standard describes the procedures for making an assignment and the method for constructing registered owner names from them. Procedures for self-assignment of owner prefixes by standards bodies and other organizations are also specified. ISO/IEC 9070:1991(E) is incorporated herein by reference.

UNIX and DOS are well-known operating systems for computers. Both UNIX and DOS support a file naming scheme which involve a path from a root directory, through descendant directories, to leaf nodes which are non-directory file names.

Processing systems are known in which a data processor converts a document encoded in a markup language automatically to another format. For example, Balise software from Computing Art, Inc. processes documents encoded in SGML to convert them to a formatted output for user viewing. However, this software does not allow the user to interactively define the mapping of SGML tags to another format.

SUMMARY OF THE INVENTION

Accordingly, one object of this invention is to provide a novel method, apparatus, and computer program product which provides a graphical user interface for processing information encoded in a structured information format to transform the information into another structured information format, and which allows a user to interactively define the mapping for the transformation. Exemplary structured information formats include markup language formats, database information formats, an ISO/IEC 9070 naming scheme, a UNIX file name scheme, and a DOS file name scheme.

It is a further object of this invention to provide a novel method, apparatus, and computer program product which provides a graphical user interface for defining conversion of Standard Generalized Markup Language ("SGML") documents into HyperText Markup Language ("HTML") documents, which allows a user to interactively define the mapping for the transformation.

It is a further object of this invention to provide a novel method, apparatus, and computer program product which provides a graphical user interface for defining conversion of information in a database format into information in a different database format, which allows a user to interactively define the mapping for the transformation.

It is a further object of this invention to provide a novel method, apparatus, and computer program product which provides a graphical user interface for defining conversion of information from an ISO/IEC 9070 naming scheme into a UNIX file name scheme, which allows a user to interactively define the mapping for the transformation.

It is a further object of this invention to provide a novel method, apparatus, and computer program product which provides a graphical user interface for defining conversion of information from an ISO/IEC 9070 naming scheme into a DOS file name scheme, which allows a user to interactively define the mapping for the transformation.

These and other objects are accomplished by a method, apparatus, and computer program product which provides a graphical user interface for processing information encoded in a structured information format, such as a markup language format, or such as a database information format, to transform the information into another structured information format, such as a markup language format, or such as another database information format, which allows a user to interactively define the mapping for the transformation.

An exemplary transformation for the present invention is conversion of SGML documents into HTML documents. For explanation of this example, the present invention has been developed as a tool to allow a user to define the transformation of an SGML document into an HTML document or other structured format, for example, a database information format. The user tool for this example is currently implemented in the format of a Graphical User Interface ("GUI") using Object Oriented Programming ("OOP") technology.

For this example, the current invention is designed to provide a user with a graphic tool to transform documents written in a cryptic SGML format into another structured format for greater viewing ease and for greater portability of documents and information. The user interface provides the user with selectable options of performing a default or conditional mapping. The user interface provides the user with selectable options of selecting an input SGML Document Type Definition ("DTD") or a currently existing map. The user interface displays the input for the user to select individual source components of the input. The user interface provides the user with selectable options for transformation of the individual source components such as a mapping of a source component to a target null value, a mapping of a source component to itself, a mapping of a source component to a single target component, or a mapping of a single source component to plural target components. If the user selects a conditional mapping, then special cases, such as a history of an element being referenced previously, are checked and processed using further interactive input from the user using the user interface.

The user interface also provides selectable options to the user for assigning attribute values for the target components. Exemplary options are attribute values obtained from the source components, system attribute values, no value, and attribute values input interactively by the user using the user interface.

The user interface allows the user to interactively select options for transformation, and options for assigning attribute values for the target components, and the selected options are processed to create a transformation rule for the source component.

The invention accepts interactive user input, to be processed by a map creator, for making plural changes to any of the component mapping values the user desires until the user inputs a command to cease the interactive input and create a transformation map. The transformation rules are processed by a map creator to create the transformation map.

The invention accepts user input for selecting an input source file for transformation to a target output file using an already existing map specified interactively by the user. The user input is then processed, and the requested input file and map are then processed to transform the input file into the requested output file format. The created output file is then sent to the user specified destination.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8C(1) illustrates a map class structure for a source SGML tag attribute class of the SGML to HTML mapping and transformation;

FIG. 8C(2) illustrates a map class structure for a source SGML content class of the SGML to HTML mapping and transformation;

FIG. 8C(3) illustrates a map class structure for a map service class of the SGML to HTML mapping and transformation;

FIG. 8C(4) illustrates a map class structure for a map create and edit service class of the SGML to HTML mapping and transformation;

FIG. 20A illustrates an exemplary public identifier in ISO/IEC 9070 format;

FIG. 20B illustrates an exemplary mapping of ISO/IEC 9070 to a UNIX file name format;

FIG. 20C illustrates an exemplary UNIX file name resulting from mapping the public identifier of FIG. 20A using the map of FIG. 20B;

BRIEF DESCRIPTION OF THE APPENDICES

Figure 3A:
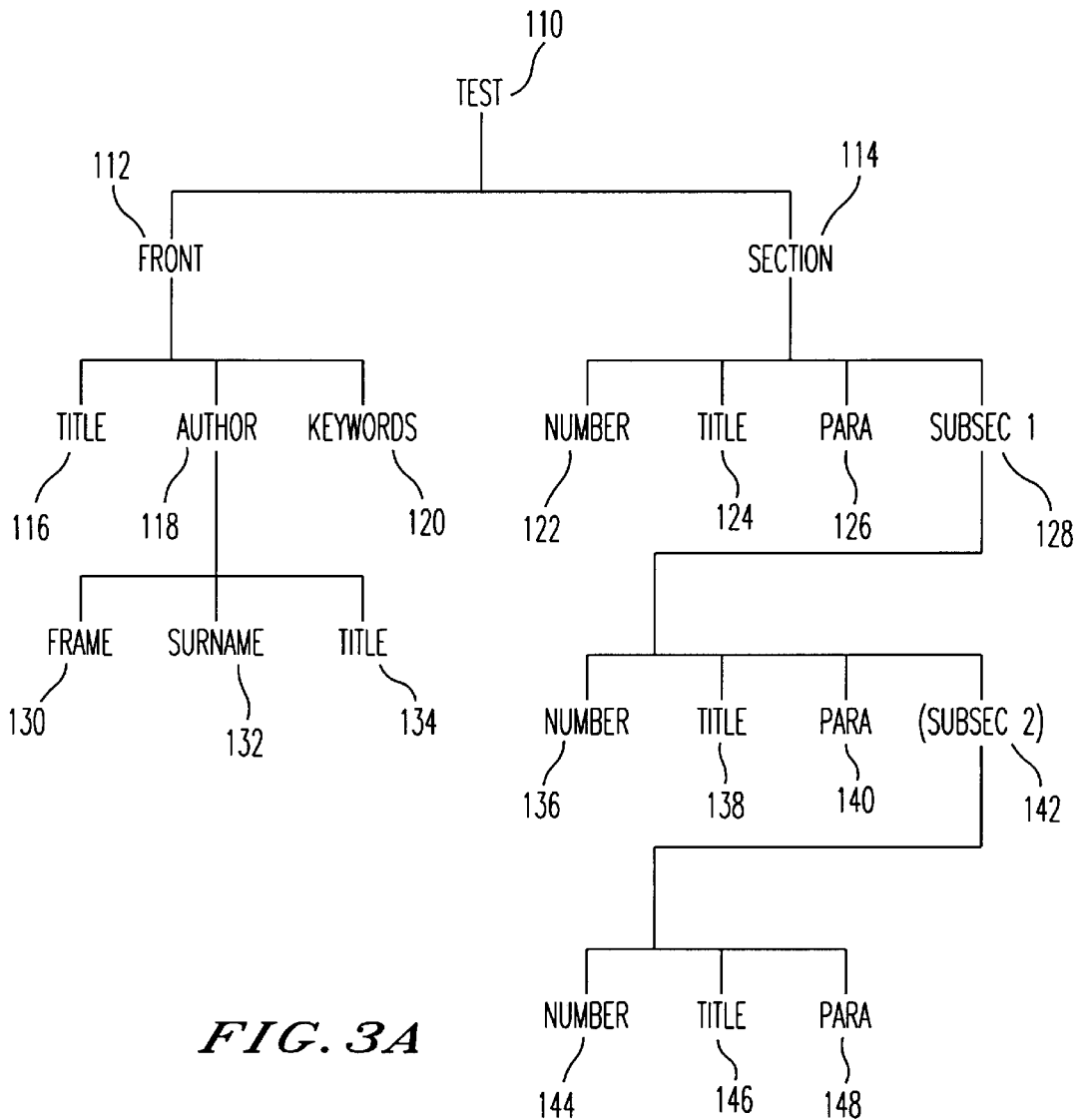
FIG. 3A illustrates, in tree format, the hierarchical nature of an SGML document
Figure 3B:
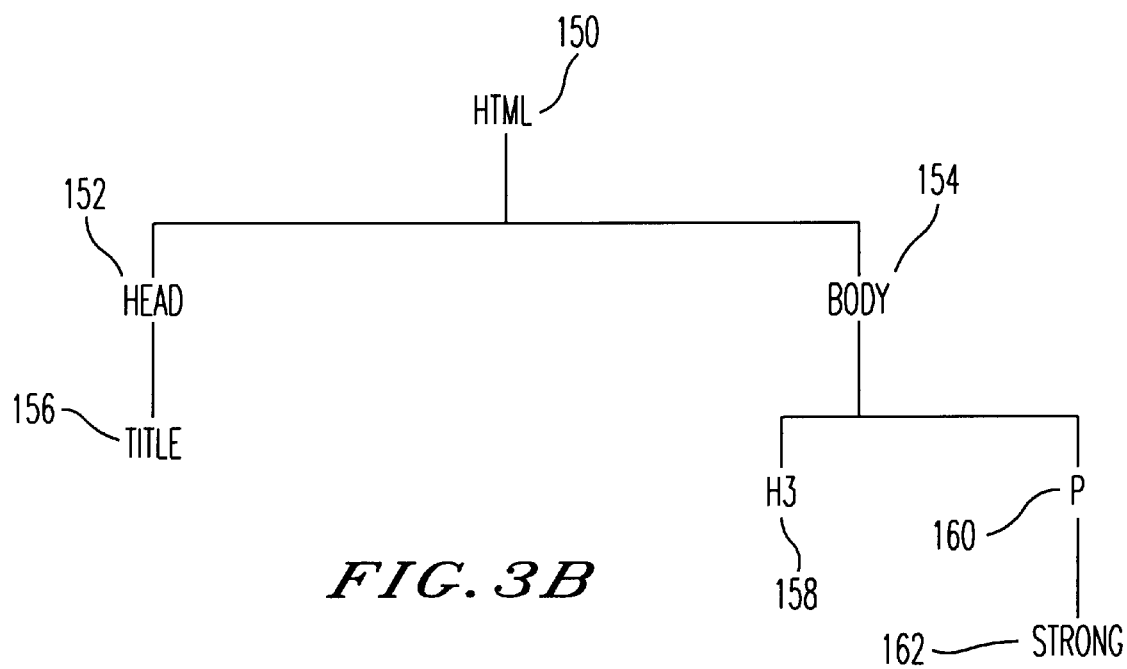
FIG. 3B illustrates the more "flat" structure of an HTML document.

Appendix A is an exemplary Standard Generalized Markup Language ("SGML") Document Type Definition ("DTD") corresponding to the tree structure of FIG. 3A;

Appendix B is an exemplary map of SGML elements from the SGML DTD of Appendix A to HTML elements to produce documents which correspond to the tree structure of FIG. 3B;

Appendix C is an exemplary SGML document which conforms to the SGML DTD of Appendix A;

Appendix D is an HTML document which is generated by using the map of Appendix B to transform the SGML document of Appendix C into HTML elements.

DESCRIPTION OF THE PREFERRED EMBODIMENTS

Referring now to the drawings, wherein like reference numerals designate identical or corresponding parts throughout the several views, and more particularly to FIG. 1A thereof, there is illustrated an exemplary Standard Generalized Markup Language ("SGML") Document Type Definition ("DTD"). FIGS. 1A–1D are presented to illustrate sample inputs and outputs of the SGML to HTML mapping and transformation. The functions performed during the transformation which generate the outputs are described in detail below, and with respect to FIGS. 4–6B and the object message diagrams of FIGS. 18A(1)–18C(3).

FIGS. 1A–1D and Appendices A–D show exemplary SGML DTDs, SGML documents, maps, and HTML documents produced from transforming the SGML documents using the maps. FIGS. 3A–3B show exemplary tree structures for the SGML DTD of Appendix A and the HTML structure resulting from transforming the SGML DTD using the map of Appendix B. FIGS. 1A–1D, Appendices A–D, and FIGS. 3A–3B illustrate mapping SGML DTDs to HTML DTDs. The problem of DTD to DTD mapping is the default mapping from an SGML instance to an HTML instance based upon the DTDs. SGML tags are either mapped to zero or more HTML tags, and the sources of HTML attributes must be specified in the mapping. A more concise mathematical expression of the problem is given below.

Let SS be the space generated by the SGML DTD where $SS=\{S_i \mid i=0, \ldots ,m\}$, $S_i=<$Tag Name$_i$, Attribute Set$_i>$, and Attribute Set$_i=\{$Attribute$_j$ of Tag Name$_i \mid j=0, \ldots ,n_i\}+\phi$. Similarly, let HH be the space generated by the HTML DTD specified by W3C (World Wide Web Consortium), that is, $HH=\{H_i \mid i=0, \ldots ,k\}$ where $H_i$ corresponds to $S_i$ above. Further, let HG be the space generated by HH consisting of the set of ordered members of HH. Then, $HG=\{$null, $<H_0>$, $<H_1>, \ldots, <H_0, H_1>, <H_0, H_2>, \ldots, <H_1, H_0>, \ldots \}$. The sequence of legal HTML tags to be mapped are likely to be found in HG. Then the SGML tag to HTML tag mapping is equivalent to the function $F:SS \to HG+\{$not-assigned$\}$.

For purposes of this discussion, { } denotes a set, < . . . > denotes an ordered set, and + denotes union.

Let HGG be a set generated from SS, F(SS), and HH. HGG consists of the ordered set of triplets or null. A triplet consists of $S_i$, $F(S_i)$ and <HTMLTagName, an Attribute> where HTMLTagName belongs to one of $H_j$ in $F(S_i)$. Assume $H_0$ has Attr$_0$ and Attr$_1$, $H_6$ has Attr$_0$, and $S_0$ and $S_1$ are mapped to $<H_0>$ and $<H_3, H_6>$, respectively. Then $HGG=\{$null, $<S_0, <H_0>, <H_0$Tag Name, Attr$_0>>,<S_0, <H_0>,<H_0$Tag Name, Attr$_1>>, \ldots ,<S_1, <H_3, H_6>, <H_6$ Tag Name, Attr$_0>>, \ldots \}$. Also, let SAtr be the source of the HTML Attribute value. Then Satr=AS+AC+{user inputs}+Null, where AS=the set of ordered pairs of tag name and one attribute name, and AC=the set of tag names with character data content. Then the identification of the attribute source is a function G mapping from HGG to Satr, denoted G: HGG→SAtr.

A complete description of SGML is provided in Goldfarb, C. F., *The SGML Handbook*, Oxford University Press, Oxford, 1990, and McGrath, S., Parseme.1st: *SGML for*

*Software Developers*, Prentice Hall PTR, New Jersey, 1998, which are incorporated herein by reference.

The exemplary SGML document of FIG. 1C, together with the exemplary SGML DTD of FIG. 1A, and the exemplary mapping of FIG. 1B are utilized in a transformation process to generate the HTML document of FIG. 1D. The SGML DTD of FIG. 1A and the SGML document of FIG. 1C are together parsed to produce the structural components of the SGML document of FIG. 1C. These components are then utilized in conjunction with the map of FIG. 1B to transform the SGML document of FIG. 1C into the HTML document of FIG. 1D. Further details of the parsing and transformation are explained below, and with respect to FIGS. 4–6B and FIGS. 18A(1)–18C(3).

In FIG. 1A, line 22 is a comment line containing the name of the SGML DTD file. Line 24 is a declaration of an element t containing a model group including elements t1, t2, t3, and t4. The '?' of line 24 indicates that an element is optional. The '*' of line 24 indicates that the model group may occur any number of times in a valid element t, and may also be absent. For this example, the SGML document of FIG. 1C illustrates a valid element t containing elements t1, t2, t3, and t4 in a group in lines 64–70.

Line 26 of FIG. 1A is a declaration of an element t1 having content type CDATA. The type CDATA means that the element may have a value that consists of general characters. For this example, the SGML document of FIG. 1C includes an element t1 on line 64 having as content the string of general characters '1. Hi Larry'. Usually, content of an element is delimited by a start tag for the element before the content, and an end tag for the element after the content. A start tag typically includes the character '<' followed by the name of the element, followed by optional element information such as attribute information, followed by '>'. An end tag then includes the characters '</' followed by the name of the element, followed by '>'. In SGML, the delimiters '<' and '>' can, by definition, be replaced by other characters.

Line 28 of FIG. 1A is a declaration for an attribute list for the element t1. An attribute is a property of an element that takes on different values for different instances of elements. For example, an element 'person', typically has an attribute list of attributes 'name', 'age', and 'haircolor'. A particular first person has name="Joe Smith", age="27", and haircolor="brown", while a second person has name="Sally Jones", age="45", and haircolor="red". If the second person desires, her haircolor attribute is easily changed to haircolor="blond" by an assignment of a different value. For the example of FIG. 1A, on line 28, the attribute list includes an attribute 'name', of type CDATA. The character string '#REQUIRED' is an attribute value indicating that the attribute must be specified. For this example, in the SGML document of FIG. 1C the element t1 on line 64 has a general character content value of "hilarry" assigned to the name attribute of this element t1.

Line 30 of FIG. 1A is a declaration for an element t2, of type CDATA. Line 32 is a declaration of an element t3, of type CDATA. Line 34 is a declaration of an element t4, of type CDATA.

In the SGML to HTML mapping of FIG. 1B, line 42 illustrates a mapping rule of the element t of line 24 to a string of HTML tags and text including '<html><title>Title</title>'. Line 44 illustrates a mapping rule of the element t1 of line 26 to a string of HTML tags '<H3><A NAME="the source is t1's name">'. The sentence between the double quotes of line 44 is a rule rather than an attribute value. Line 46 illustrates a mapping rule of the element t2 of line 30 to an HTML tag '<P>'. Line 48 illustrates a mapping rule of the element t3 of line 32 to an HTML tag '<P>'. Line 50 illustrates a mapping rule of the element t4 of line 34 to a string of HTML tags '<P><A HREF="# the source is t1's name">'. The sentence between the double quotes of line 50 is a rule rather than an attribute value.

Referring to the exemplary SGML document of FIG. 1C, line 60 shows the document type of the SGML document to be 't', with the DTD corresponding to the SGML document found in the system file "sample1.dtd". Line 62 contains the document start tag '<t>', which indicates that the lines following line 62 are assumed to follow the format defined in the DTD of FIG. 1A for the element t of line 24. Lines 64, 66, 68, and 70 are exemplary constituent parts of the element t shown on line 24 of FIG. 1A, defined for the exemplary SGML document of FIG. 1C. Line 72 contains the document end tag '</t>', signifying the end of the document.

The HTML document of FIG. 1D is the output of the transformation process utilizing the SGML DTD file of FIG. 1A, the mapping of FIG. 1B, and the SGML document of FIG. 1C. Lines 82, 84, 86, 88, 90, 92, and 94 of FIG. 1D are generated from the information contained in each of FIGS. 1A–1C.

The processing of the exemplary input files illustrated in FIGS. 1A–1C to produce the output document illustrated in FIG. 1D will now be described. First, the SGML document line 60 of FIG. 1C is analyzed to determine the document type of the input SGML document and the name of the system file where the SGML documents DTD is stored. This causes the transformer to output the DOCTYPE HTML tag illustrated in line 80 of FIG. 1D, and to open the referenced system file for accessing the DTD for the current SGML document. A check is performed to determine that the DTD does correspond with the current SGML document. Next, the SGML tag of line 62 is parsed so that the current SGML tag becomes '<t>'. The map of FIG. 1B is referenced to determine that the current SGML tag is the start tag for the current SGML document, and maps to the HTML tag string '<html><title>Title</title>'. An HTML tag '<html>' is saved for the current SGML tag '<t>' and is output to line 82 of FIG. 1D. The HTML tag substring '<title>Title</title>' is output to line 84 of FIG. 1D.

The first SGML tag in the string of line 64 of FIG. 1C is now obtained. The current SGML tag becomes '<t1>'. The transformer obtains the current attribute name and attribute value for the current SGML tag, obtaining an attribute called 'name' with a value "hilarry". The DTD of FIG. 1A is examined to determine that the SGML tag corresponds to the SGML element defined in line 26 of FIG. 1A, with its corresponding attribute list established in line 28 of FIG. 1A. The map of FIG. 1B is analyzed to determine that the current SGML tag's rule is line 44. The mapped HTML string '<H3><A NAME=' followed by the current value of the name attribute for the SGML element t1, which is currently "hilarry", is then output to the HTML document on line 86 of FIG. 1D. An '>' is then output to terminate the tag. The HTML tags '<H3>' and '<A>' are saved for the current SGML tag. Next, the parser recognizes text that will be output to the HTML file on line 86 of FIG. 1D. The parser then recognizes the SGML end tag '</t1>', at which point end tags for all the HTML tags currently saved for '<t1>' are output to the HTML document on line 86 of FIG. 1D in reverse order from which the tags were saved.

Next, the parser recognizes SGML tag '<t2>' from line 66 of FIG. 1C. The transformer utilizes the map rule line 46 of FIG. 1B to output HTML tag '<P>', shown on line 88 of FIG. 1D, and to save the HTML tag for the current SGML tag '<t2>'. The parser then recognizes text which is output to the HTML file as shown on line 88 of FIG. 1D. The parser now recognizes SGML end tag '</t2>' as terminating the text, at which point an end tag '</P>' for the HTML tag currently saved for '<t2>' is output to the HTML document on line 88 of FIG. 1D.

The parser now recognizes SGML tag '<t3>' from line 68 of FIG. 1C. The transformer utilizes the map rule of line 48 of FIG. 1B to output HTML tag '<P>', shown on line 90 of FIG. 1D, and to save the HTML tag for the current SGML tag '<t3>'. The parser now recognizes text which is output to the HTML file, as shown on line 90 of FIG. 1D. Next, the parser recognizes SGML end tag '</t3>' as terminating the text, at which point the end tag '</P>' for the HTML tag currently saved for SGML tag '<t3>' is output to the HTML document on line 90 of FIG. 1D.

Next, the first SGML tag in the string of line 70 of FIG. 1C is obtained. The current SGML tag is now '<t4>'. The transformer obtains the current attribute name and attribute value for an SGML tag, obtaining an attribute called 'name' with a value "hilarry". The map of FIG. 1B is analyzed to determine that the current SGML tag's rule is line 50. The mapped HTML string '<P><A HREF="#' followed by the current value of the name attribute, which is currently "hilarry", is then output to the HTML document on line 92 of FIG. 1D. An '">' is then output to terminate the tag. The HTML tags '<P>' and '<A>' are saved for the current SGML tag '<t4>'. Next, the parser recognizes text that will be output to the HTML file on line 92 of FIG. 1D. The parser now recognizes the SGML end tag '</t4>', terminating the text, at which point end tags for all the HTML tags currently saved for '<t4>' are output to the HTML document on line 92 of FIG. 1D in reverse order from which the tags were saved for '<t4>'.

Next, the parser recognizes the end of the SGML document by recognizing a '</t>' tag of line 72 of FIG. 1C. This is interpreted to indicate an end tag for the SGML tag '<t>'. The HTML tags saved for the SGML tag '<t>' are then obtained and an end tag for the HTML tag '<html>', the only tag saved for '<t>', is output to the HTML document as shown on line 94 of FIG. 1D. This terminates the current processing of the documents.

Figure 2:
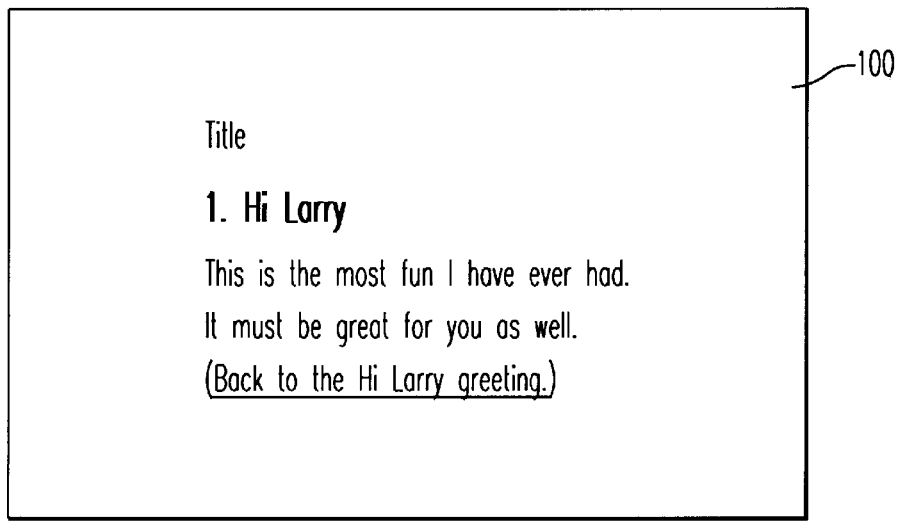
FIG. 2 illustrates an exemplary browser output generated using the HTML document shown in FIG. 1D.

FIG. 2 shows an output 100 resulting from opening the HTML output document of FIG. 1C as an exemplary What You See Is What You Get ("WYSIWYG") output of a Web browser on a user's computer screen. This output is in a format typically preferred by users of the World Wide Web on the Internet. Users employ Web browser programs to request HTML files, and other file types, from servers on the Internet. The browser downloads a requested HTML file and opens it to display formatted text and images on the user's computer screen. A browser does not have to download a file but is also capable of displaying an HTML file stored local to the computer running the browser or a local area network connected thereto.

Referring to FIG. 2, the 'Title' line is generated by a browser utilizing line 84 of FIG. 1D. Line 84 includes a start tag '<title>' and an end tag '</title>' to delimit the text of the title to be displayed by the browser, usually in a title bar at the top of the user's computer screen. The '<H3>' of line 86 of FIG. 1D instructs a Web browser to output non-tag text in a larger, more bold format than normal text output. As the only text appearing after the HTML start tag '<H3>' is '1.Hi Larry', and this is the only text appearing before the HTML end tag '</H3>', the text appears on a computer screen enlarged and bold in comparison with the surrounding text. The '<P>' start tag of line 88 instructs a Web browser to display non-tag text delimited by the start tag and its corresponding end tag in a new paragraph. New paragraphs start on a new line in the output. The end tag '</P>' of line 88 instructs a Web browser that this is the end of the current paragraph, and that any non-tag text following this tag will start on a new line on screen.

On line 86 of FIG. 1D, the tag containing '<A name=' is an anchor tag. Anchor tags are used to set place markers in text, and to establish highlighted text that can be clicked on with a mouse to cause a jump to the text containing the place marker. For this tag, a place marker is established for the browser in the non-tag text following the next '>' until the '</A>' end tag is encountered. Line 92 contains another type of anchor tag containing '<A HREF='. The text appearing on line 92 between the anchor tag's '>' and its corresponding end tag '</A>' appears on the screen of FIG. 2 as underlined text '(Back to the Hi Larry greeting.)'. This text is typically displayed in a different color from the surrounding text on the screen. When a user clicks a mouse on this underlined text, the text marked by the reference anchor tag of line 86 is pulled in for the user's viewing, surrounded by its neighboring text.

FIG. 3A and FIG. 3B illustrate the transformation of a hierarchical SGML document tree structure to the more "flat" tree structure of an HTML document. FIG. 3A illustrates a hierarchical SGML document tree structure, whereas FIG. 3B illustrates the corresponding "more flat" tree structure of the HTML document corresponding to the SGML document graphically displayed in FIG. 3A.

The trees of FIG. 3A and FIG. 3B are derived from documents illustrated in Appendices A–D. Appendix A shows an exemplary SGML DTD. The tree structure of FIG. 3A is derived from the SGML DTD of Appendix A. The tree of FIG. 3A has a root node test 110 which has children-nodes front 112 and section 114. The node front 112 has children nodes title 116, author 118, and keywords 120. The node section 114 has children nodes number 122, title 124, para 126, and subsec 1 128. The node author 118 has children nodes fname 130, surname 132, and title 134. The node subsec 1 128 has children nodes number 136, title 138, para 140, and subsec 2 142. The node subsec 2 142 has children nodes number 144, title 146, and para 148. The tree structure of FIG. 3A which corresponds to the SGML DTD of Appendix A has five levels and twenty nodes.

The tree structure of FIG. 3B corresponds to a generalized HTML document that results from utilizing the SGML DTD of Appendix A and a mapping exemplified in Appendix B. Appendix C shows an exemplary SGML document to be processed through the mapping shown in Appendix B to give an HTML document exemplified in Appendix D. The tree structure of FIG. 3B has a root node html 150 having two children nodes, head 152 and body 154. The head node 152 has a child node title 156. The body node 154 has children h3 158 and p 160. The node p 160 has a child strong 162. In contrast to the tree structure of FIG. 3A which has five levels and twenty nodes, the tree structure corresponding to the resulting RTML document has only four levels and seven nodes.

Figure 4:
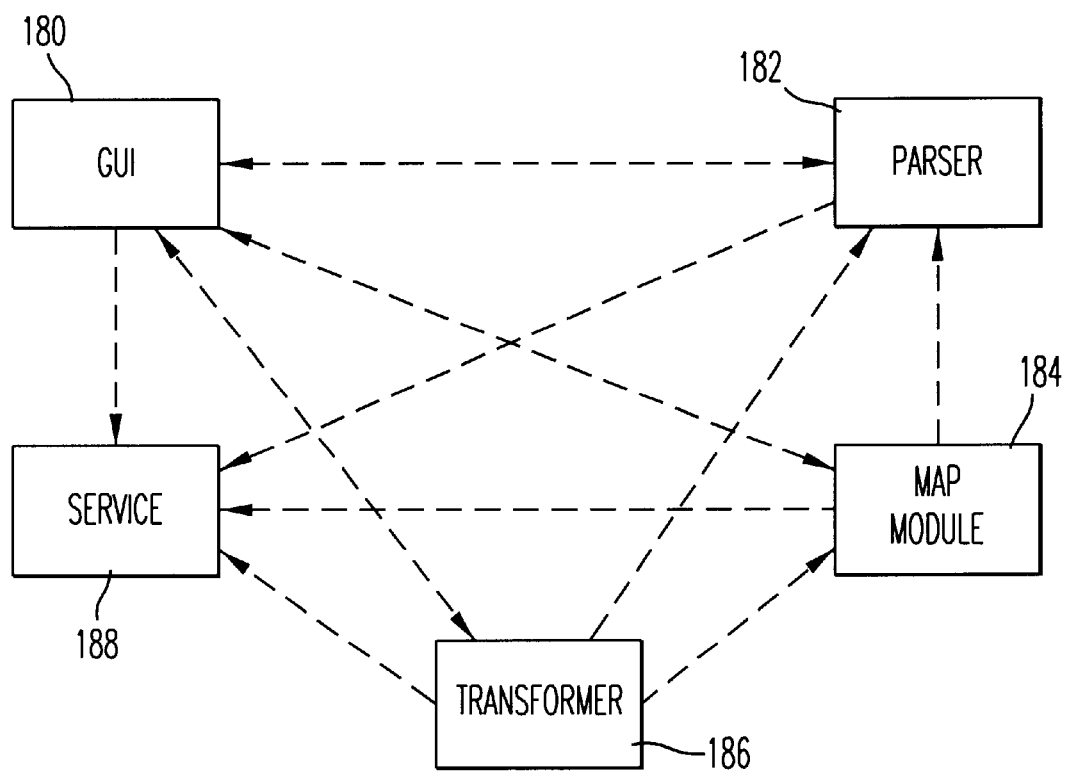
FIG. 4 illustrates a design of the major components for the SGML to HTML mapping and transformation.

FIG. 4 illustrates an overview of major modules of the SGML to HTML mapping and transformation. A Map Module 184 interacts with a Parser 182 and a GUI 180 to create the actual mapping from an SGML document to an HTML document. A Transformer 186 interacts with the Map Module 184, the Parser 182, and the GUI 180 to transform the SGML document into the HTML document. A Service module 188 contains utility objects which can be utilized by all the modules for utility processing such as file handling. The GUI 180 handles interaction between a user and the system. The Parser 182 analyzes and breaks down input documents into recognizable component parts to be passed to other modules of the system. For example, in processing the exemplary SGML document of FIG. 1C, Parser 182 analyzes the input SGML document recognizing a DTD to generate a symbol table which can be passed to other modules of the system for processing documents. The Parser 182 recognizes line 60 of FIG. 1C as a 'DOCTYPE' tag and processes a DTD specified by a system file "sample.dtd" shown in FIG. 1A to generate the symbol table. The Parser 182 would then recognize line 62 of FIG. 1C contents as a start tag for the element t, and would transmit the tag and other tag information to Transformer 186. Transformer 186 controls the processing of the SGML to HTML mapping and transformation, requesting information and data from the Map Module 184, the Parser 182, and the Service 188 modules when needed.

Figure 5:
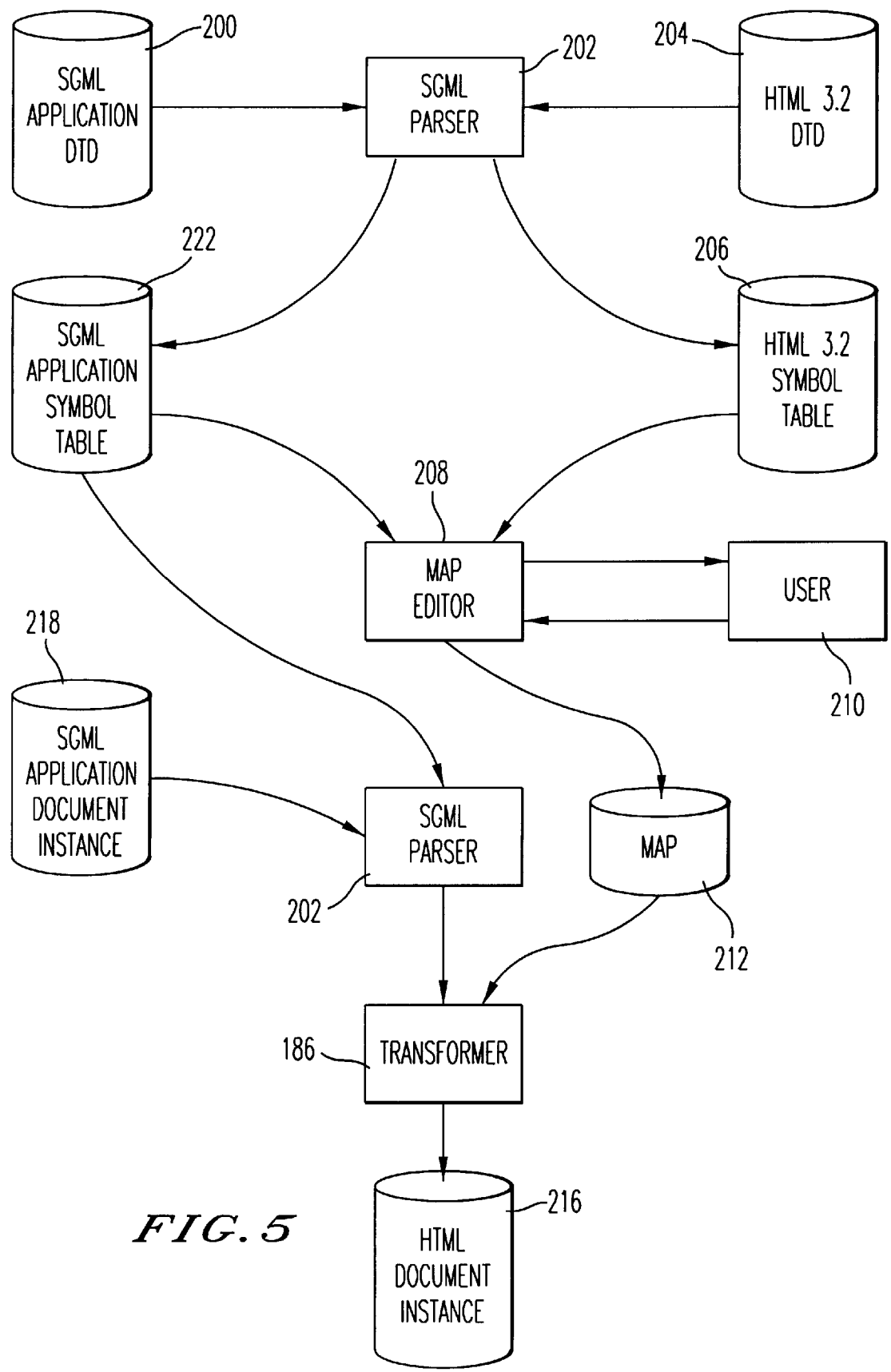
FIG. 5 illustrates, in a data flow diagram format, the flow of data through the SGML to HTML mapping and transformation.

FIG. 5 illustrates a data flow diagram showing the flow of data through the SGML to HTML mapping and transformation. An SGML Application DTD 200 and HTML 3.2 DTD 204 are input to an SGML Parser 202. This SGML Parser 202 corresponds to the Parser 182 of FIG. 4. An SGML Application Symbol Table 222 and an HTML 3.2 Symbol Table 206 are output from the SGML Parser 202 to be utilized as input to a Map Editor 208, along with an interactive User 210 input. The Map Editor 208 is contained within the GUI 180 of FIG. 4. The Map Editor 208 outputs a Map 212. The SGML Application Symbol Table 222 and an SGML Application Document Instance 218 are together input to the SGML Parser 202 to give output to be used as input, along with the Map 212, to the Transformer 186. Transformer 186 corresponds to the Transformer 186 of FIG. 4. Transformer 186 then outputs an HTML Document Instance 216. The SGML Application DTD 200 and SGML Application Document Instance 218 are exemplified in FIG. 1A and FIG. 1C, respectively. The HTML Document Instance 216 is exemplified in FIG. 1D. The Map 212 is exemplified in FIG. 1B.

Figure 6A:
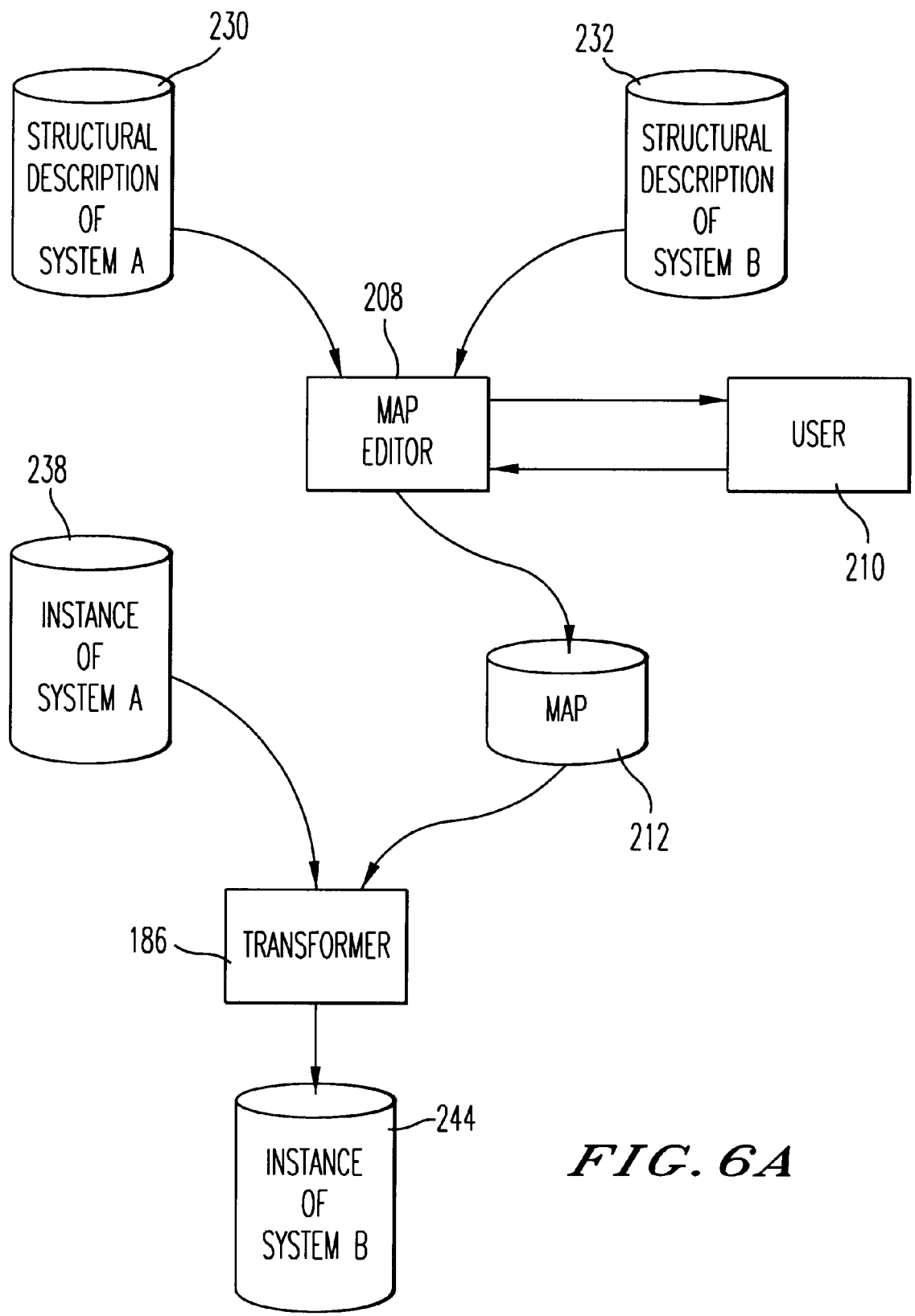
FIG. 6A illustrates the flow of data and interaction of files through the mapping and transformation of information in one structured format to information in another structured format.

FIG. 6A is a more generalized data flow diagram showing exemplary paths taken by data flowing through the generalized mapping and transformation of information in one structured format to information in another structured format. A Structural Description of System A 230, together with a Structural Description of System B 232 and interactive User 210 input, are input to a Map Editor 208 to output the Map 212. The Map 212 and an Instance of System A 238 are then utilized by the Transformer 186 to output an Instance of System B 244.

Figure 6B:
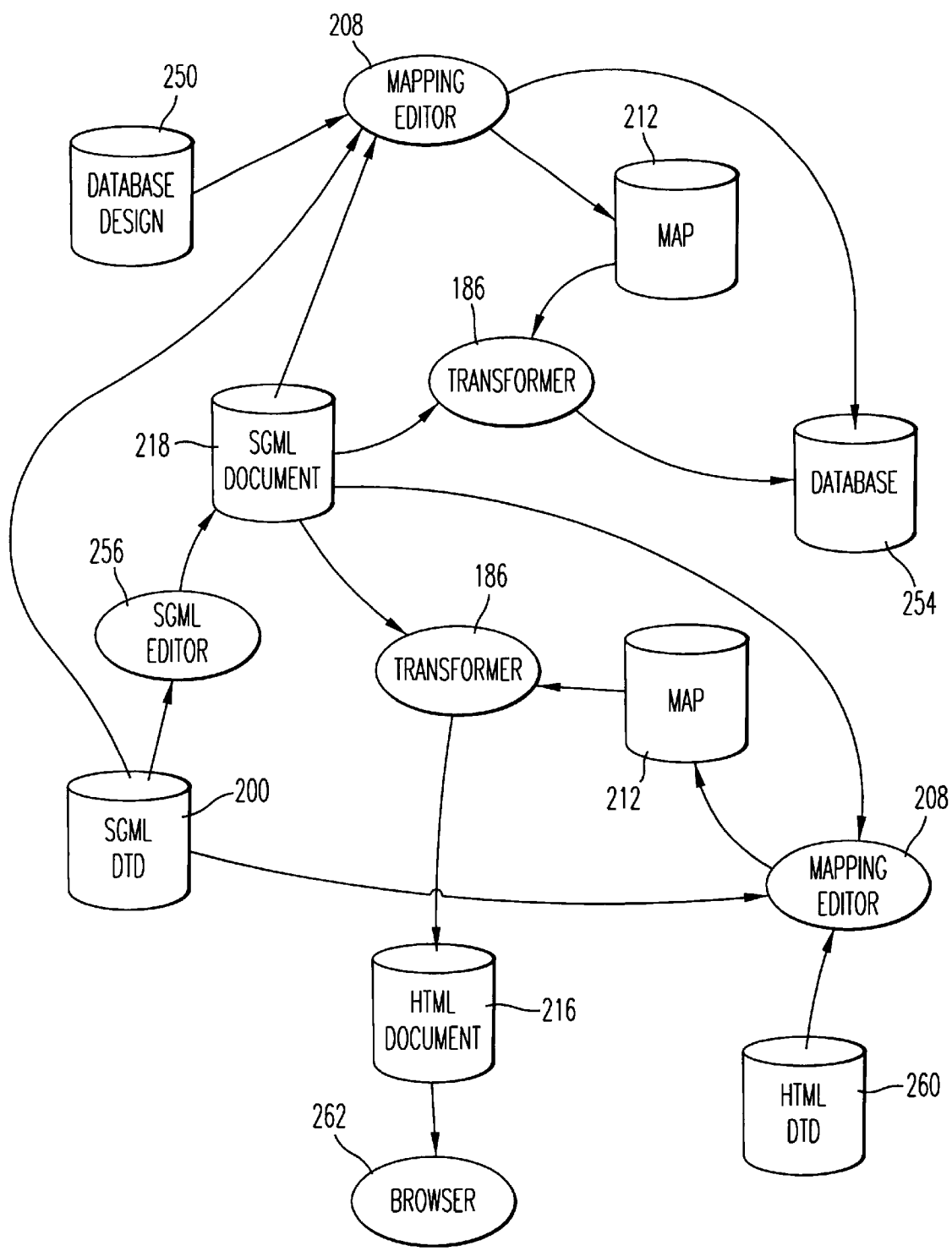
FIG. 6B illustrates the flow of data and interaction of files through the SGML to HTML mapping and transformation.

FIG. 6B is a more generalized data flow diagram showing exemplary paths taken by data flowing through the SGML to HTML mapping and transformation. An SGML DTD 200, together with an SGML Document 218 and an HTML DTD 260, are input to the Mapping Editor 208 to output the Map 212. The Map 212 and the SGML Document 218 are then utilized by the Transformer 186 to output an HTML Document 216. The HTML Document 216 corresponds to the HTML Document Instance 216 of FIG. 5. The HTML Document 216 is then input to a Browser 262 for user viewing.

The SGML DTD 200, input to an SGML Editor 256, yields output to the SGML Document 218. A Database Design 250, input to the Mapping Editor 208, along with the SGML DTD 200 and the SGML Document 218, yield output to the Map 212 and a Data Base 254. The Map 212 and the SGML Document 218 are input to the Transformer 186 to yield output, which, together with the output from the Mapping Editor 208, are input to the Data Base 254. The Map 212 corresponds to the Map 212 of FIG. 5. The SGML Document 218 corresponds to the SGML Application Document Instance 218 of FIG. 5. The SGML DTD 200 corresponds to the SGML Application DTD 200 of FIG. 5. The Transformer 186 corresponds to the Transformer 186 of FIG. 5. The Mapping Editor 208 corresponds to the Map Editor 208 of FIG. 5. Arrows illustrate different paths the documents and data files take for different requests of a user.

Figure 7:
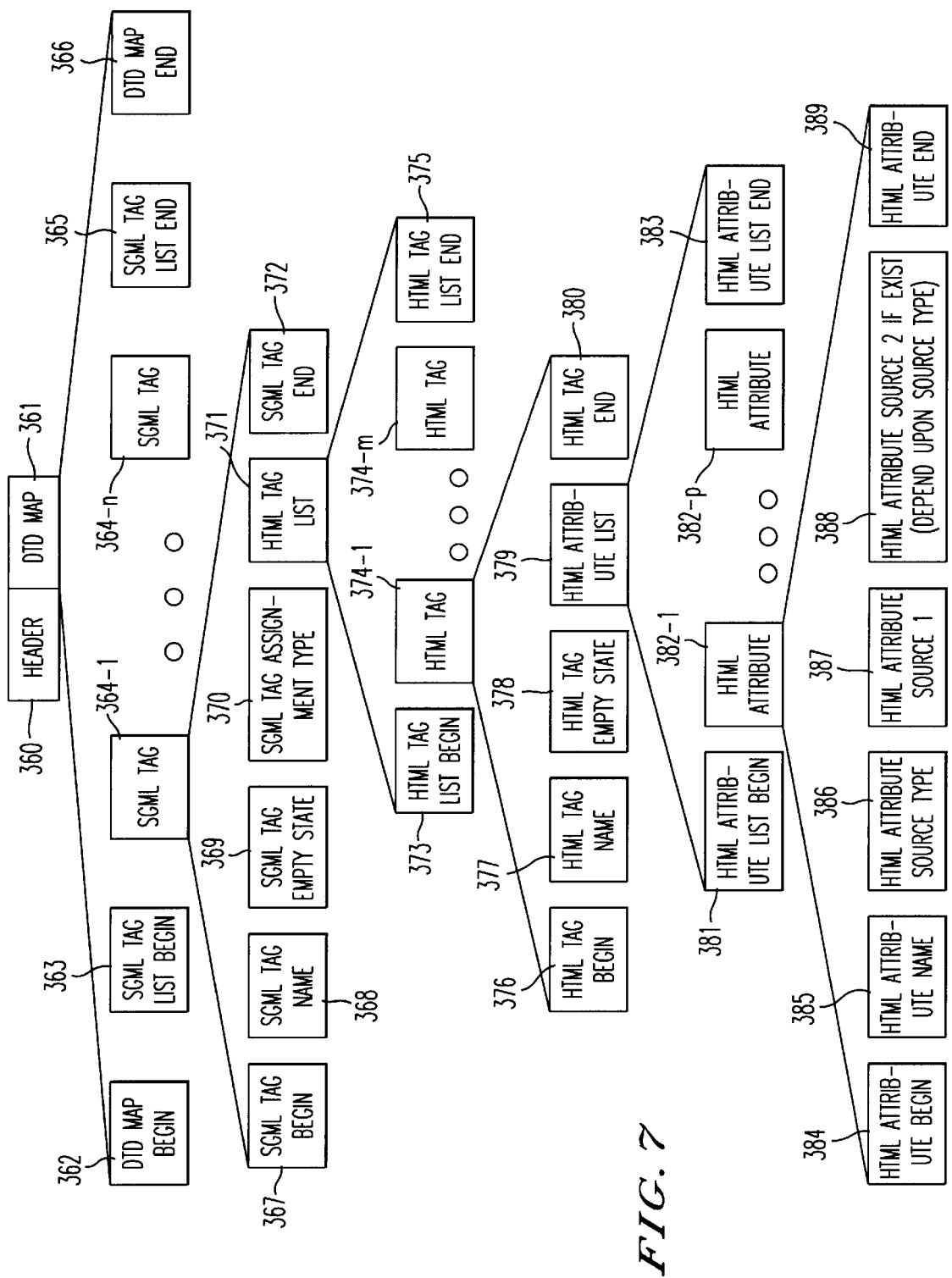
FIG. 7 illustrates a file organization of a map class object for the SGML to HTML mapping and transformation.

FIG. 7 shows a hierarchical view of the DTD Map class object that can be stored in a file. The invention has been implemented using object oriented techniques, although any programming technique and/or hardware may be used to implement the invention. For purposes of this description, a class is a description of the structure and behavior of an object, while an object is an instance of the item described by a class. Objects typically communicate by passing objects and messages to each other. In structure, objects contain other objects or structures as components, as well as variables and methods.

Interpreting the horizontal lines of FIG. 7 from left to right, begin and end delimiters delimit each object in the file. List Begin and List End delimiters delimit lists from left to right. When a DTD Map Object exists, one or more SGML tag objects are placed between the SGML Tag List Begin 363 and SGML Tag List End 365.

The file begins with a Header 360 followed by a DTD Map 361. The DTD Map 361 includes, first, a DTD Map Begin 362 followed by an SGML Tag List Begin 363, followed by at least one SGML Tag 364-1 through an SGML Tag 364-n. The sequence of one or more SGML tags is followed by an SGML Tag List End 365, followed by a DTD Map End 366. Each SGML Tag 364-1 through 364-n includes an SGML Tag Begin 367, an SGML Tag Name 368, followed by an SGML Tag Empty State 369, followed by an SGML Tag Assignment Type 370, followed by an HTML Tag List 371, followed by an SGML Tag End 372.

Each HTML Tag List 371 is delimited by an HTML Tag List Begin 373 at the beginning and an HTML Tag List End 375 at the end with the list including at least one HTML Tag 374-1 through HTML Tag 374-m following the HTML Tag List Begin 373.

Each HTML Tag 374-1 through 374-m is delimited by an HTML Tag Begin 376 at the beginning and an HTML Tag End 380 at the end. Following the HTML Tag Begin 376 is an HTML Tag Name 377, followed by an HTML Tag Empty State 378, followed by an HTML Attribute List 379, followed by a delimiter HTML Tag End 380.

Each HTML Attribute List 379 is delimited by an HTML Attribute List Begin 381 at the beginning and an HTML Attribute List End 383 at the end. Following the delimiter HTML Attribute List Begin 381 is at least one HTML Attribute 382-1 through an HTML Attribute 382-P, followed by an ending delimiter HTML Attribute List End 383.

Each HTML Attribute 382-1 through 382-p is delimited by an HTML Attribute Begin 384 at the beginning and an HTML Attribute End 389 at the end. Following the HTML Attribute Begin 384 is an HTML Attribute Name 385, followed by an HTML Attribute Source Type 386, followed by an HTML Attribute Source 1 387, followed by an HTML Attribute Source 2 388, if one exists. The delimiter HTML Attribute End 389 terminates the listing of contents.

Figures 1, 8A:
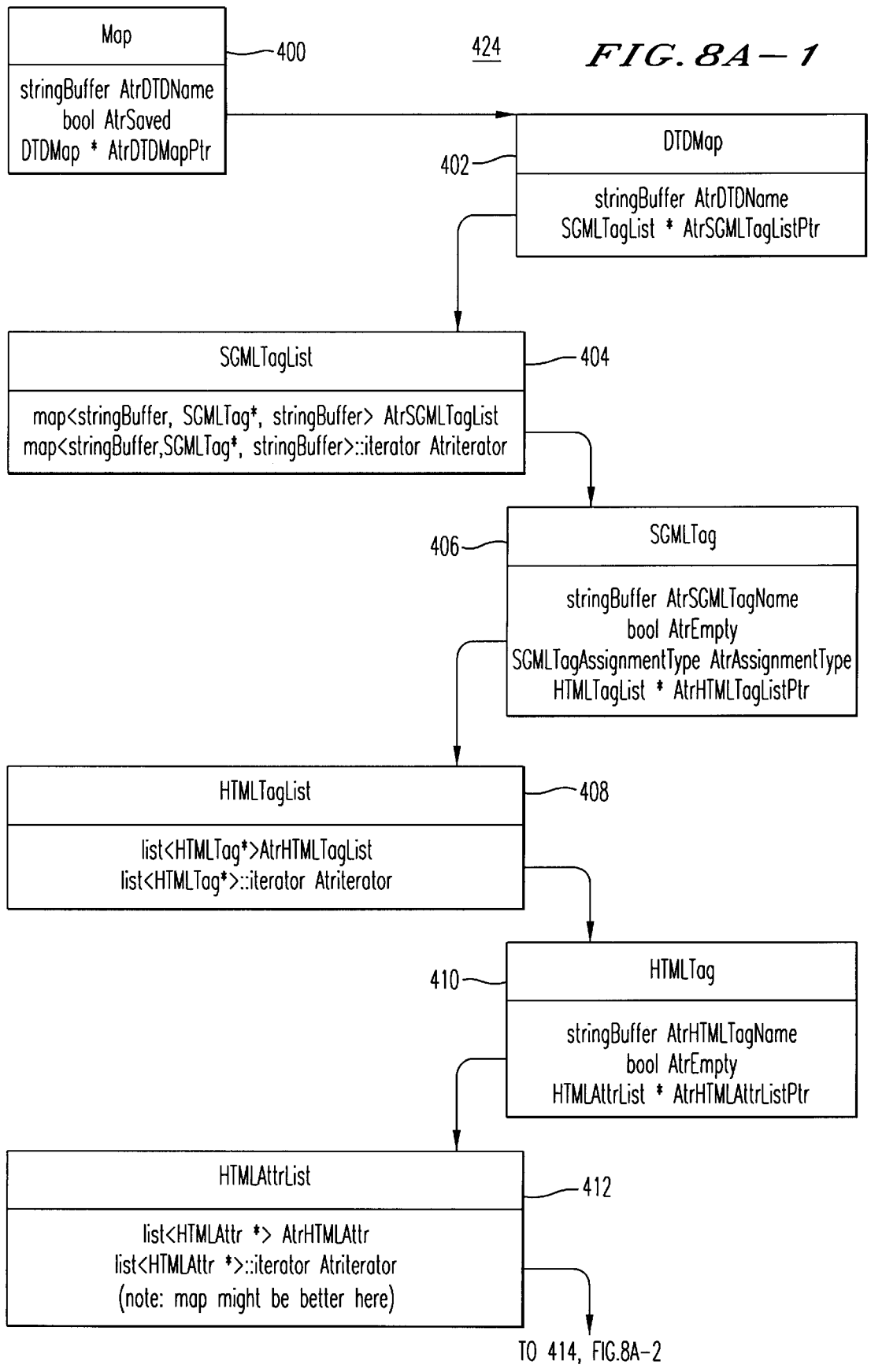
FIG. 8A illustrates a map class structure for the map module of the SGML to HTML mapping and transformation.
Figures 2, 8A:
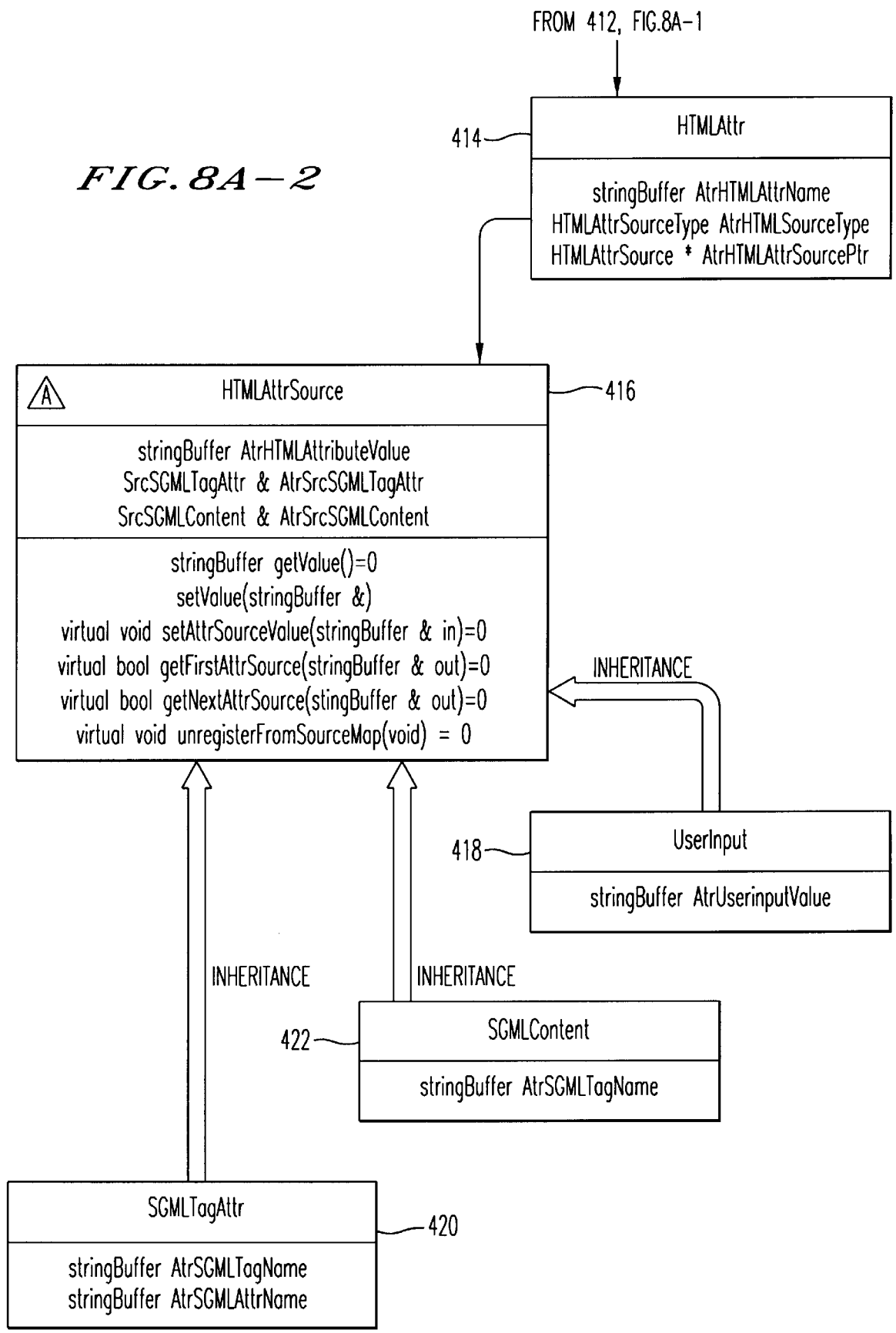

FIG. 8A shows major class dependencies 424 for the DTD Map object. For purposes of explanation of the figures that follow, arrows show class dependencies, meaning that an object having an arrow pointing to it is contained within the object originating the arrow. A Map object 400 includes a pointer to an object DTDMap 402. A pointer is a value that represents an absolute address of an item in computer memory. A pointer to an object is used to access the information stored for the implementation of a particular object by, minimally, referencing the pointer name and the field or function name within the object. Viewing FIG. 7 and FIG. 8A together, the DTDMap 402 of FIG. 8A, corresponding to the DTD Map 361 of FIG. 7, includes, via pointers, an SGMLTagList 404 corresponding to the SGML Tag 364-1 through 364-n of FIG. 7. The SGMLTagList 404 of FIG. 8A includes, via pointers, a class SGMLTag 406 corresponding to each of the SGML Tags 364-1 through 364-n of FIG. 7. The SGMLTag class 406 of FIG. 8A includes, via pointers, HTMLTagList 408, which corresponds to the HTML Tag List 371 of FIG. 7. The HTMLTagList 408 of FIG. 8A includes, via pointers, an HTMLTag 410 which corresponds to each of the HTML Tag 374-1 through HTML Tag 374-m of FIG. 7. The HTMLTag 410 of FIG. 8A includes, via pointers, an HTMLAttrList 412 class which corresponds to the HTML Attribute List 379 of FIG. 7. The HTMLAttrList 412 of FIG. 8A includes, via pointers, an HTMLAttr 414 class which corresponds to the HTML Attributes 382-1 through 382-p of FIG. 7. The HTMLAttr 414 class of FIG. 8A includes, via pointers, a class derived from an abstract class, denoted by an 'A' inside a triangle, HTMLAttrSource 416 which corresponds to the HTML Attribute Source Type 386 of FIG. 7. An abstract class is typically defined as a model to be used for defining other closely related classes which may, for example, need to exhibit similar behavior in a system. By defining an abstract class, the other classes are defined as inheriting the structure and methods of the parent abstract class. The hollow arrows of FIG. 8A denote inheritance of classes. HTML attributes may be obtained from different sources. Therefore, a UserInput 418 class is shown to inherit from the abstract class HTMLAttrSource 416. Also, an SGMLContent 422 class inherits from HTMLAttrSource 416, as does an SGMLTagAttr 420 class.

Figure 8B:
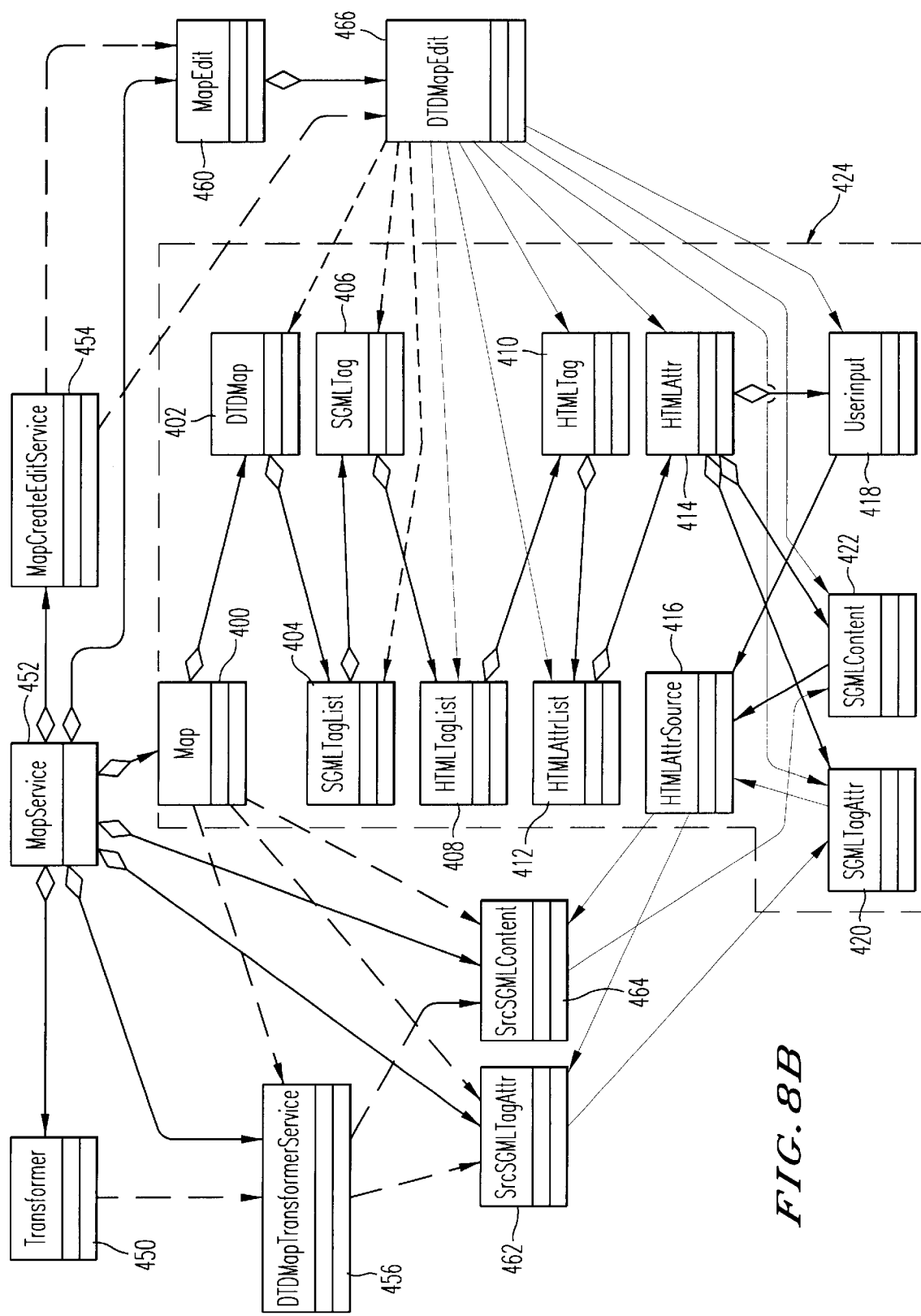
FIG. 8B illustrates the major classes within the map module of FIG. 8A.

FIG. 8B shows major classes within the Map Module 276, illustrating the major dependencies among the classes. The classes 424 illustrated inside the dashed line rectangle are the classes 424 of FIG. 8A. A class MapService 452 includes a class Transformer 450, a class DTDMapTransformerService 456, a class SrcSGMLTagAttr 462, a class SrcSGMLContent 464, a class Map 400, a class MapEdit 460, and a class MapCreateEditService 454. The class MapEdit 460 includes the class DTDMapEdit 466. The class DTDMapEdit 466 has dependencies with the class DTDMap 402, the class SGMLTagList 404, SGMLTag 406, HTMLTagList 408, HTMLAttrList 412, HTMLTag 410, HTMLAttr 414, SGMLTagAttr 420, SGMLContent 422, and UserInput 418. The class HTMLAttrSource 416 has dependencies with the class SrcSGMLTagAttr 462 and the class SrcSGMLContent 464. The class DTDMapTransformerService 456 has dependencies with the class SrcSGMLTagAttr 462 and the class SrcSGMLContent 464. The class SrcSGMLTagAttr 462 has a dependency with the class SGMLTagAttr 420 and the class SrcSGMLContent 464 has a dependency with SGMLContent 422. The class MapCreateEditService 454 has dependencies with the class DTDMapEdit 466 and the class MapEdit 460. The class Map 400 contains DTDMap 402, DTDMapTransformerService 456, SrcSGMLTagAttr 462, and the class SrcSGMLContent 464. The functionalities of these classes and their objects are explained with regard to FIGS. 18A(1)–18C(3).

Data items and objects in software generally involve dynamic allocation of computer storage resources at some stage in a request for execution of program code. Pointer variables, containing addresses of data items, methods, or objects, are available to be passed among objects during execution of code. As objects and data items are constructed and destructed dynamically, an object using a pointer or reference to a data item, for example, may reference the item after it has been destructed, possibly causing a system failure. A facility for registering objects and data items as they are created and requested gives objects a means to verify the current existence and usage of objects and data items before reference. A destructor verifies the current usage of an object or data item before destruction so that other objects using the object or data item may successfully complete their usage before destruction. An exemplary use of registering objects and data items is assignment of attribute values to HTML attributes, as discussed below with regard to FIGS. 8C(1)–8C(4) and FIGS. 18A(1)–18C(3).

FIG. 8C(1) illustrates a class structure for a SrcSGMLTagAttr 462 class of the SGML to HTML mapping and transformation. FIG. 8C(2) illustrates a class structure for a SrcSGMLContent 464 class of the SGML to HTML mapping and transformation. FIG. 8C(3) illustrates a class structure for the MapService 452 class of the SGML to HTML mapping and transformation. As described previously with regard to FIG. 8B, the class HTMLAttrSource 416 includes references to the class SrcSGMLTagAttr 462 and the class SrcSGMLContent 464. The HTMLAttrSource 416 contains an AtrSrcSGMLTagAttr, which is a reference to a SrcSGMLTagAttr 462, and an AtrSrcSGMLContent, which is a reference to a SrcSGMLContent 464. SrcSGMLTagAttr 462 contains a method registerSGMLTagNameAndAttributeName, used for registering SGML tag attributes in the MapService 452, so that attributes that have already been registered are available to be unregistered from the HTMLAttrSource 416 by using a method unregisterTagAttrKeyAndMapEntry in SrcSGMLTagAttr 462 through a virtual function unregisterFromsourceMap. SrcSGMLTagAttr 462 also contains a method setValueForAttributeOfTag to be used at document instance processing time to transform an SGML document to an SGML document.

SrcSGMLContent 464 contains a method registerSGMLTagName, used for registering SGML tag content in the SrcSGMLContent 464, so that attributes that have already been registered are available to be unregistered from the HTMLAttrSource 416 by using a method unregisterSGMLTagName in SrcSGMLContent 464. SrcSGMLContent 464 also contains a method setValueForTag to be used at document instance processing time to transform an SGML document to an HTML document.

FIG. 8C(4) illustrates a class structure for the MapCreateEditService 454 class of the SGML to HTML mapping and transformation. MapCreateEditService 454 was discussed previously with regard to FIG. 8B, and functionalities of the class and object are explained with regard to FIGS. 18A(1)–18C(3). A method setSelectedSGMLTagToBeNullAssigned in MapCreateEditService 454 sets a selected SGML tag to be mapped to a null value. A method setSelectedSGMLTagToBeNotAssigned in MapCreateEditService 454 sets a selected SGML tag to be kept in the mapping. A method getAttributeAssignmentInformationForHTMLAttribute in MapCreateEditService 454 gets assignment information for assigned values to HTML attributes. Methods assignHTMLAttributeWithSGMLAttribute, assignHTMLAttributeWithSGMLContent, assignHTMLAttributeWithSystem, assignHTMLAttributeWithNoValue, assignHTMLAttributeWithUserInput in MapCreateEditService 454 assign values to the HTML attributes.

Figure 9:
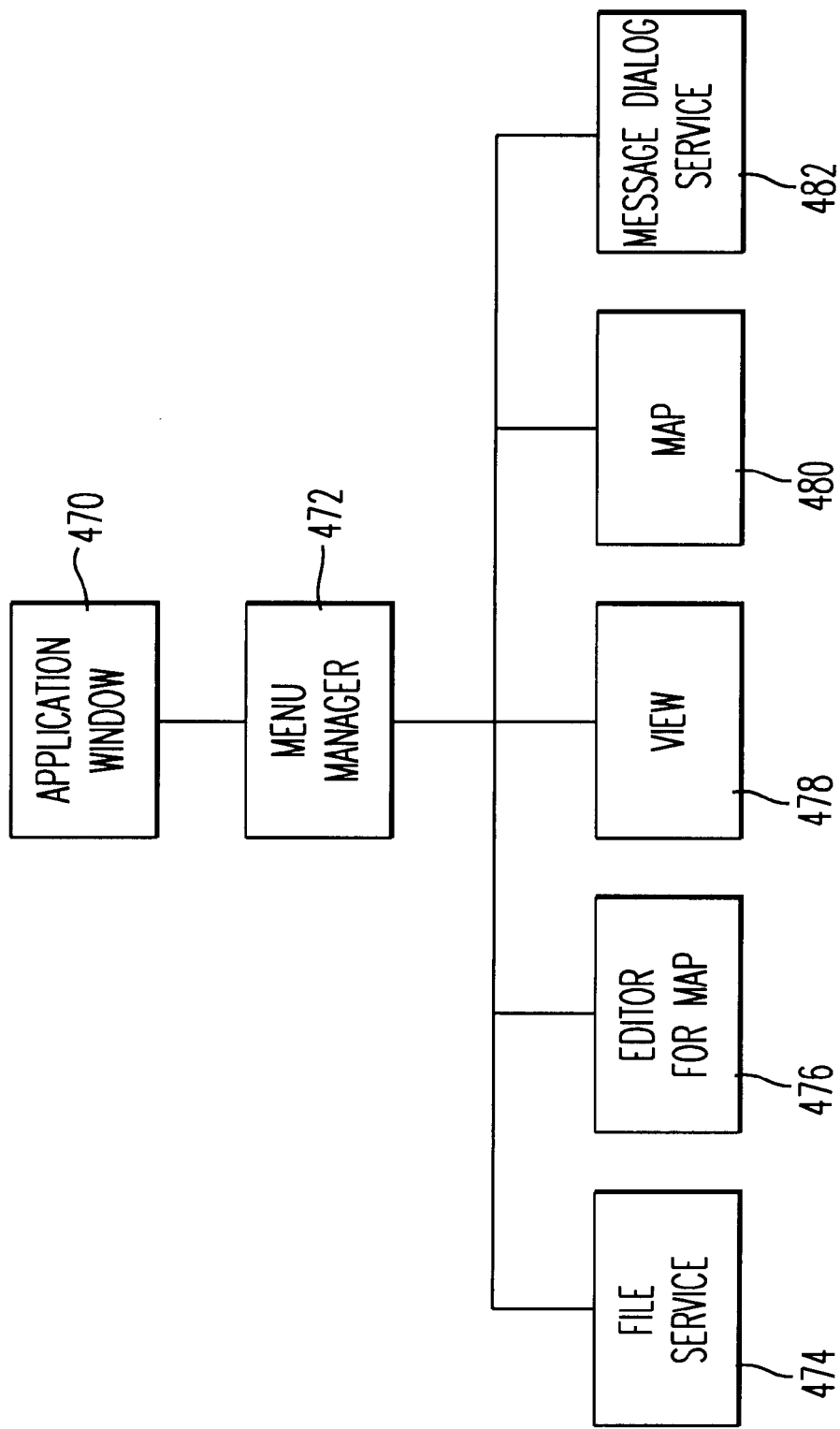
FIG. 9 illustrates the hierarchical interaction among major modules of the SGML to HTML mapping and transformation.

FIG. 9 illustrates a hierarchical view of major modules for implementation of the GUI for the SGML to HTML mapping and transformation. An Application Window 470 initiates execution of a Menu Manager 472. The Menu Manager 472 initiates execution of a File Service 474, Editor for Map 476, View 478, Map 480 and Message Dialog Service 482. The Map 480 module corresponds to the Map class 400 of FIG. 8A. The View 478 module is included in the GUI 270 of FIG. 4. The functionalities of these modules are explained with regard to FIGS. 18A(1)–18C(3).

Figure 10:
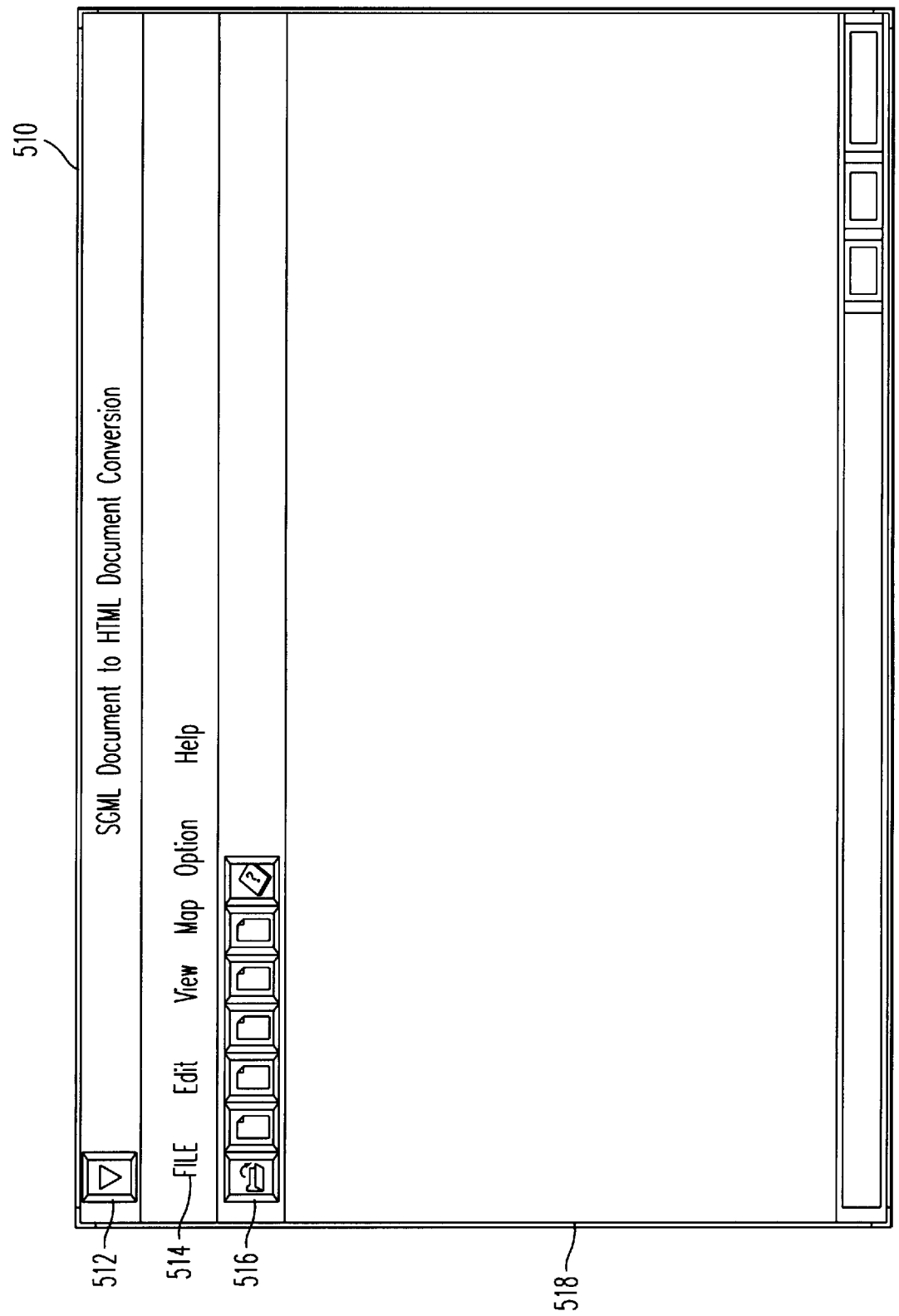
FIG. 10 illustrates an exemplary main application window for the SGML to HTML mapping and transformation.

FIG. 10 shows an exemplary computer screen output of a Main Application Window 510. The window includes a title bar 512, a menu bar 514, a tool bar 516, and a viewing window work space 518. In order for a user to perform any menu operation, the user must select one of the items in the menu bar 514. When the user makes a selection, a sub-menu (or pull-down menu) displays all operations available for selection from the main menu. For example, if the user selected the File option, a sub-menu appears to display the options Open SGML, Open DTD, Open Map, Save Map, Map Save As, Save HTML, HTML Save As, Close SGML, and Exit. The Open SGML option allows the user to select an SGML document to open. The Open DTD option allows the user to select a DTD to open. The Open Map option allows the user to select a map to open. The Save Map Option allows the user to save a map onto disk. The Map Save As option allows the user to save the map onto the disk with the option of selecting a new file name for the saved map. The Save HTML option allows the user to save an HTML document onto disk. The HTML Save As option allows the user to save an HTML document onto disk with the option of selecting a new file name for the HTML file. The Close SGML option allows the user to close an SGML document and Exit option allows the user to exit the Application Window processing of the conversion.

If the user selects an Edit option from the menu bar 514, a sub-menu appears to display options Create Map and Edit Map. The Create Map option allows the user to create a map that can be used to transform an SGML document to an HTML document. The Edit Map option allows the user to modify an existing map. A sub-menu for a View option displays the options to View SGML and to View HTML. These options are designed to display an SGML document or an HTML document when selected by a user. A View SGML option allows the user to display an SGML document in the work space of the main application window. A View HTML option allows the user to display an HTML document in the work space of the main application window. If the user selects the Map option, a sub-menu appears to display an option Run Map. Selecting Run Map initiates the transformation to transform an input SGML document to an HTML document. If the user selects the Option button, a sub-menu appears to display options of Incremental and Reference. An Incremental option allows the user to perform an incremental mapping of an SGML document to an HTML document. After an SGML tag is mapped into HTML tags the SGML document is then transformed into its corresponding HTML document. This occurs after each SGML tag is mapped. A Reference option allows the user to display the reference in transforming an SGML document to an HTML document.

Figure 11:
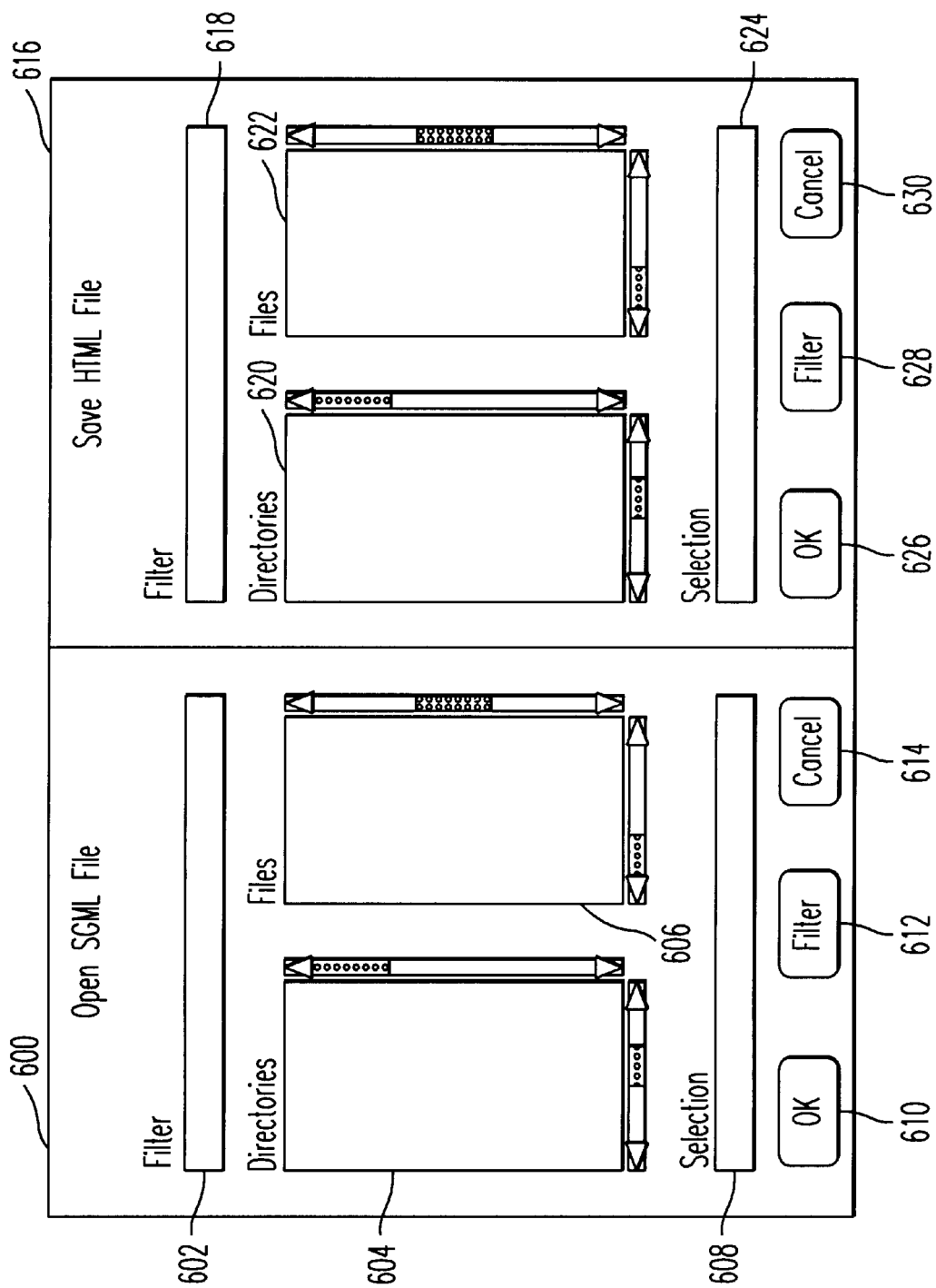
FIG. 11 illustrates exemplary dialog boxes for opening and saving a file.

Referring to FIG. 11, dialog boxes for opening an SGML file and saving an HTML file are shown. FIG. 11 shows an exemplary file open dialog box 600 which would be displayed responding to an Open SGML option from the sub-menu displayed after the user selected the File option in FIG. 10. A Filter text edit box 602 is displayed allowing the user to choose a type of file to be opened. Candidate directories for files are displayed in a Directories list box 604. Candidate files for opening will be displayed in a Files list box 606. A Selection text edit box 608 displays the file name that the user selects for opening. An OK button 610 allows the user to approve the selection shown in the Selection text edit box 608. A Filter button 612 allows the user to request a display of all files of a given type, in the Files list box 606, as described in the Filter text edit box 602. A Cancel button 614 allows the user to choose termination and cancellation of the current request to open a file.

FIG. 11 also shows an exemplary Save HTML file dialog box 616 that is displayed as a result of the user selecting the Save HTML option from the sub-menu displayed after the user selected the File button in FIG. 10. A Filter text edit box 618 allows the user to select a type of file for saving the current HTML file. Candidate directories for files are displayed in a Directories list box 620. Candidate files of a given type are displayed in a Files list box 622. A Selection text edit box 624 allows the user to select a file name for saving the file. An OK button 626 allows the user to approve an operation and complete the operation of saving a file. A Filter button 628 allows the user to request a display of all files of a given type, in the Files list box 622, as described in the Filter text edit box 618. A Cancel button 630 allows the user to terminate and cancel the current request to save the current HTML file.

Figure 12A:
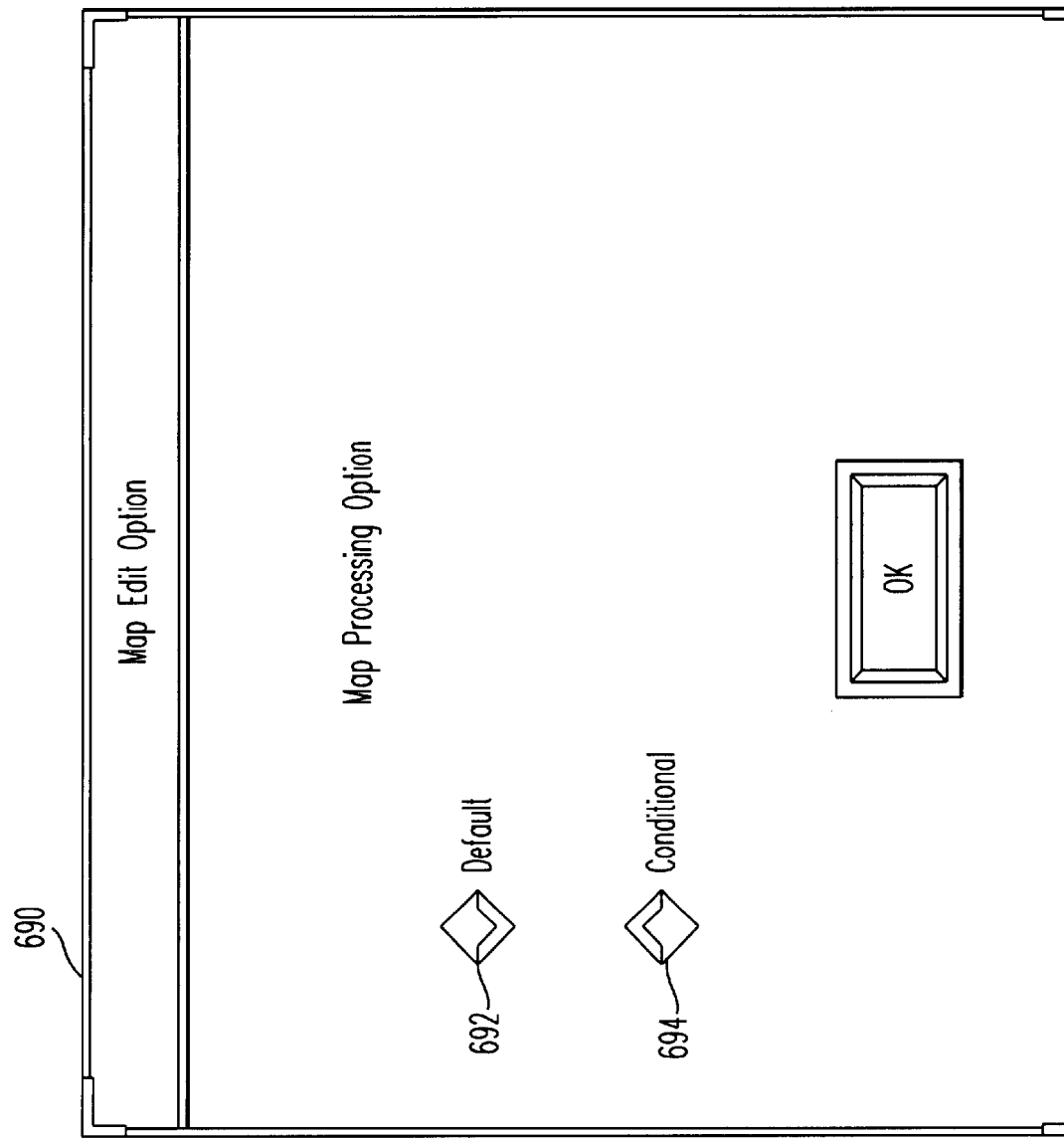
FIG. 12A illustrates an exemplary window for the Map Processing Option of the SGML to HTML mapping and transformation.
Figure 12B:
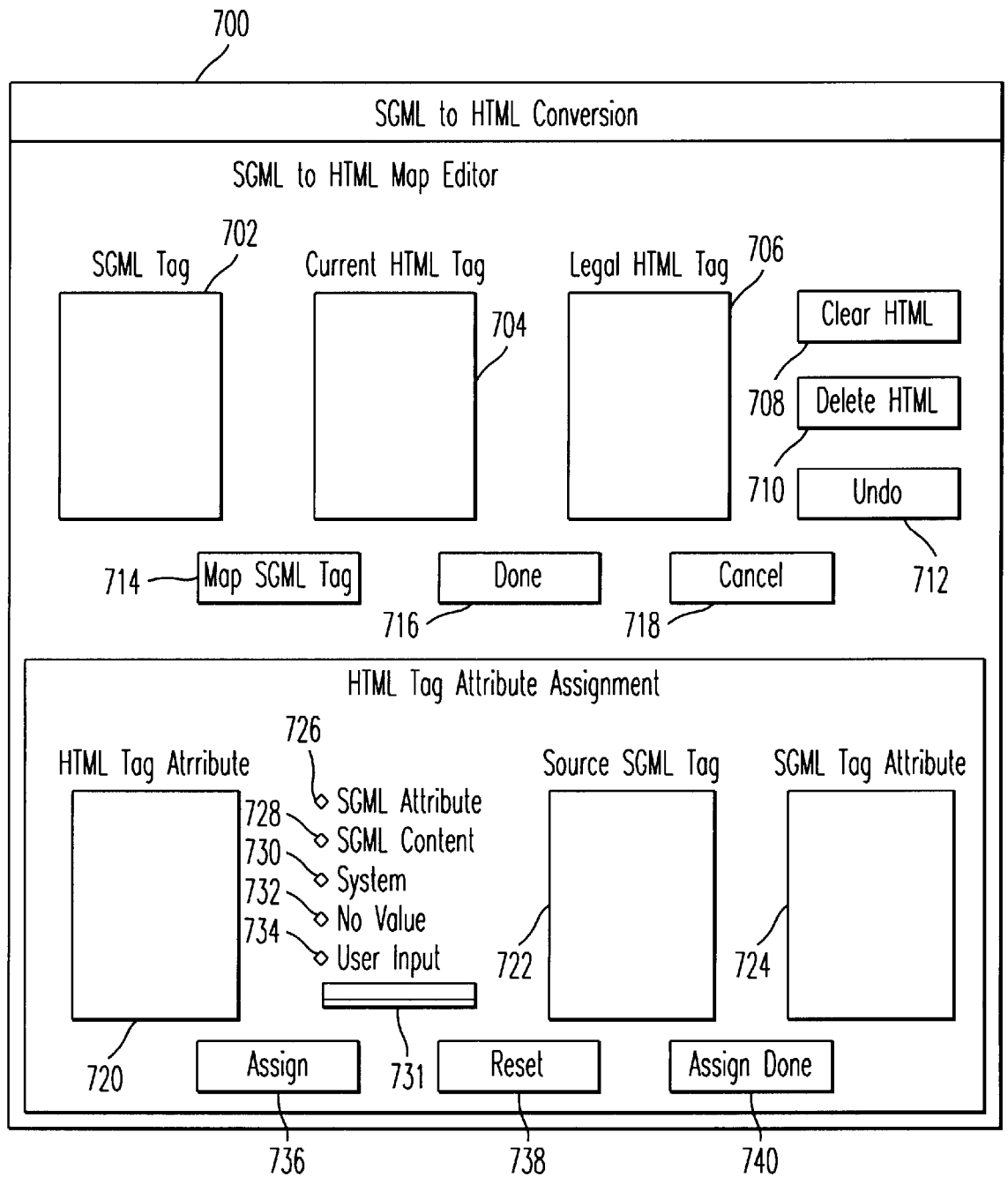
FIG. 12B illustrates an exemplary window for the SGML to HTML Map Editor.

FIG. 12A and FIG. 12B display exemplary Map Edit Option and Map Edit Dialog boxes utilized for creation and editing of a map. The user is allowed to create a new map or edit an already existing map. If the user selects the Edit button from the Main Application Window 510 of FIG. 10, and either the Edit Map or Create Map option is selected, the Map Edit Option 690 dialog box of FIG. 12A is displayed to allow the user to select whether the Default mapping of the SGML document or a Conditional mapping of the SGML document should be used to create or edit the map. The Default mapping, selected by clicking on a Default button 692, is the user defined tag mapping set up by the user interaction with the SGML to HTML Map Edit dialog box 700 of FIG. 12B. The Conditional mapping, selected by clicking on a Conditional button 694, involves defining the conditional or special mappings. After the user selects one of the options from the Map Edit Option 690, then the Map Edit dialog box 700 of FIG. 12B is displayed to allow the user to interact with the system in defining a map. If the Create Map option is selected, the user is allowed to create a new map. Both the Map Edit Option dialog box 690 and the Map Edit dialog box 700 are used for creating a map and for editing an existing map.

Referring to FIG. 12B, a display of the Map Edit dialog box 700 shows a display of a list of SGML Tags 702, the current HTML Tag list 704 that an SGML tag selected from the SGML Tag list 702 maps to, and a list of Legal HTML Tags 706 that can be added into the current HTML Tag list 704. For a given SGML Tag 702, the user selects the Legal HTML Tag 706 by double clicking a mouse on an HTML tag from the Legal HTML Tag list 706. This will add the HTML Tag to the Current HTML Tag list 704. If the Current HML Tag list 704 contains a list of HTML Tags that the SGML Tag 702 maps into, a new HTML Tag will be added below the HTML Tag that is selected in the Current HTML Tag 704 list. If an HTML Tag is inserted into the current HTML Tag 704 list, the HTML Tag(s) following the inserted Tag must be deleted, as they may no longer be legal. A Clear HTML Tag 708 button will clear the current HTML Tag 704 list. A Delete HTML Tag 710 button will delete the HTML Tag selected in the Current HTML Tag 704 list. The HTML Tags following the deleted HTML Tag in the Current HTML Tag 704 list must be deleted since they may no longer be legal. An Undo 712 button will undo the last clear, delete or insert operation. These buttons are easily modified to a menu operation format by one skilled in the art of computing. A Map SGML Tag 714 button allows the user to map the SGML Tag 702 to the HTML Tag list in the Current HTML Tag 704 list and then allows the user to select the next SGML tag to map. If a Done 716 button is selected, the remaining SGML Tags 702 will not be mapped. If a Cancel 718 button is selected, all previous SGML to HTML map information will be disregarded. Two possible selections in the Legal HTML Tag list 706 are Null Assigned and Not Assigned. Null Assigned deletes the SGML Tag 702 so that the SGML tag 702 will not be mapped and will not be displayed after transformation. Not Assigned leaves the SGML Tag 702 as is, so that the SGML Tag 702 will not be mapped to HTML but will be displayed as is after transformation.

Figures 1, 18A:
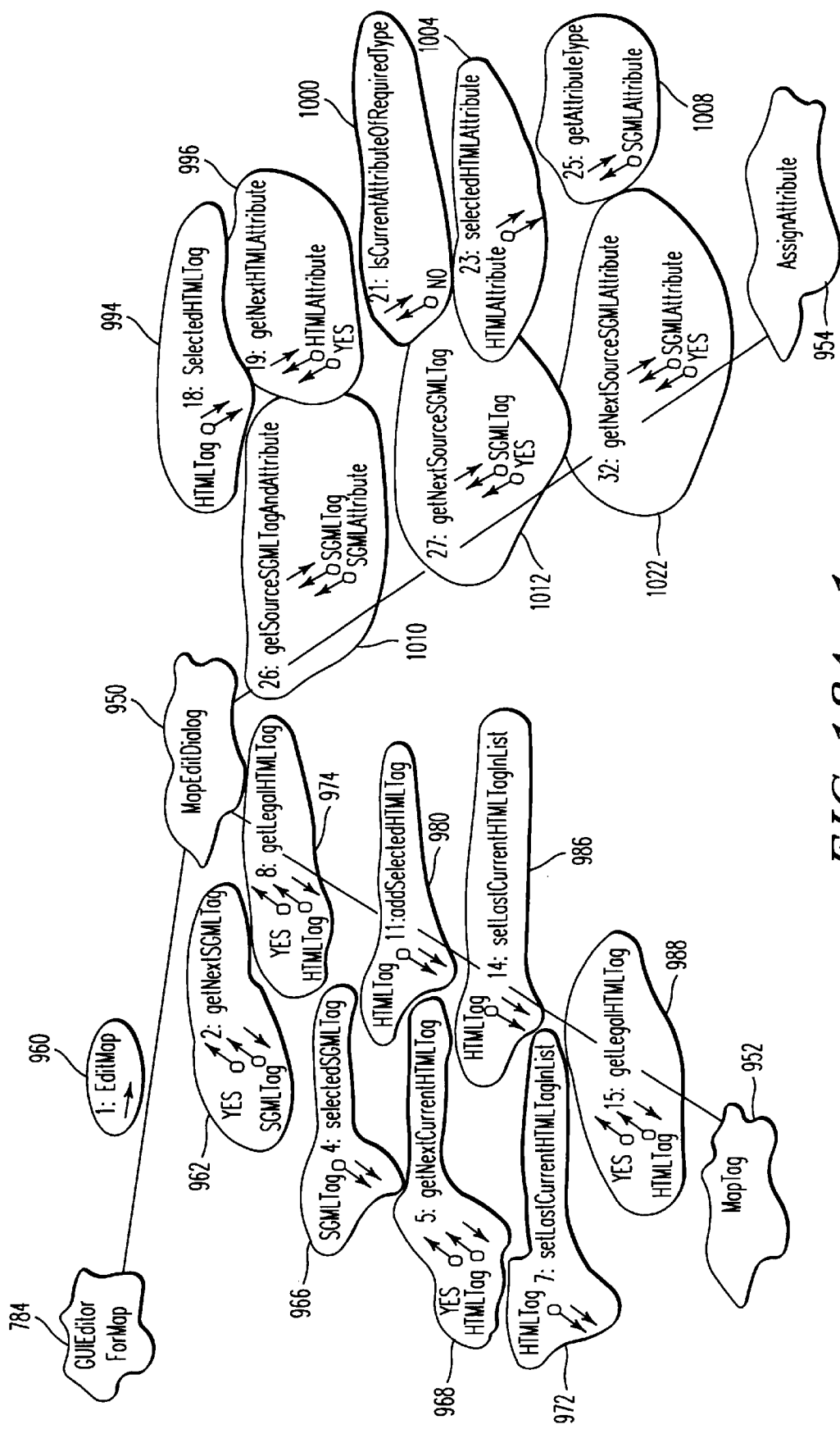
FIGS. 18A(1)–18A(3) illustrate, in object message diagram format, the behavior among the objects of the classes for editing a map for the SGML to HTML mapping and transformation.
Figures 2, 18A:
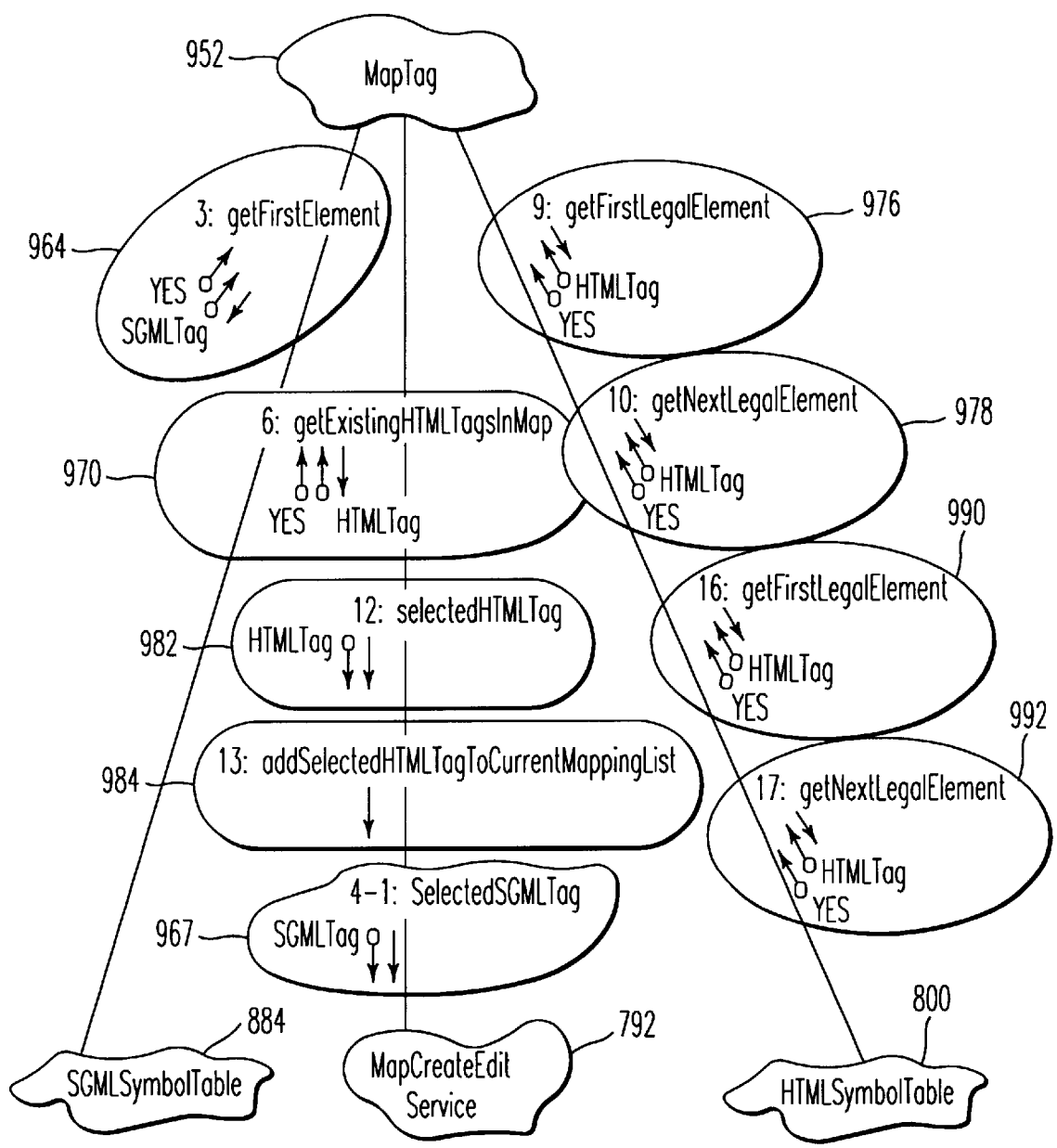
Figures 3, 18A:
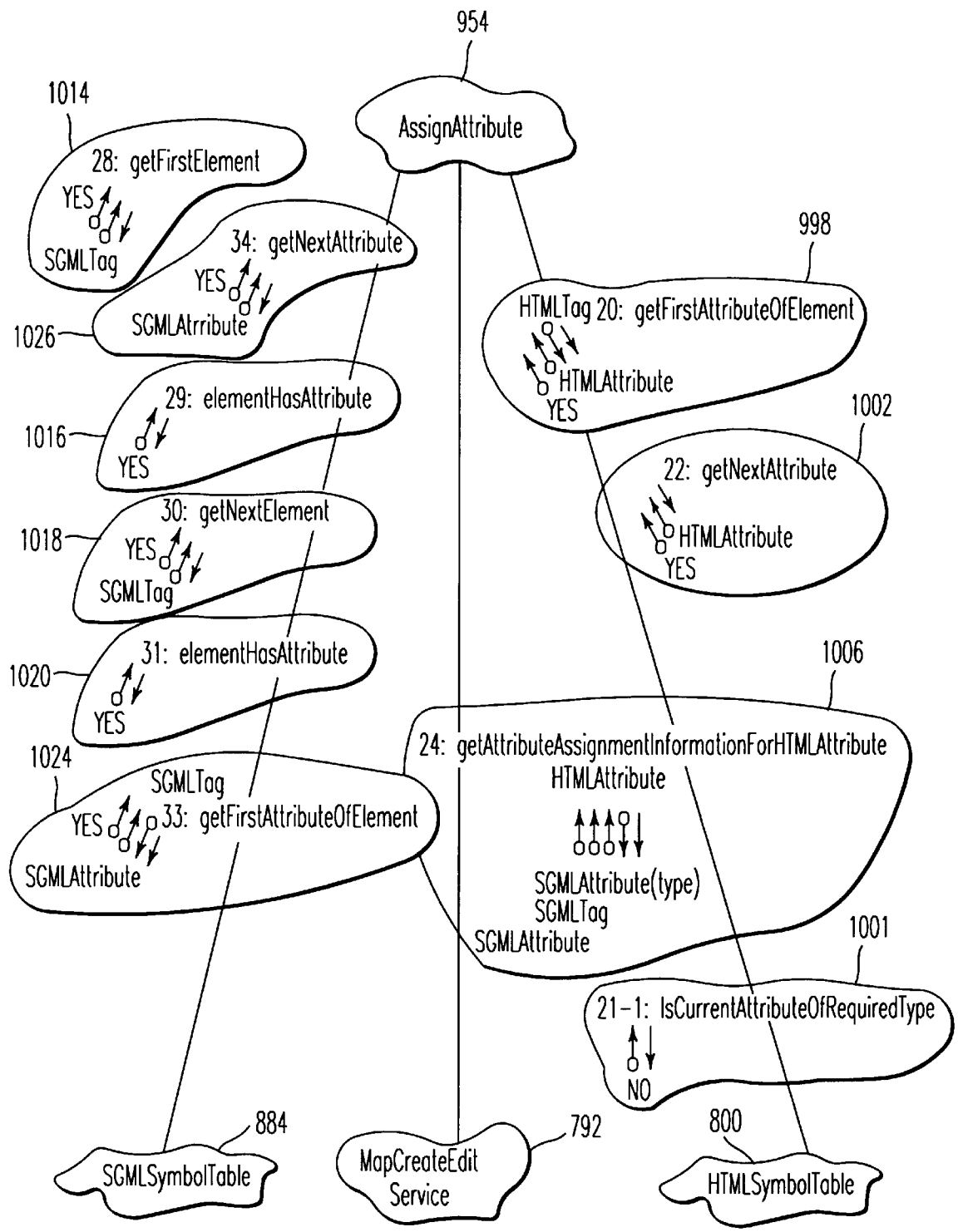

An explanation of tag attribute assignment is provided with regard to FIGS. 18A(1)–18C(3).

Figure 12C:
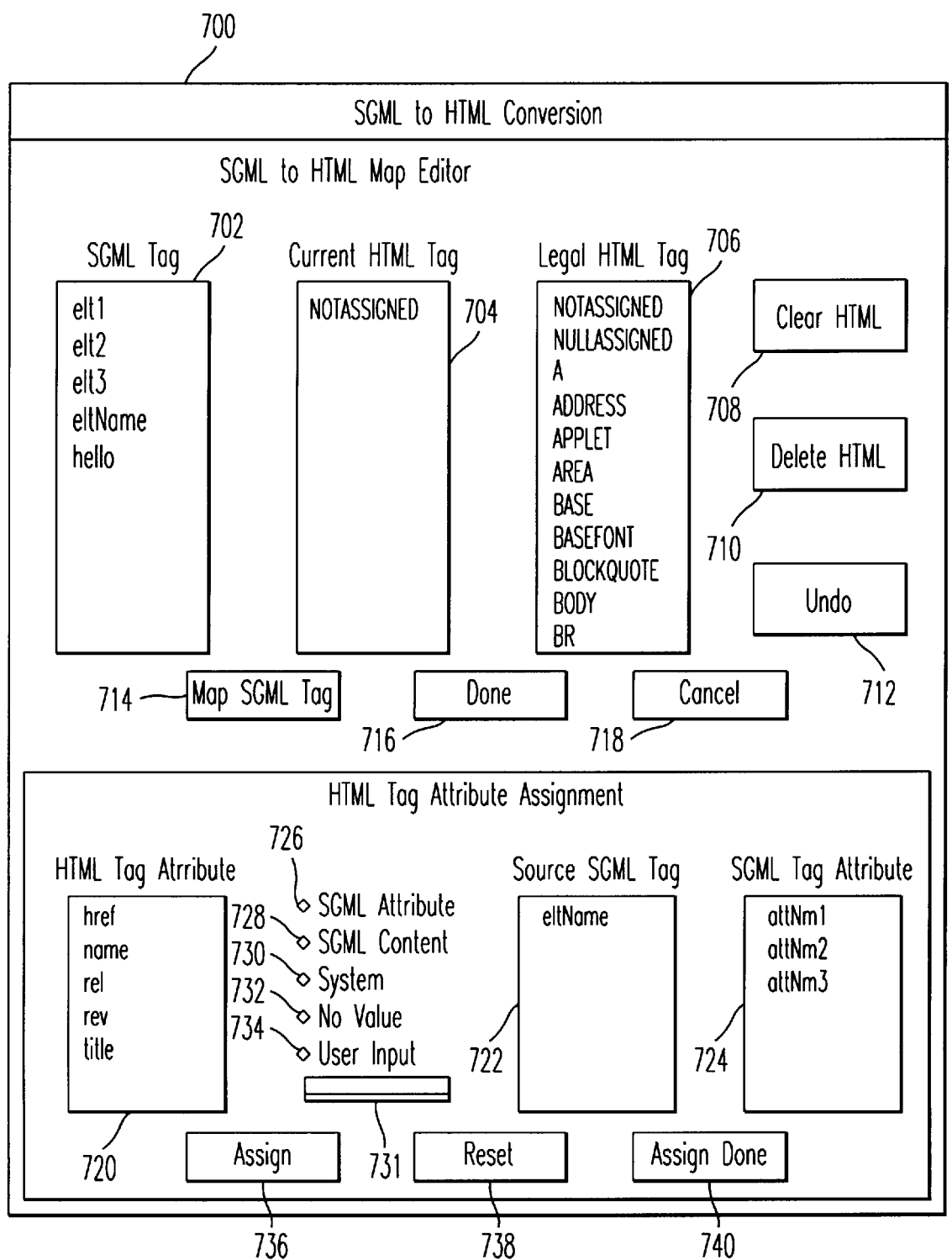
FIG. 12C illustrates an exemplary window for the SGML to HTML Map Editor with sample data displayed in exemplary dialog windows.

FIG. 12C shows exemplary data in the tag list boxes of the Map Edit dialog box 700 previously discussed for FIG. 12B. An explanation of the processing of the data is provided with regard to FIGS. 18A(1)–18C(3).

Figure 13:
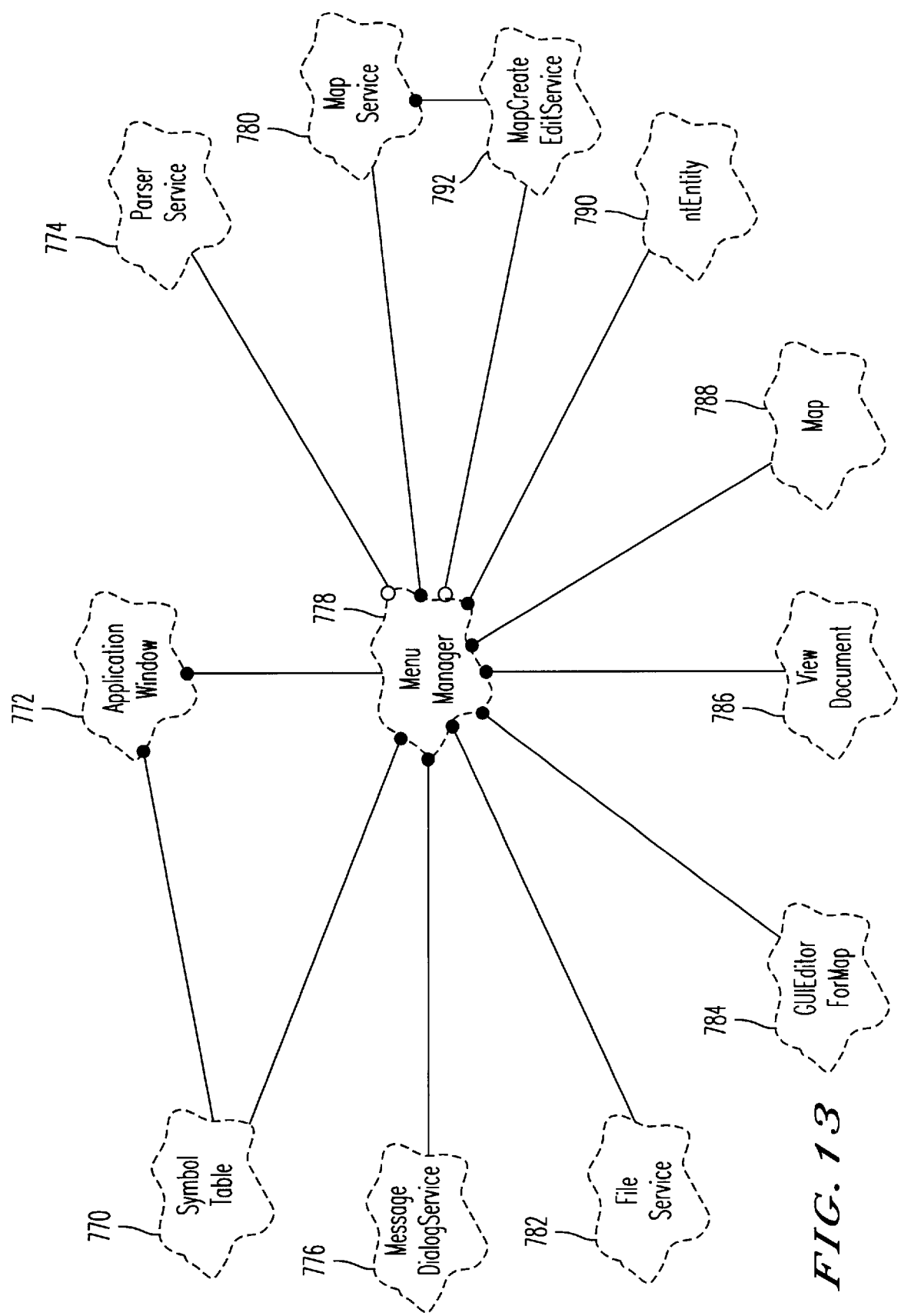
FIG. 13 illustrates a class diagram for the Menu Manager for the SGML to HTML mapping and transformation.

FIG. 13 illustrates an exemplary class diagram displaying relationships among the classes of the SGML to HTML mapping and transformation for the GUI. An Application Window 772 manages the handling of the display of the application window of the GUI. A Menu Manager 778 handles all the tasks and objects associated with menu operations. A File Service 782 handles open and save operations associated with files. An ntEntity 790 is a general system representation of an SGML document, an SGML DTD, an HTML document, or an HTML DTD. A Symbol Table 770 is the system representation of an input document after it has been processed by a Parser Service 774. A MessageDialogService 776 handles the output of messages to the system user. A View Document 786 class handles the display of SGML or HTML documents upon user request. A Map Service 780 handles the creation and editing, through a MapCreateEditService 792, of a Map 788, which is the system representation of the rules to be utilized in the transformation of an SGML document to an HTML document. A GUIEditorForMap 784 handles the GUI interface for the user to dynamically create or edit the Map 788.

Figure 14:
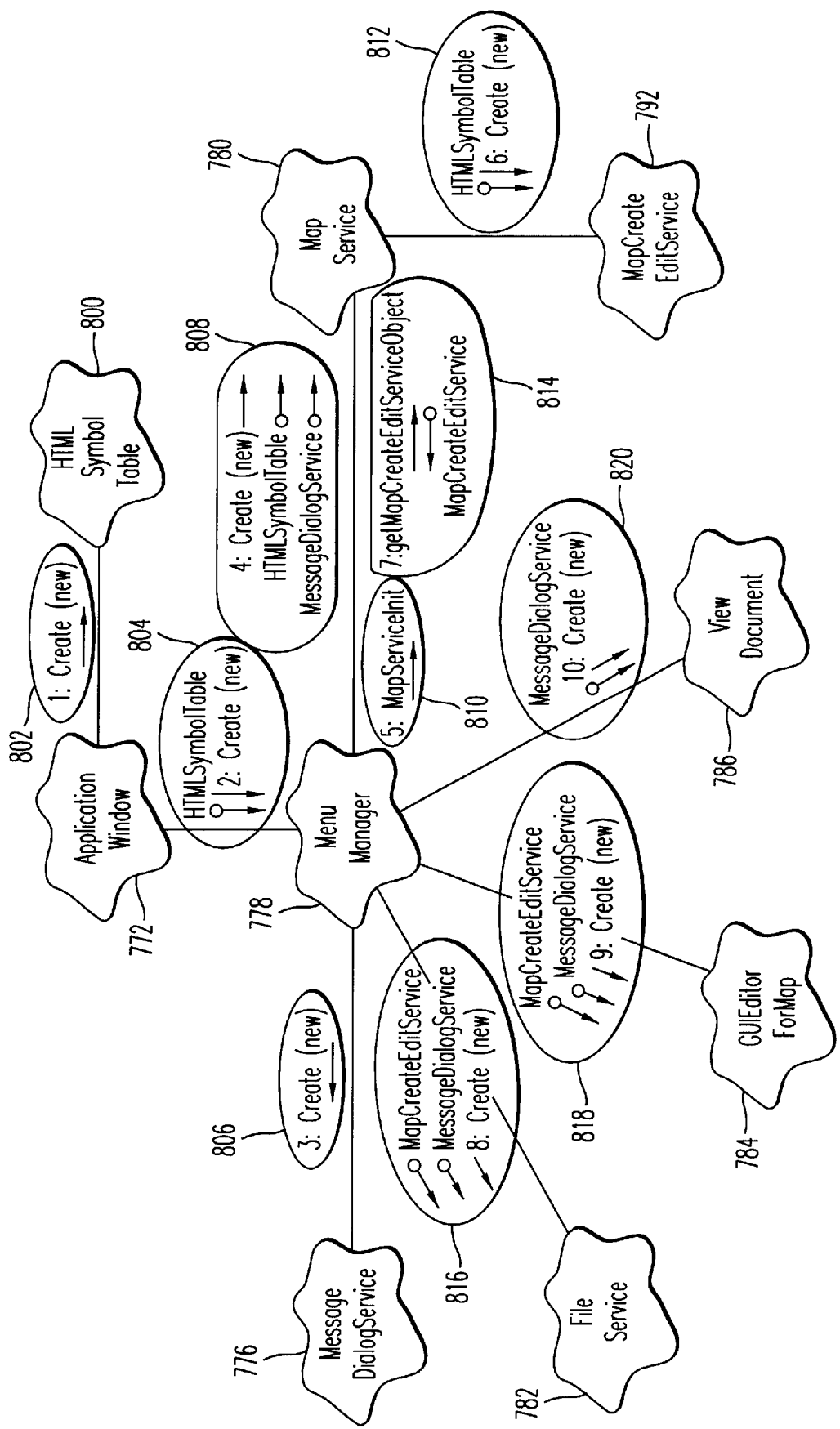
FIG. 14 illustrates an object message diagram for startup of the system of the SGML to HTML mapping and transformation.

FIG. 14 shows an object message diagram displaying the behavior of the system among objects of the classes for the startup of the system. The object diagram illustrates major software objects enclosed in cloud shapes. Object method calls are illustrated with an Arabic numeral preceding a colon, followed by the name of the object method. The numeric ordering illustrated by the Arabic numerals followed by colons illustrate a stepwise logical flow of execution, and a flow of object data and messages, through the diagram. For a more detailed description of object diagrams and design, see Booch, G., *Object-Oriented Analysis and Design with Applications*, Second Edition, Addison Wesley Longman, California, 1994, which is incorporated herein by reference.

An Application Window 772 is the object which generates the main application window of FIG. 10. It is the first object created when the system starts execution. It contains all the necessary information and functions to display the main application window of FIG. 10. An HTMLSymbolTable 800 is an object, which is the system representation of the HTML DTD, created by the Application Window 772, in a call Create (new) 802 through ParserService 774. The HTML Symbol Table 800 exists throughout the lifetime of the system. A MenuManager 778 is an object created by the Application Window 772, in a call Create (new) 804, to handle all menu operations associated with the menu of the main Application Window 772. The Application Window 772 passes the HTMLSymbolTable 800 object it created to the MenuManager 778 so that the MenuManager 778 can pass it to any other objects which require it. The MenuManager 778 creates and manages all objects necessary carry to out menu operations.

A MessageDialogService 776 is an object created by the MenuManager 778, in a call Create (new) 806, to allow message dialog boxes to display any kind of message to the user from anywhere in the system. Exemplary messages are error messages, warnings or instructions to the user, or any other type of message required. The MenuManager 778 passes the MessageDialogService 776 to other objects which may need to display messages to the user.

A MapService 780 is an object created by the MenuManager 778, in a call Create (new) 808, to handle map related objects. The MenuManager 778 initiates a call MapServiceInit 810 to initialize the state of the newly created MapService 780. For this example, a map is an object which describes how the SGML document will be transformed into an HTML document. The MenuManager 778 passes the HTMLSymbolTable 800 and the MessageDialogService 776 to the MapService 780 so that it has information about the HTML DTD and can send messages to the user.

A MapCreateEditService 792 is an object created by the MapService 780, in a call Create (new) 812, to handle the creation of a map or the modification of an existing map. The MapService 780 passes the HTMLSymbolTable 800 to the MapCreateEditService 792 so that it has information about an HTML DTD. The MenuManager 778 receives the MapCreateEditService object 792 from Map Service 780, in a call getMapCreateEditServiceObject 814, so that it may create or edit a map at any time.

A FileService 782 is an object created by the MenuManager 778, in a call Create (new) 816, to handle the tasks of opening and saving a file. The file corresponds to an SGML document, an SGML DTD, a map, or an HTML document. The user requests actions for files by selecting the File button exemplified in the menu bar 514 in FIG. 10. The File Service 782 creates an Open or Save dialog box to allow the user to choose the file the user wants to open or save, as exemplified in FIG. 11. MenuManager 778 passes MessageDialogService 776 to File Service 782 so that it may display messages to the user. The MenuManager 778 also passes the MapCreateEditService 792 to the File Service 782.

A GUIEditorForMap 784 is an object created by the MenuManager 778, in a call Create (new) 818, to handle the task of allowing the user to create a map or modify an existing map through a dialog box, as exemplified in FIGS. 12B–12C. The MenuManager 778 passes the MessageDialogService 776 to the GUIEditorForMap 784 for displaying messages to a user. The MenuManager 778 passes the MapCreateEditService 792 to GUIEditorForMap 784 to create or modify a map.

A View Document 786 is an object created by the Menu-Manager 778, in a call Create (new) 820, to handle the task of displaying an SGML or HTML document through a display window. The user requests document viewing by selecting the View button from the menu bar 514 exemplified in FIG. 10. The Menu Manager 778 passes the MessageDialogService 776 to the ViewDocument 786 so that it may display messages to the user.

Figure 15:
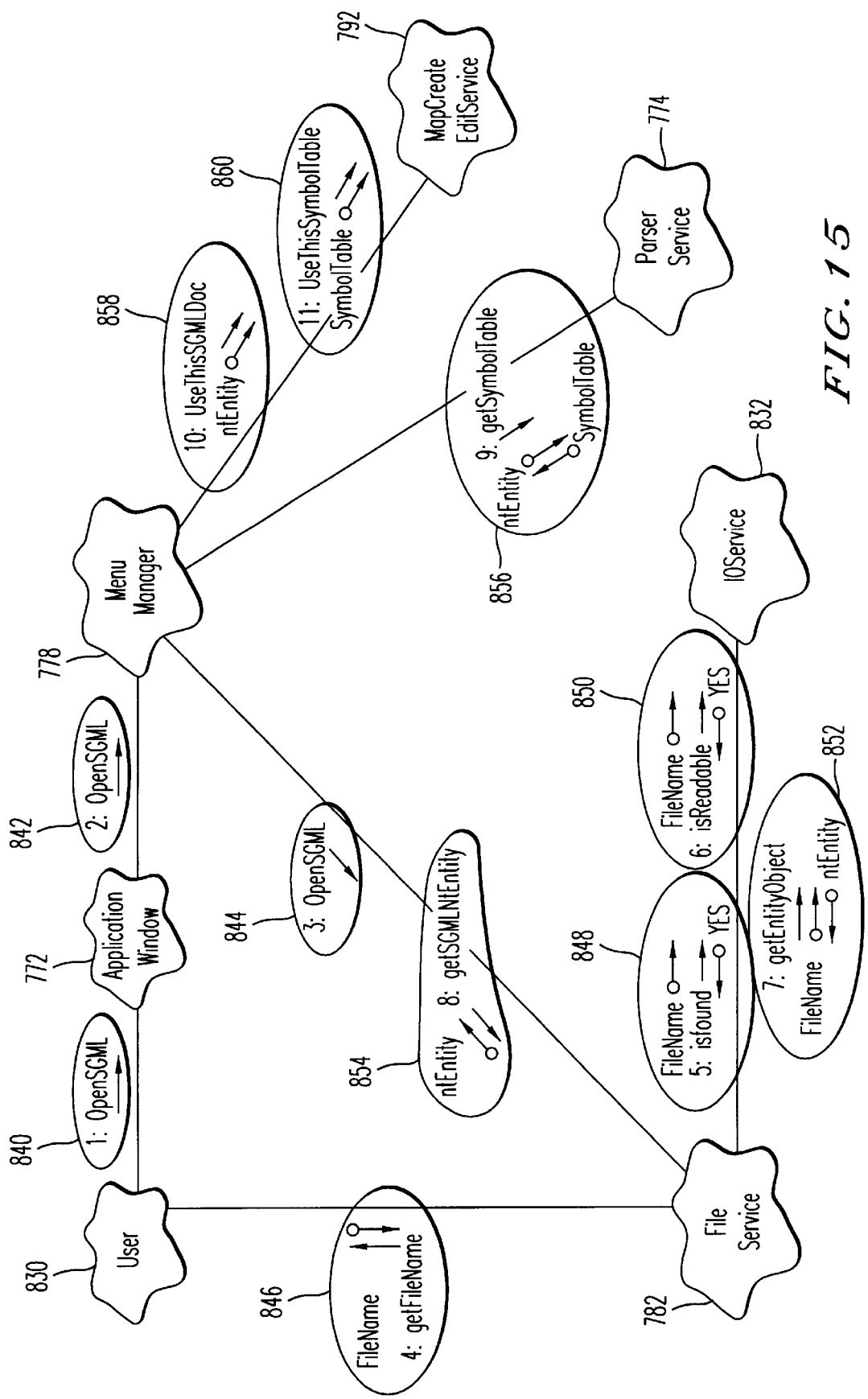
FIG. 15 illustrates an object message diagram for opening an SGML document for the first time.

FIG. 15 shows an object message diagram to display the dynamic relationships that exist among the objects of the invention when an SGML document is being opened for the first time. A User 830 requests, from an Application Window 772, opening an SGML document file using a call OpenSGML 840. This is accomplished by the user's selection of the File button in the menu bar 514 of FIG. 10, followed by selection of the Open SGML option in the. resulting submenu. The Application Window 772 sends a call OpenSGML 842 to a MenuManager 778 to process the user request. The MenuManager 778 then sends a call OpenSGML 844 to a FileService 782. The FileService 782 initiates a call getFileName 846 to request a file name for the SGML document from the User 830. A User 830 response, a FileName 846, is returned to the FileService 782. The FileService 782 sends a request isFound 848, accompanied by a FileName 848, to an IOService 832 to determine, by a response YES 848, that the FileName 846 returned by the User 830 exists. The FileService 782 then sends a request isReadable 850, accompanied by a FileName 850, to the IOService 832 to determine, by a response YES 850, that the file is also readable by the system. The FileService 782 then sends a request getEntityObject 852 to IOService 832, accompanied by the FileName 852, so that IOService 832 may obtain and return an ntEntity 852, which is associated with an external entity such as an SGML document, and its corresponding DTD, requested by the User 830.

The MenuManager 778 sends a request getSGMLNtEntity 854 to the FileService 782 to receive the ntEntity 854 from the FileService 782. The MenuManager 778 then sends the ntEntity 856 to a Parser Service 774 with a call getSymbolTable 856. The Parser Service 774 then generates a SymbolTable 856 for the SGML document, checks that it is a valid symbol table for the SGML document, and returns the SymbolTable 856 to the MenuManager 778. The MenuManager 778 then sends the ntEntity 858 to a MapCreateEditService 792 using a call useThisSGMLDoc 858, and sends the SymbolTable 860 to the MapCreateEditService 792 using a call UseThisSymbolTable 860. The MapCreateEditService 792 then handles further processing of the requested document.

Figure 16:
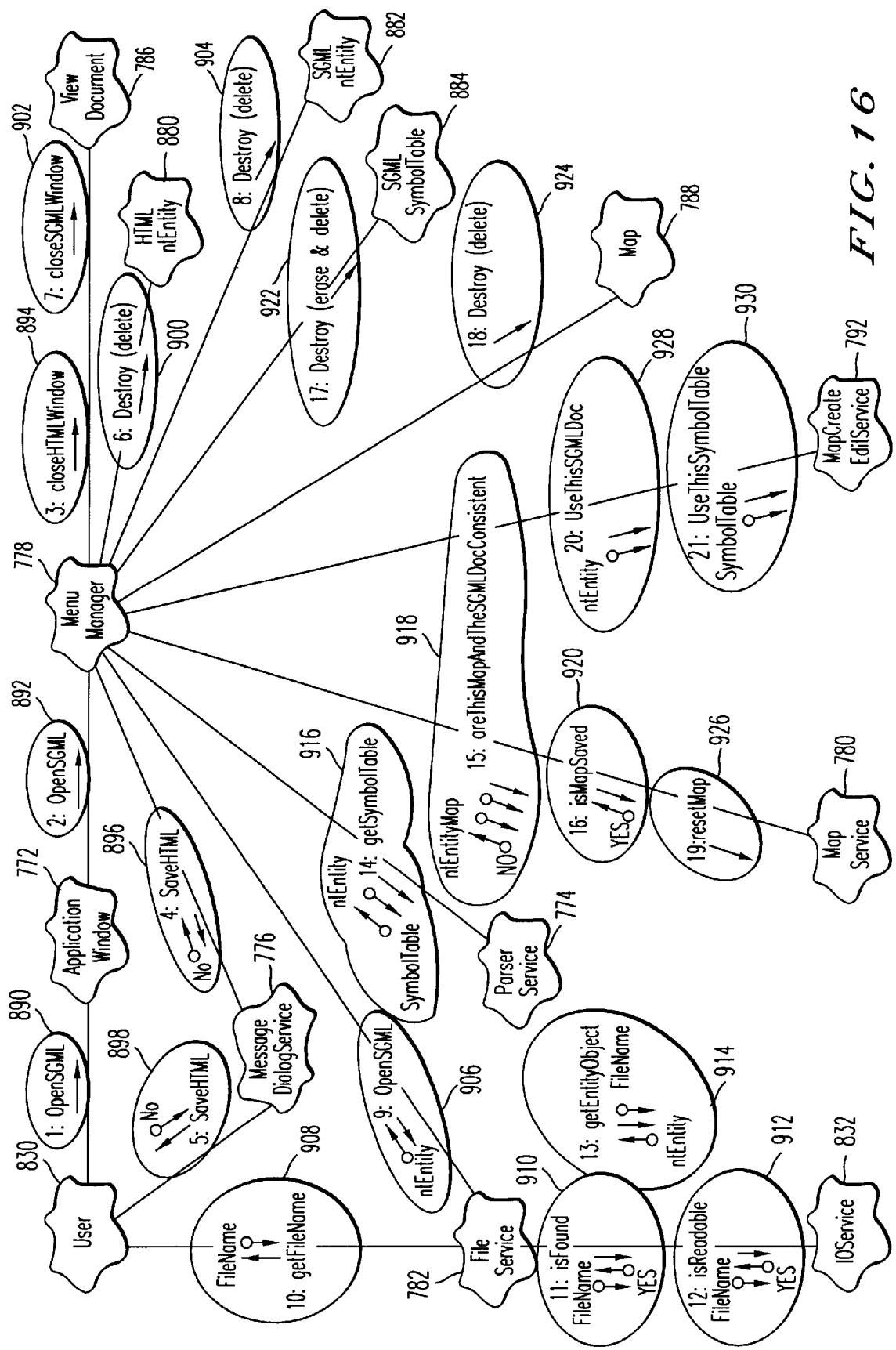
FIG. 16 illustrates an object message diagram for opening a new SGML document.

FIG. 16 shows an object message diagram to display the dynamic relationships that exist among the objects of the invention as an SGML document as being opened, with an existing SGML document already opened. A User 830 requests, from an Application Window 772, opening an SGML document file by a call OpenSGML 890. This is accomplished by the user's selection of the File button in the menu bar 514 of FIG. 10, followed by selection of the Open SGML option in the resulting sub-menu. The Application Window 772 sends a call OpenSGML 892 to a MenuManager 778 to process the user request. The MenuManager 778 then sends a call closeHTMLWindow 894 to a ViewDocument 786 so that if there is an open window displaying an HTML document, it will be closed. If there is an HTML document that has not been saved, the MenuManager 778 sends a request SaveHTML 896 to a MessageDialogService 776. The MessageDialogService 776 then sends a request SaveHTML 898 to the User 830 as a message asking if the user wishes to save the currently displayed HTML file. A User 830 response of NO 898 is returned to the MessageDialogService 776, which then returns a NO 896 to the MenuManager 778. The MenuManager 778 then sends a call Destroy(delete) 900 to an HTMLntEntity 880, representing the HTML file. The MenuManager 778 then sends a call closeSGMLWindow 902 to the ViewDocument 786 for the ViewDocument 786 to process closing of the display window of an opened SGML document. The MenuManager 778 then sends a call Destroy(delete) 904 to an SGML ntEntity 882, representing an opened SGML file. The MenuManager then sends a call OpenSGML 906 to a FileService 782. The FileService 782 initiates a call getFileName 908 to request a file name for the SGML document from the User 830. The User 830 response, a FileName 908, is returned to the FileService 782. The FileService 782 sends a request isFound 910, accompanied by a FileName 910, to an IOService 832 to determine, via a response YES 910, that the FileName 908 returned by the User 830 exists. The FileService 782 then sends a request isReadable 912, accompanied by a FileName 912, to the IOService 832 to determine, by a response YES 912, that the file is also readable by the system. The FileService 782 then sends a request getEntityObject 914, accompanied by a FileName 914, to the IOService 832, so that the IOService 832 may obtain and return an ntEntity 914. The ntEntity 906 is then returned to the MenuManager 778 in response to the request OpenSGML 906.

The MenuManager 778 then sends an ntEntity 916 to a Parser Service 774 with a call getSymbolTable 916. The Parser Service 774 then generates a SymbolTable 916 for the SGML document and DTD and returns the SymbolTable 916 to the MenuManager 778. The MenuManager 778 then sends an ntEntity 918 and a Map 913 to a MapService 780 using a call areThisMapAndTheSGMLDocConsistent 918, to determine if the existing Map 918 can be used with the new SGML document, ntEntity 918. A response NO 918 is returned to the MenuManager 778 if the Map 918 cannot be used. The MenuManager 778 then sends a request isMapSaved 920 to the MapService 780, to receive a response of YES 920, if the Map 918 is saved. The MenuManager 778 then sends a call destroy(erase & delete) 922 to an SGMLSymbolTable 884, to destroy the system's current SGML file represented in the format of a symbol table. The MenuManager 778 then sends a call Destroy (delete) 924 to a Map 788 to destroy the system's current map for a previous SGML document. The MenuManager 778 then sends a call resetMap 926 to the MapService 780 to initialize a new map for the new SGML document to be processed. The MenuManager 778 then sends a call useThisSGMLDoc 928 to a MapCreateEditService 792, sending an ntEntity 928 obtained from IOService 832. The MenuManager 778 then sends a call UseThisSymbolTable 930, along with a SymbolTable 930 obtained from ParserService 774, to the MapCreateEditService 792. The MapCreateEditService 792 then handles further processing of the requested SGML document.

Figure 17:
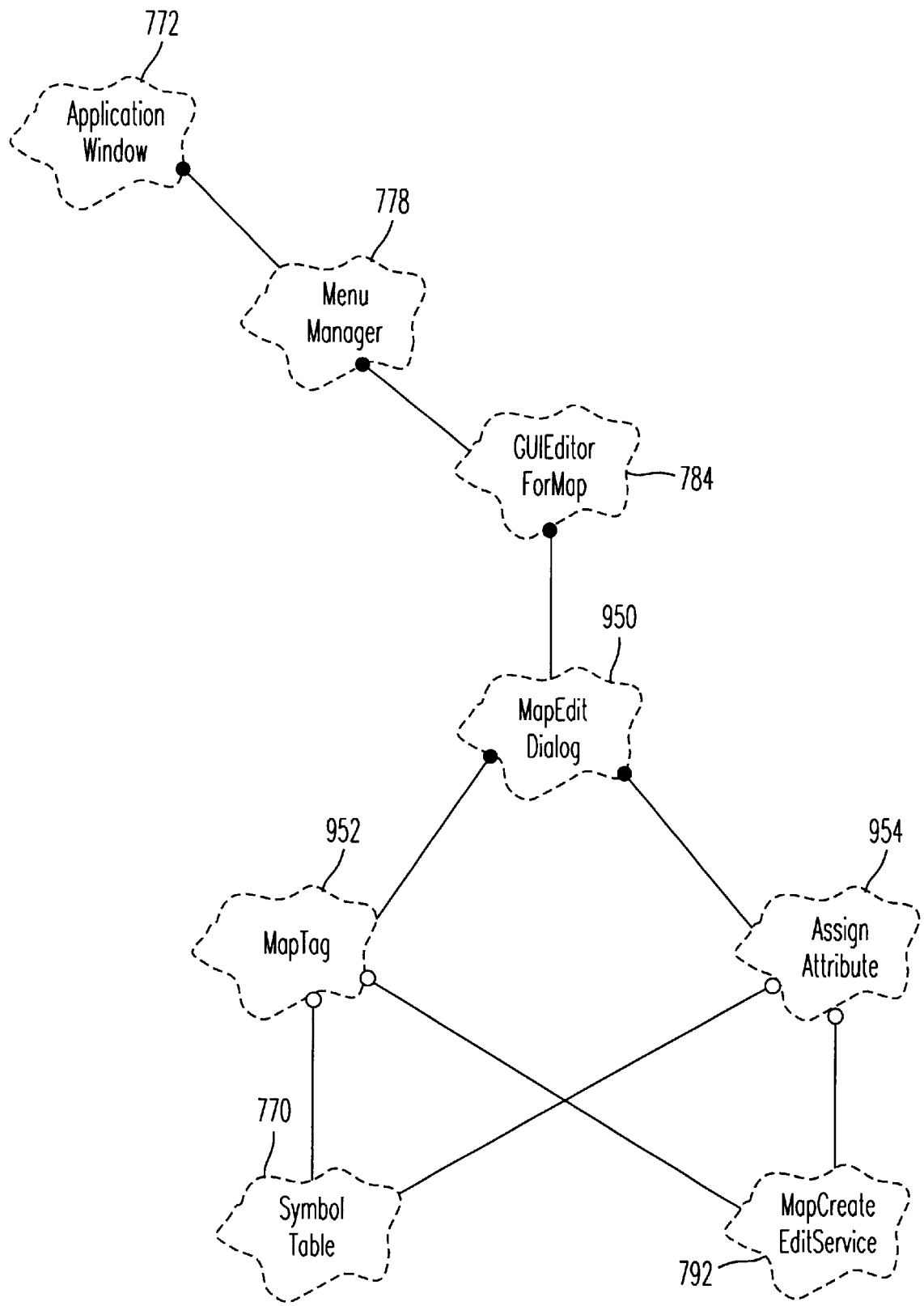
FIG. 17 illustrates the design of the GUI (Graphical User Interface) for the SGML to HTML mapping and transformation.

FIG. 17 illustrates, in a class diagram format, the design of the Map Editor GUI. The Application Window 772, the MenuManager 778, the GUIEditorForMap 784, the SymbolTable 770, and the MapCreateEditService 792 have been described previously with regard to FIGS. 13–15. In FIG. 17, a MapEditDialog 950 is contained by the GUIEditorForMap 784. The MapEditDialog 950 manages the handling of the display of the Map Edit dialog box. This includes determining what type of operation or requests the user can perform at a given point in the mapping of an SGML element. A MapTag 952 interacts with MapCreateEditService 792 and SymbolTable 770 to handle tasks and objects associated with mapping an SGML element to an HTML element. An AssignAttribute 954 interacts with MapCreateEditService 792 and SymbolTable 770 to handle tasks and objects associated with assigning values to the attributes of HTML elements.

FIGS. 18A(1)–18C(3) are object message diagrams showing the behavior of the SGML to HTML mapping for assigning values to HTML attributes and for mapping SGML tags to HTML tags. As the object diagram of FIGS. 18A(1)–18C(3) was large, it was divided over a plurality of drawing sheets. However, these drawing sheets, when taken together, constitute one object diagram. The MapEditDialog 950, the MapTag 952, the AssignAttribute 954, and the MapCreateEditService 792 have been described previously with regard to FIG. 17. The GUIEditorForMap 784 has been described previously with regard to FIG. 13. The HTMLSymbolTable 800 has been described previously with regard to FIG. 14. The SGMLSymbolTable 884 has been described previously with regard to FIG. 16.

As an exemplary manner of operating, the GUIEditorForMap 784 of FIG. 18A(1) creates the Map Edit dialog box of FIG. 12B by a function call EditMap 960 to call a constructor of the MapEditDialog 950.

To fill the SGML Tag list box 702 of FIG. 12B, MapEditDialog 950 gets a first SGMLTag 962, with a YES message 962, from MapTag 952 through a function getNextSGMLTag 962, and displays the SGML tag in the SGML Tag list box 702 of FIG. 12B. MapTag 952 gets a first SGMLTag 964 of FIG. 18A(2), with a YES message 964, from the SGMLSymbolTable 884 through a function call getFirstElement 964. An alternative GUI design is to keep a list of all SGML tags already processed in the display.

The user selects an SGML tag to map by double clicking the mouse on the SGML tag in the SGML Tag list box 702 of FIG. 12B and the SGMLTag 966 of FIG. 18A(1) is sent to MapTag 952 through a function call selectedSGMLTag 966 of FIG. 18A(1). MapTag 952 of FIG. 18A(2) sends the SGMLTag 967 to MapCreateEditService 792 of FIG. 18A(2) through a function call selectedSGMLTag 967 of FIG. 18A(2).

To fill the Current HTML Tag list box 704 of FIG. 12B, the MapEditDialog 950 box of FIG. 18A(1) then gets an HTMLTag 968, with a YES message 968, to which the selected SGML tag maps, from MapTag 952 through a function call getNextCurrentHTMLTag 968. The function will get one HTMLTag 968 at a time and display it in the Current HTML Tag list box 704 of FIG. 12B. MapTag 952 of FIG. 18A(2) gets a next HTMLTag 970, along with a YES message 970, from the MapCreateEditService 792 using a function call getExistingHTMLTagsinMap 970. If an SGML tag is being assigned for the first time, NOT ASSIGNED will be displayed in the Current HTML Tag list box 704 of FIG. 12B.

To fill the Legal HTML Tag list box 706 of FIG. 12B, the MapEditDialog 950 box of FIG. 18A(1) sends a last HTML tag 972 in the Current HTML Tag list box 704 of FIG. 12B to MapTag 952 through a function call setLastCurrentHTMLTagInList 972. Then the MapEditDialog 950 box gets legal HTMLTags 974, along with a YES message 974, through a function call getLegalHTMLTag 974 from MapTag 952. The function will get one HTMLTag 974 at a time and display it in the Legal HTML Tag list box 706 of FIG. 12B. The legal HTML tags are those which can follow the last HTML tag in the current HTML Tag list box 704 of FIG. 12B. In FIG. 18A(2), the MapTag 952 gets legal HTMLTags 976, along with a YES message 976, one at a time, from HTMLSymbolTable 800, through a function call getFirstLegalElement 976, or MapTag 952 will get legal HTMLTags 978, along with a YES message 978, from HTMLSymbolTable 800 through a function call GetNextLegalElement 978.

To add an HTML tag from the Legal HTML Tag list box 706 of FIG. 12B to the Current HTML Tag list box 704 of FIG. 12B, the user selects an HTML tag from the Legal HTML Tag list box 706 of FIG. 12B by double clicking the mouse on the HTML tag. The HTML tag is added to the Current HTML Tag list box 704. The selected HTMLTag 980 of FIG. 18A(1) is sent to MapTag 952 through a function call addSelectedHTMLTag 980. In FIG. 18A(2), MapTag 952 sends an HTMLTag 982 to MapCreateEditService 792 through a function call selectedHTMLTag 982. MapTag 952 informs MapCreateEditService 792 that the HTMLTag 982 must he added to the current map through a function call addSelectedHTMLTagToCurrentMappingList 984. MapEditDialog 950 of FIG. 18A(1) sets an HTML tag 986 as the last tag in the list by a function call setLastCurrentHTMLTagInList 986 to MapTag 952.

In order to update the list of Legal HTML Tags 706 of FIG. 12B, MapEditDialog 950 of FIG. 18A(1) obtains an HTMLTag 988, with a YES message 988 if there exists a legal tag, from MapTag 952 using a function call getLegalHTMLTag 988. MapTag 952 then obtains an HTMLTag 990, with a YES message 990, from HTMLSymbolTable 800 using a function call getFirstLegalElement 990, if it is the first legal element requested, or MapTag 952 obtains an HTMLTag 992, with a YES message 992, from HTMLSymbolTable 800 using a function call getNextLegalElement 992, if it is not the first legal element requested.

To fill the HTML Tag Attribute list box 720 of FIG. 12B, MapEditDialog 950 of FIG. 18A(1)sends an HTMLTag 994 in the Current HTML Tag list box 704 of FIG. 12B to AssignAttribute 954 through a function call selectedHTMLTag 994. Then the MapEditDialog 950 gets attributes of the HTML tag, HTMLAttribute 996, along with a YES message 996, from AssignAttribute 954 through a function call getNextHTMLAttribute 996. The function getNextHTMLAttribute 996 gets one HTMLAttribute 996 at a time and displays them in the HTML Tag Attribute list box 720 of FIG. 12B. AssignAttribute 954 of FIG. 18A(3) gets an HTMLAttribute 998, along with a YES message 998, of the HTMLTag 998 from HTMLSymbolTable 800 through a function call getFirstAttributeOfElement 998. If it is not the first attribute, AssignAttribute 954 gets one at a time an HTMLAttribute 1002 of the HTMLTag 998, along with a YES message 1002, from HTMLSymbolTable 800 through a function call getNextAttribute 1002. For each attribute AssignAttribute 954 gets from HTMLSymbolTable 800, and returns to MapEditDialog 950 of FIG. 18A(1), MapEditDialog 950 checks with AssignAttribute 954 to see if the attribute is of the required type through a function call IsCurrentAttributeOfRequiredType 1000, with a NO message 1000 indicating it is not, to be obtained from HTMLSymbolTable 800. AssignAttribute 954 of FIG. 18A(3) then checks with HTMLSymbolTable 800 to see if the attribute is of the required type through a function call IsCurrentAttributeOfRequiredType 1001, with a NO message 1001 indicating it is not.

Figures 1, 18B:
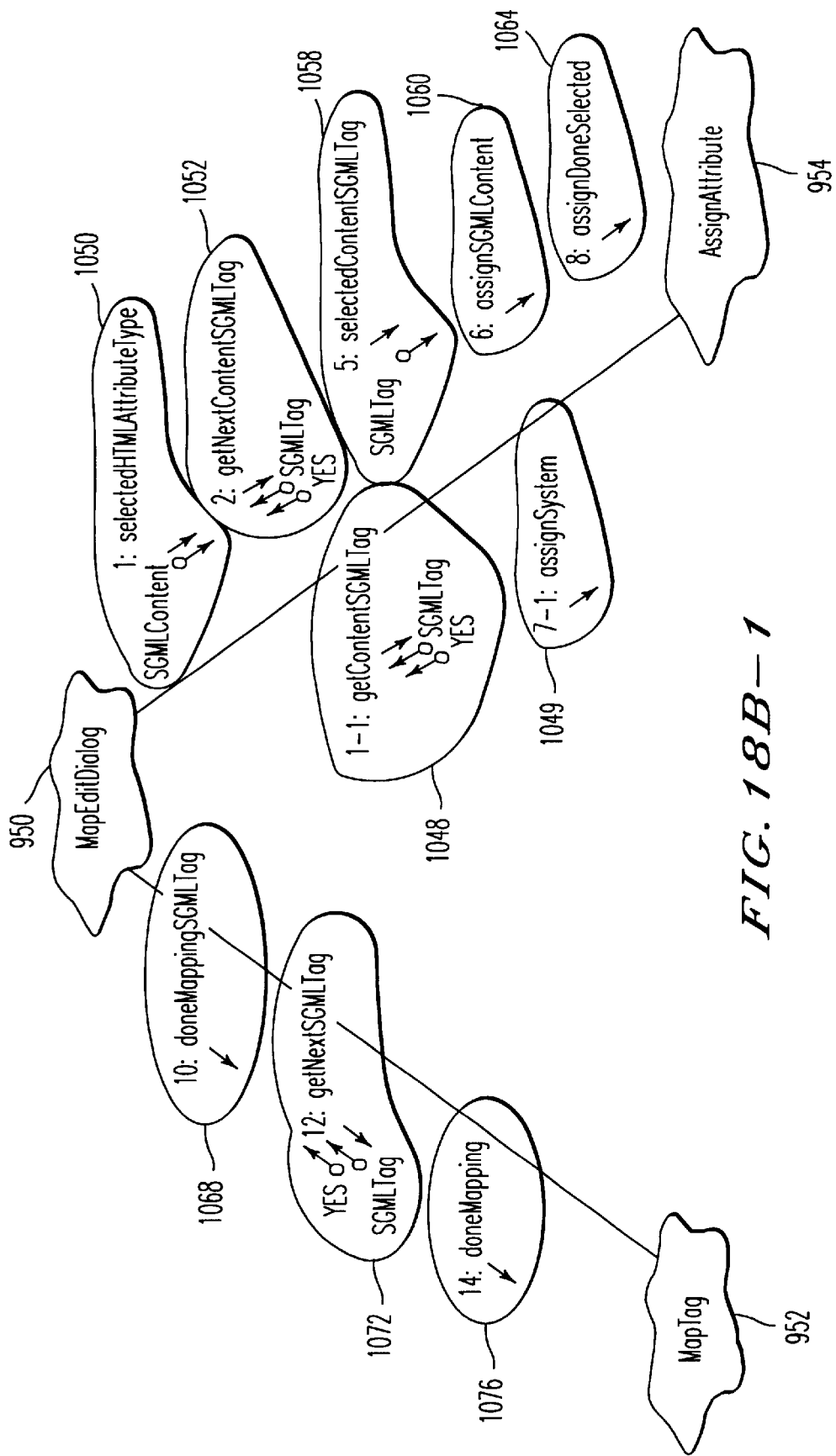
FIGS. 18B(1)–18C(3) illustrate, in object message diagram format, the behavior of the objects of the classes for assigning values to HTML attributes.
Figures 2, 18B:
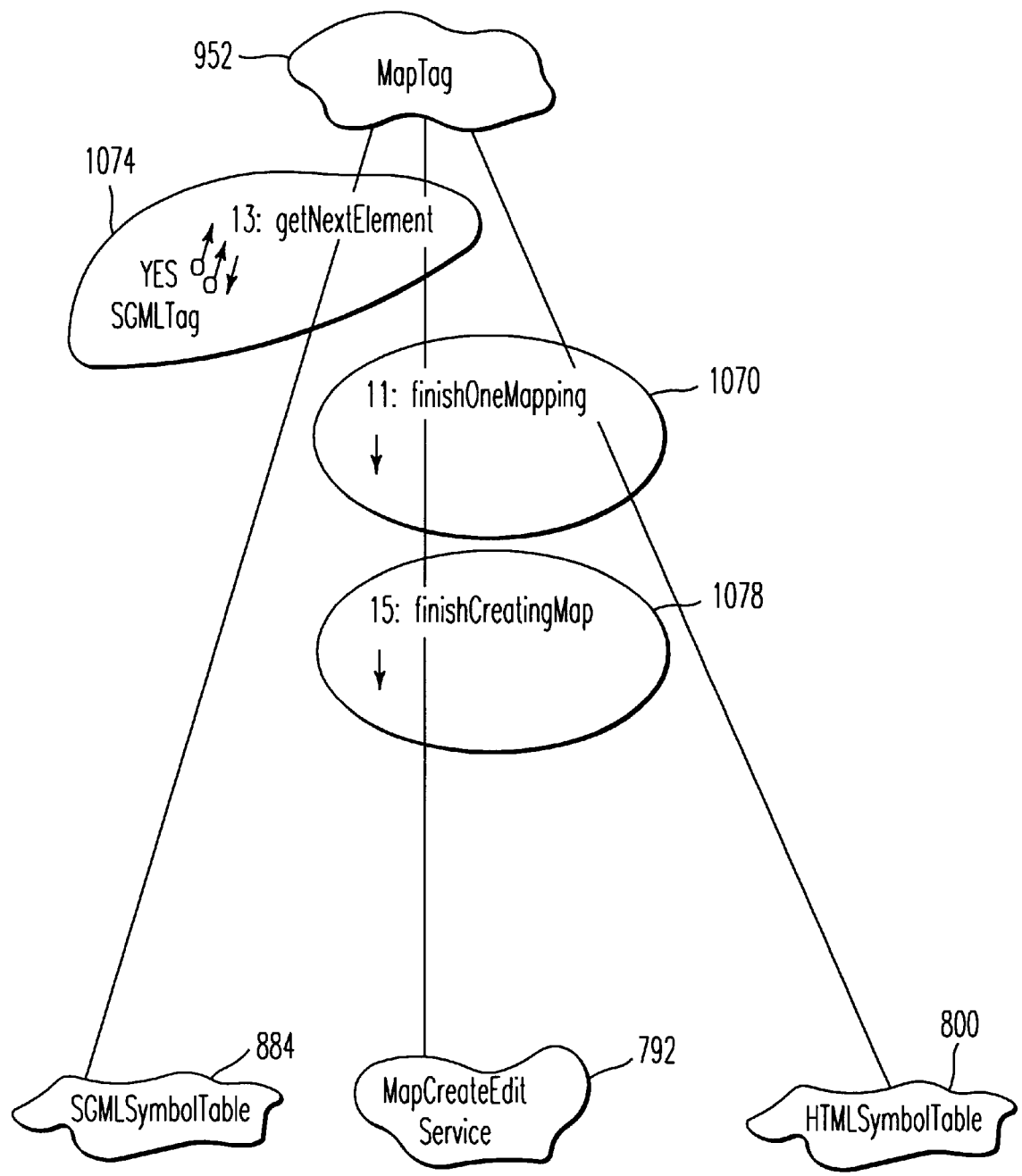
Figures 3, 18B:
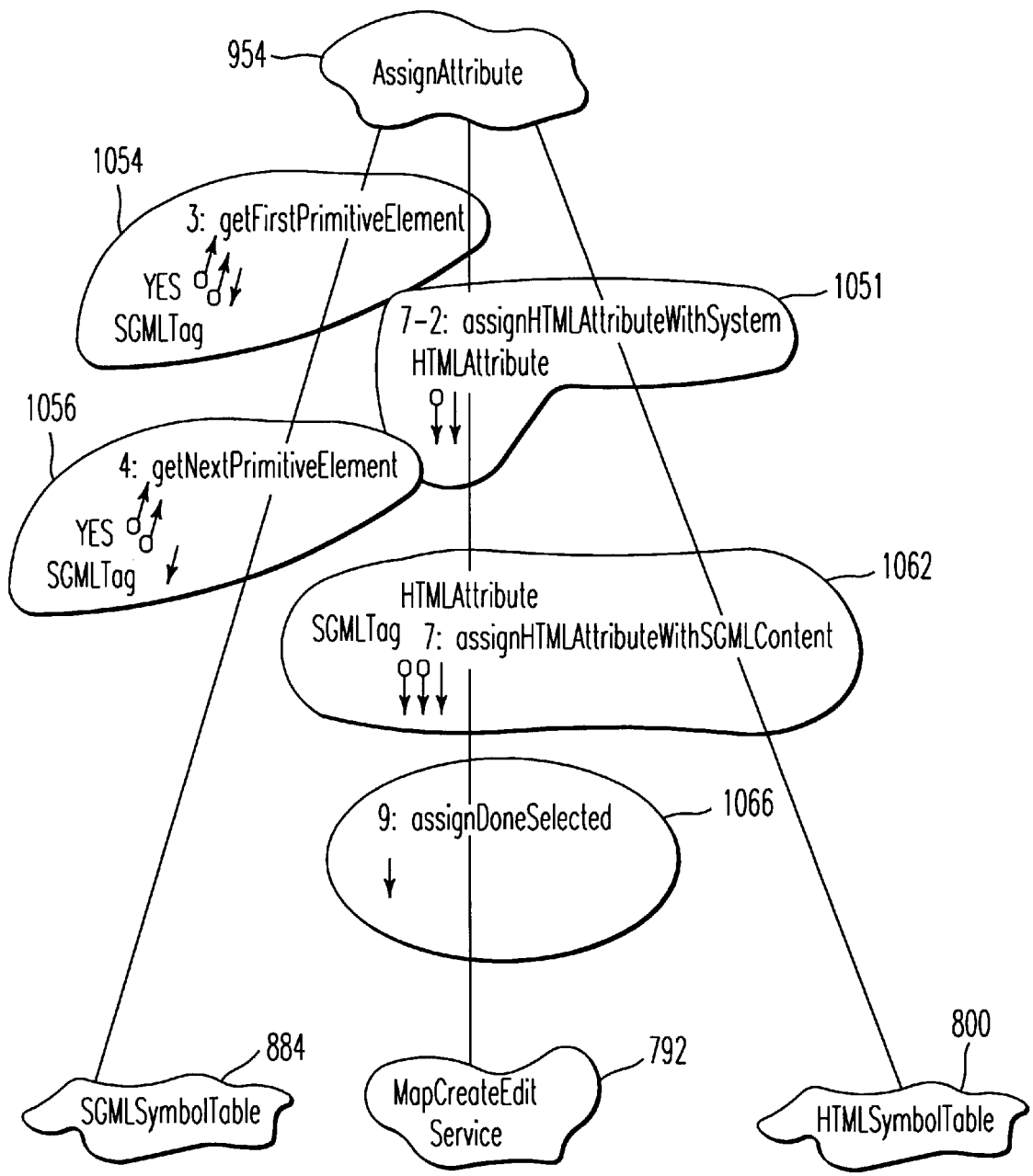
Figures 1, 18C:
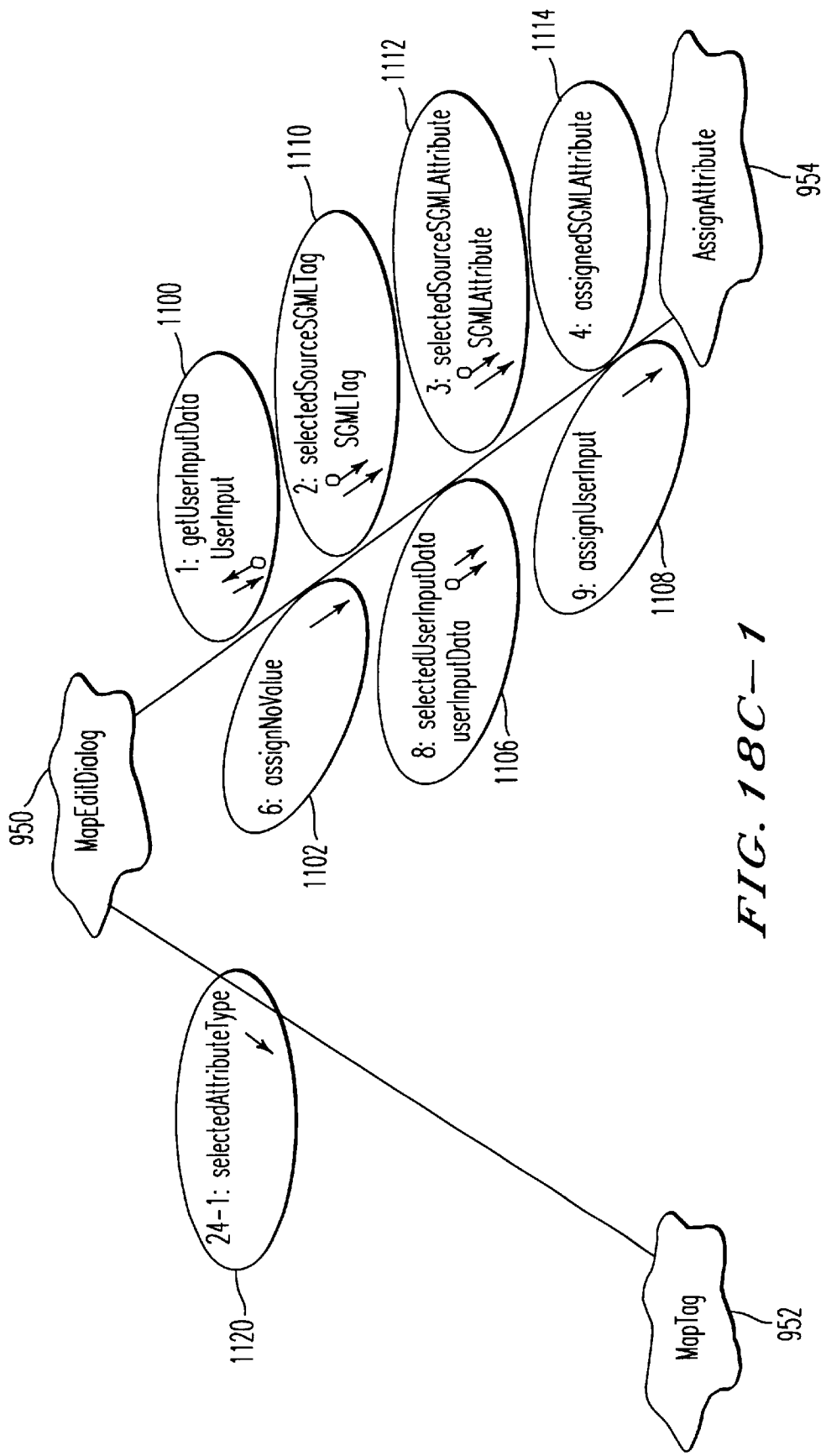
FIG. 1A illustrates an exemplary Standard Generalized Markup Language ("SGML") Document Type Definition ("DTD")
FIG. 1B illustrates an exemplary mapping of SGML to HyperText Markup Language ("HTML")
FIG. 1C illustrates an exemplary SGML document.
FIG. 1D illustrates an exemplary HTML document output from a transformation of the SGML document.
Figures 2, 18C:
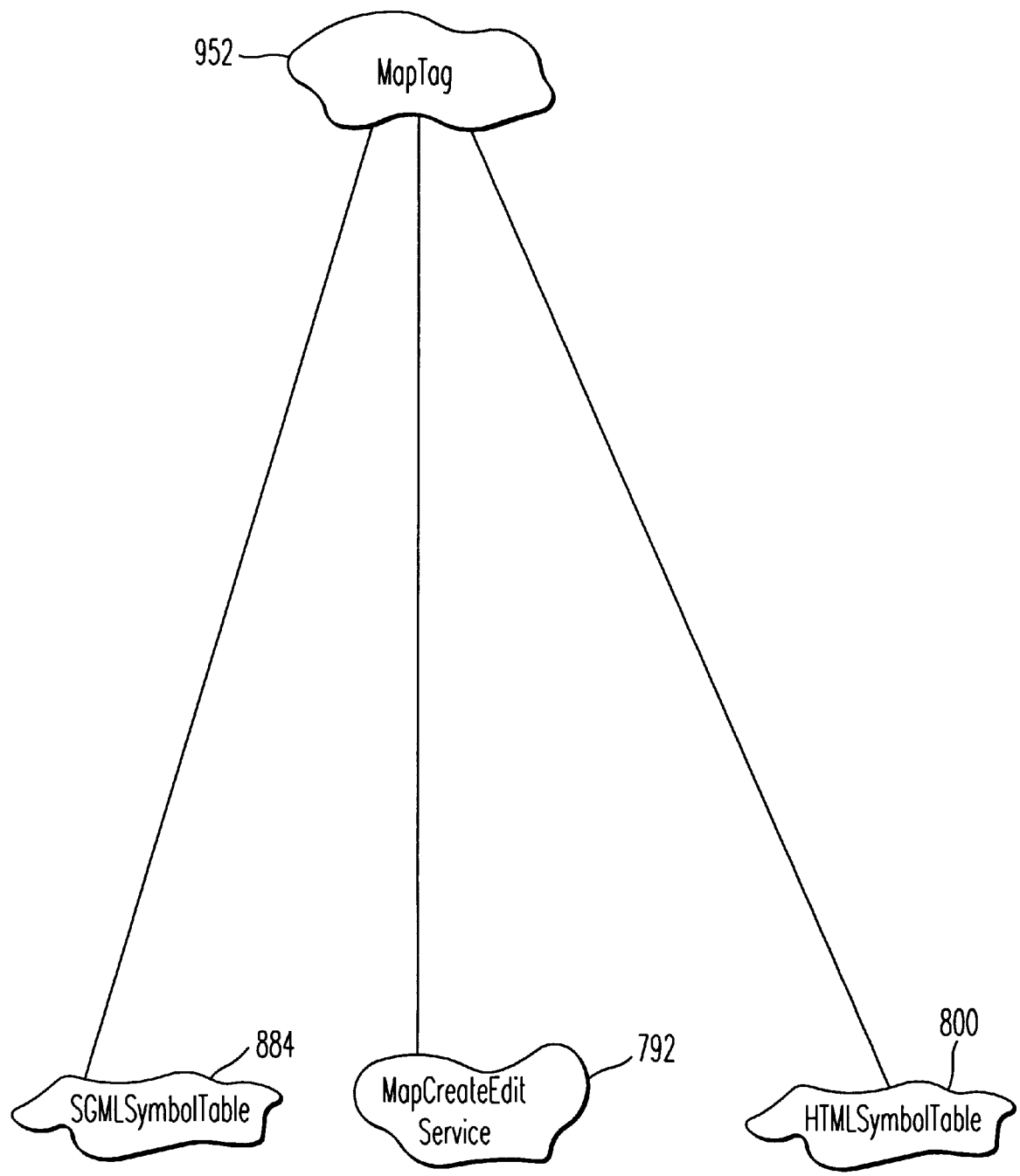
Figures 3, 18C:
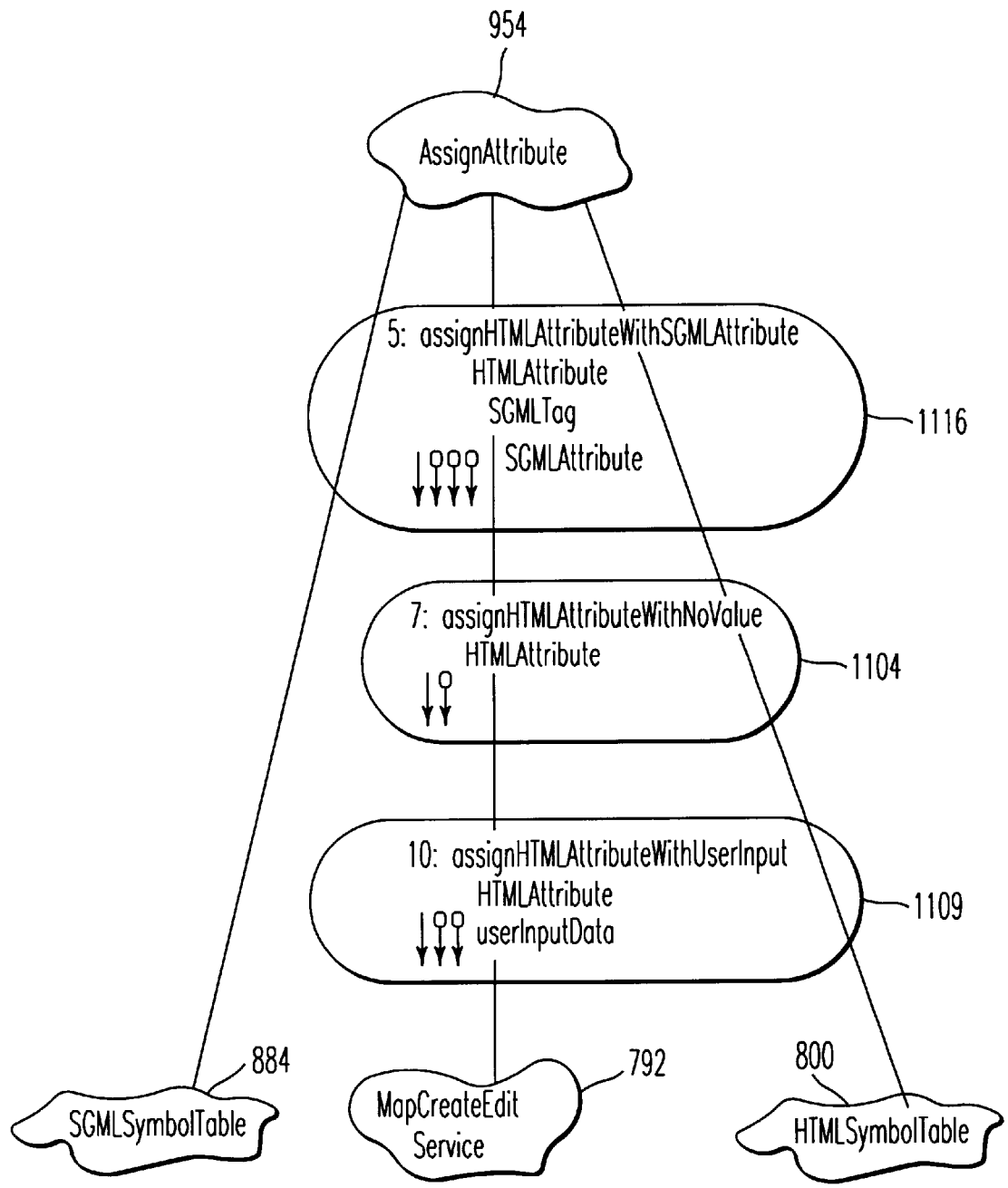

To select an attribute to assign it a value, the user selects an attribute in the HTML Tag Attribute list box 720 of FIG. 12B by double clicking the mouse on the attribute. The MapEditDialog box 950 of FIG. 18A(1) sends a selected HTMLAttribute 1004 to AssignAttribute 954 through a function call selectedHTMLAttribute 1004. Depending upon the attribute type to which the HTMLAttribute 1006 is assigned, the MapEditDialog box 950 of FIG. 18A(1) will take different actions. For example, AssignAttribute 954 of FIG. 18A(3) gets an SGMLAttribute type 1006, an SGMLTag 1006, and an SGMLAttribute 1006 by sending an HTMLAttribute 1006 to MapCreateEditService 792 using a function call getAttributeAssignmentInformationForHTMLAttribute 1006. The MapEditDialog 950 box of FIG. 18A(1) gets an SGMLAttribute type 1008 for the selected HTMLAttribute 1004 from AssignAttribute 954 through a function call getAttributeType 1008. The SGML Attribute radio button 726 of FIG. 12B is displayed depressed. The MapEditDialog 950 of FIG. 18A(1)gets a source SGMLTag 1010 and a source SGMLAttribute 1010 assigned to the HTMLAttribute 1004 through a function call getSourceSGMLTagAndAttribute 1010 and displays them in the Source SGML Tag list box 722 of FIG. 12B, and the SGML Tag Attribute list box 724 of FIG. 12B. Next, the MapEditDialog 950 gets a source SGMLTag 1012, one SGMLTag 1012 at a time, which can be assigned to the HTML attribute 1004, along with a YES message 1012, from AssignAttribute 954 through a function call getNextSourceSGMLTag 1012, and displays them in the Source SGML Tag list box 722 of FIG. 12B. AssignAttribute 954 of FIG. 18A(3) gets source SGML Tags 1014, with a YES message 1014 if getting the first element, from SGMLSymbolTable 884 through a function call GetFirstElement 1014, or, one by one, gets a source SGML Tag 1018, with a YES message 1018, through a call GetNextElement 1018 if it is not the first element. AssignAttribute 954 verifies that the source SGML Tag 1014 has an attribute by checking with the SGMLSymbolTable 884 through a function call elementHasAttribute 1016 to obtain a YES 1016 response, for the first element if it has attributes. If it is not the first element, AssignAttribute 954 verifies that the source SGML Tags 1018 have attributes by checking with the SGMLSymbolTable 884 through a function call elementHasAttribute 1020 to obtain a YES 1020 response. The MapEditDialog 950 of FIG. 18A(1) gets all attributes SGMLAttribute 1022, one SGMLAttribute 1022 at a time, with a YES message 1022, of the previously assigned source SGML tag from AssignAttribute 954 through a function call getNextSourceSGMLAttribute 1022 and displays the attributes in the source SGML Tag Attribute list box 724 in FIG. 12B. AssignAttribute 954 of FIG. 18A(3) gets SGML attributes 1024, and a YES message 1024, from SGMLSymbolTable 884 by sending an SGML tag 1024 through a function call getFirstAttributeOfElement 1024 if it is the first attribute of the element, or it gets SGMLAttributes 1026, one SGMLAttribute 1026 at a time, along with a YES message 1026, from SGMLSymbolTable 884 through a function call getNextAttribute 1026. The user selects an SGML tag from the Source SGML Tag list box 722 of FIG. 12B by double clicking the mouse on the SGML tag. The current implementation supports selection by double clicking the mouse on the selection. However, any alternative selection technique can be used, such as highlighting the selection and pressing the Enter or Return key. MapEditDialog 950 of FIG. 18C(1) sends a selected source SGMLTag 1110 to AssignAttribute 954 through a function call selectedSourceSGMLTag 1110. Then MapEditDialog 950 of FIG. 18A(1) gets all SGMLAttributes 1022 of the selected source SGMLTag 1110, one SGMLAttribute 1022 at a time, along with a YES message 1022, from AssignAttribute 954 through a function call getNextSourceSGMLAttribute 1022 and displays them in the SGML Tag Attribute list box 724 of FIG. 12B. AssignAttribute 954 of FIG. 18A(3) gets the SGMLAttributes 1024, along with a YES message 1024, from SGMLSymbolTable 884 through a function call getFirstAttributeOfElement 1024 if it is requesting the first attribute, or AssignAttribute 954 gets the SGMLAttributes 1026, one SGMLAttribute 1026 at a time, along with a YES message 1026, from SGMLSymbolTable 884 through a function call getNextAttribute 1026 if it is not the first attribute.

The user selects an SGML attribute from the source SGML Attribute list box 724 of FIG. 12B by double clicking the mouse on the SGML attribute. MapEditDialog 950 of FIG. 18C(1) sends a selected source SGMLAttribute 1112 to AssignAttribute 954 through a function call selectedSourceSGMLAttribute 1112. The user selects the Assign button 736 of FIG. 12B. MapEditDialog 950 lets AssignAttribute 954 know that an SGML attribute was assigned to the HTML attribute through a function call assignedSGMLAttribute 1114 of FIG. 18C(1). AssignAttribute 954 of FIG. 18C(3) sends, for the HTML attribute that is being assigned, an HTMLAttribute 1116, a source SGMLTag 1116, and the source SGMLAttribute 1116 to MapCreateEditService 792 through a function call assignHTMLAttributeWithSGMLAttribute 1116.

If SGML content was assigned to the HTML attribute, then the SGML Content radio button 728 of FIG. 12B is depressed. The MapEditDialog box 950 of FIG. 18B(1) gets a content SGMLTag 1048 assigned to the HTML attribute from AssignAttribute 954 through a function call getContentSGMLTag 1048, along with a YES message 1048, and displays it in the Source SGML Tag list box 722 of FIG. 12B. The MapEditDialog box 950 gets all the content SGMLTags 1052, one SGMLTag 1052 at a time, which can be assigned to the HTML attribute, along with a YES message 1052, from AssignAttribute 954 through a function call getNextContentSGMLTag 1052 and displays them in the Source SGML Tag list box 722 of FIG. 12B. AssignAttribute 954 of FIG. 18B(3) gets content SGMLTags 1054, along with a YES message 1054, from SGMLSymbolTable 884 through a function call getFirstPrimitiveElement 1054 if it is the first SGML tag requested, or AssignAttribute 954 gets content SGMLTags 1056, one SGMLTag 1056 at a time, along with a YES message 1056, from SGMLSymbolTable 884 through a function call getNextPrimitiveElement 1056.

The user selects the content SGML tag from the Source SGML Tag list box 722 of FIG. 12B by double clicking the mouse on the SGML tag. MapEditDialog 950 of FIG. 18B(1) sends the selected content SGMLTag 1058 to AssignAttribute 954 through a function call selectedContentSGMLTag 1058.

The user selects the Assign button 736 of FIG. 12B. MapEditDialog 950 of FIG. 18B(1) lets AssignAttribute 954 know that an SGML content was assigned to the HTML attribute through a function call assignSGMLContent 1060. AssignAttribute 954 of FIG. 18B(3) sends an HTMLAttribute 1062 that is being assigned the SGML content and a content SGMLTag 1062 to MapCreateEditService 792 through a function call assignHTMLAttributeWithSGMLContent 1062.

If System was assigned to the HTML attribute, the System radio button 730 of FIG. 12B is depressed. MapEditDialog 950 takes no further action. The user selects the Assign button 736 of FIG. 12B. MapEditDialog 950 of FIG. 18B(1) lets AssignAttribute 954 know that a system value was assigned to the HTMLAttribute through a function call assignSystem 1049. AssignAttribute 954 of FIG. 18B(3)

sends the HTMLAttribute 1051 that is being assigned a system value to MapCreateEditService 792 through a function call assignHTMLAttributeWithSystem 1051.

If No Value was assigned to the HTML attribute, the No Value radio button 732 is depressed. MapEditDialog 950 will take no further action. The user selects the Assign button 736 of FIG. 12B. MapEditDialog 950 of FIG. 18C(1) lets AssignAttribute 954 know that no value is assigned to the HTML attribute through a function call assignNoValue 1102. AssignAttribute 954 of FIG. 18C(3) sends the HTMLAttributes 1104 to be assigned no value to MapCreateEditService 792 through a function call assignHTMLAttributeWithNoValue 1104.

If User Input was assigned to the HTML attribute, the User Input radio button 734 is depressed. MapEditDialog 950 of FIG. 18C(1) gets a UserInput 1100 from AssignAttribute 954 through a function call getUserInputData 1100 and then displays the information in the User Input text edit box 731 of FIG. 12B. The user enters data into the text edit box 731 of FIG. 12B. MapEditDialog 950 of FIG. 18C(1) sends a UserInputData 1106 to AssignAttribute 954 through a function call selectedUserInputData 1106. The user then selects the Assign button 736 of FIG. 12B. MapEditDialog 950 of FIG. 18C(1) lets AssignAttribute 954 know that a user input is to be assigned to the HTML attribute through the function assignUserInput 1108. AssignAttribute 954 of FIG. 18C(3) sends an HTMLAttribute 1109 that is being assigned a user input value, and the UserInputData 1109, to MapCreateEditService 792 through a function call assignHTMLAttributeWithUserInput 1109.

For any of the HTML attribute source types assigned to the HTML attribute, the user has options to change the source type of the HTML attribute. For example, if the No Value radio button 732 of FIG. 12B is depressed for a selected HTML attribute, the user has an option to change the source type of the HTML attribute by pressing any of the other radio buttons such as the User Input radio button 734 of FIG. 12B. Depending upon which radio button the user selects, the user will need to enter more information before the HTML attribute is assigned a value.

For the radio buttons SGML Attribute 726, SGML Content 728, and User Input 734, the user can change the input selection more than one time. For example, the user can change the user input in the text edit box 731 more than one time. As another example, the user can select one content SGML tag in the Source SGML Tag list box 722, and later decide to select another content SGML tag. The most recent value given by the user is the value assigned to the HTML attribute when the Assign button 736 is selected.

The user repeats selection of an attribute to assign it a value, selecting a radio button for an HTML attribute source type, assigning a value to the HTML attribute, and selecting the Assign button 736 of FIG. 12B until the user has assigned all the HTML attributes desired. The user then selects the Assign Done button 740 of FIG. 12B. MapEditDialog 950 of FIG. 18B(1) lets MapCreateEditService 792 know that it is done assigning values to the attributes through a function call assignDoneSelected 1064 to AssignAttribute 954, which sends a call assignDoneSelected 1066 to MapCreateEditService 792 of FIG. 18B(3).

The user repeats adding more HTML tags to the Current HTML Tag list box 704 of FIG. 12B at will. At any time the user can clear the Current HTML Tag list box 704 or delete HTML tags from the Current HTML Tag list box 704 by selecting the Clear HTML button 708 or the Delete HTML button 710 of FIG. 12B. Once the user has completed mapping one SGML tag, the user selects the Map SGML Tag button 714. MapEditDialog 950 of FIG. 18B(1) informs MapTag 952 that the user has completed mapping the selected SGML tag through a function call doneMappingSGMLTag 1068. MapTag 952 of FIG. 18B(2) informs MapCreateEditService 792 that the user has completed mapping the selected SGML tag through the function finishOneMapping 1070. MapEditDialog 950 of FIG. 18B(1) requests a next SGMLTag 1072 for mapping from MapTag 952, along with a YES message 1072, using a function call getNextSGMLTag 1072 and displays the SGMLTag 1072 in the SGML Tag list box 702 of FIG. 12B. MapTag 952 of FIG. 18B(2) then obtains a next SGMLTag 1074, along with a YES message 1074, from SGMLSymbolTable 884 using a function call getNextElement 1074. MapTag 952 then returns the SGMLTag 1072 to MapEditDialog 950 of FIG. 18B(1) in response to the function call getNextSGMLTag 1072.

The user repeats processing the map for all the SGML tags the user wants to map. When the user is finished with the map editor, the user selects the Done button 716 of FIG. 12B. MapEditDialog 950 of FIG. 18B(1) informs MapTag 952 that it is done mapping through a function call doneMapping 1076. MapTag 952 of FIG. 18B(2) informs MapCreateEditService 792 that the mapping of the SGML tags is completed through a function call finishCreatingMap 1078.

Figure 19:
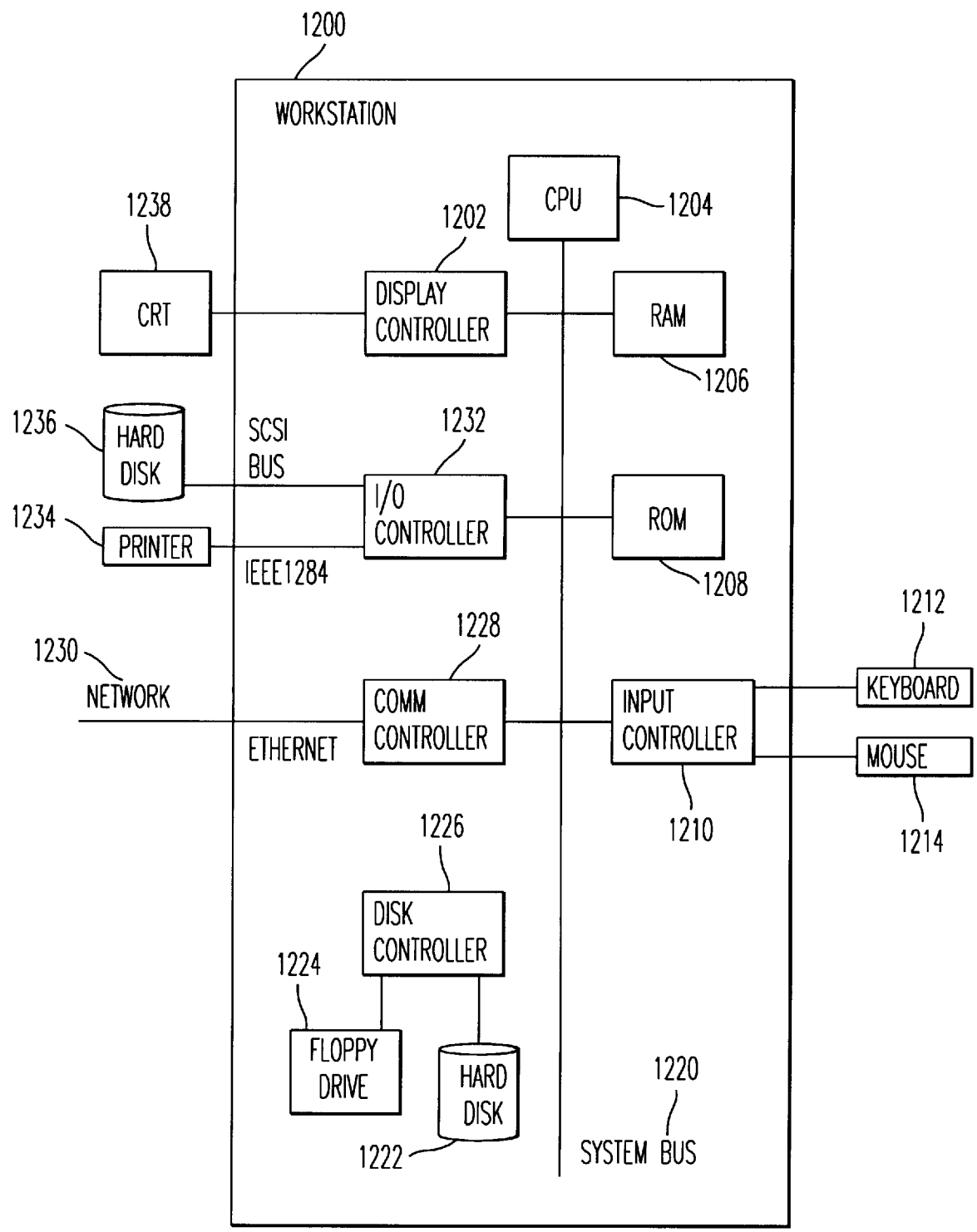
FIG. 19 illustrates a hardware configuration for implementation of the SGML to HTML mapping and transformation.

FIG. 19 illustrates an exemplary hardware configuration upon which the invention may be implemented. A Workstation 1200 has component parts a Display Controller 1202, a Central Processing Unit ("CPU") 1204, a Random Access Memory ("RAM") 1206, a Read Only Memory ("ROM") 1208, an Input Controller 1210, connected to a Keyboard 1212 and a Mouse 1214, a System Bus 1220, a Hard Disk 1222 and a Floppy Drive 1224 connected to a Disk Controller 1226, a Comm Controller 1228 connected to a Network 1230, and an Input/Output ("I/O") Controller 1232 connected to a Hard Disk 1236 and a Printer 1234, and a Cathode Ray Tube ("CRT") 1238 connected to the Display Controller 1202. The System Bus 1220 connects the CPU 1204, the RAM 1206, the ROM 1208, the Input Controller 1210, the Disk Controller 1226, the Comm Controller 1228, the I/O Controller 1232, and the Display Controller 1202 for transmitting data over the connection line.

For example, the computer code generated for execution is loaded into the RAM 1206 for execution by the CPU 1204, using the System Bus 1220, with input files stored on the Hard Disk 1236, with other input coming from the Keyboard 1212 and the Mouse 1214 through the Input Controller 1210, and from the Hard Disk 1222 and the Floppy Drive 1224, through the Disk Controller 1226, onto the System Bus 1220. The System Bus 1220 interacts with the ROM 1208, the Network 1230, and the Comm Controller 1228. The GUI of the system can be displayed on the CRT 1238 through the Display Controller 1202, and on output to the Printer 1234 or to the Hard Disk 1236 through the I/O Controller 1232.

Other implementations of the map creator and editor for transforming a first structured information format to a second structured information format are possible using the procedures described previously for FIGS. 1A–19. For example, variable names in a first database format may be mapped to variable names in a second database format. Another exemplary implementation is a mapping of public identifiers in an ISO/IEC 9070 format to file names in a UNIX file system format.

For other implementations, the same techniques described with regard to the SGML to HTML mapping and transformation are utilized, with structure of information defined differently from an SGML DTD. In general terms, a parser breaks down an input source file into source components and their structure, based upon a structure format specified for the input source file, for map creating and editing. The source components and their structure are presented to the user for interactive selection of components of the first structure, with candidate target components of the second structure presented to the user for selection of target components for the mapping of the source components for creation of rules for a transformation map. An exemplary implementation of a mapping of public identifiers in an ISO/IEC 9070 format to file names in a UNIX file system format is discussed below with regard to FIGS. 20A–20H.

FIG. 20A illustrates a public identifier 1400 in ISO/IEC 9070 standard format. An owner name is made up of a registered owner name and an unregistered owner name. For this example, the owner name is 'XYZ'. The public identifier further has an object name, separated from the owner name by '//'. For this example, the object name is 'font::metric::x-offset::622'.

Mapping one system structure to another system structure involves transformation of strings in one allowable character set to strings of another allowable character set. For example, computer programming languages are defined as having an alphabet of acceptable characters for forming valid variable names. A first programming language may be defined as allowing the '-' (hyphen) character to be embedded in a valid variable name, but not the '' (underscore) character. A second programming language may be defined as allowing the '' character, but not the '-' character. A mapping of valid variable names of the first programming language to valid variable names of the second programming language would involve mapping occurrences of '-' to a different character, such as '', which is acceptable in the second programming language environment.

In the example of mapping the ISO/IEC 9070 naming scheme to the UNIX file name scheme, the separator '//' is allowed in ISO/IEC 9070, but is not a valid character sequence in the UNIX file system naming conventions. A user wishing to map valid ISO/IEC 9070 names to valid UNIX file names needs to transform every occurrence of the separator '//' into a valid UNIX file name character string.

FIG. 20B illustrates an exemplary mapping of an ISO/IEC 9070 public identifier to a UNIX file name format. The exemplary mapping maps the structured public identifier to a flat UNIX file name. Lines 1420, 1422, 1424, and 1426 illustrate rules to map component name strings to identical strings in the UNIX format. Line 1428 illustrates a rule to map an ISO/IEC 9070 owner name component separator '::', which is not widely used, to the character '', which is a valid UNIX character. Line 1430 illustrates a rule to map an ISO/IEC 9070 owner name, object name component separator '//', which is not a valid string in the UNIX file format, to '' (two underscore characters).

FIG. 20C illustrates an exemplary UNIX file name 1440 resulting from mapping the exemplary ISO/IEC 9070 name of FIG. 20A through the mapping of FIG. 20B. Ownername 'XYZ' of line 1400 of FIG. 20A is mapped to 'XYZ' using the rule of line 1420 of FIG. 20B. The '//' is mapped to '' using the rule of line 1430 of FIG. 20B. The three substrings '::' in the object name of public identifier 1400 of FIG. 20A are each mapped to a character '' using the rule 1428 of FIG. 20B.

Figure 20D:
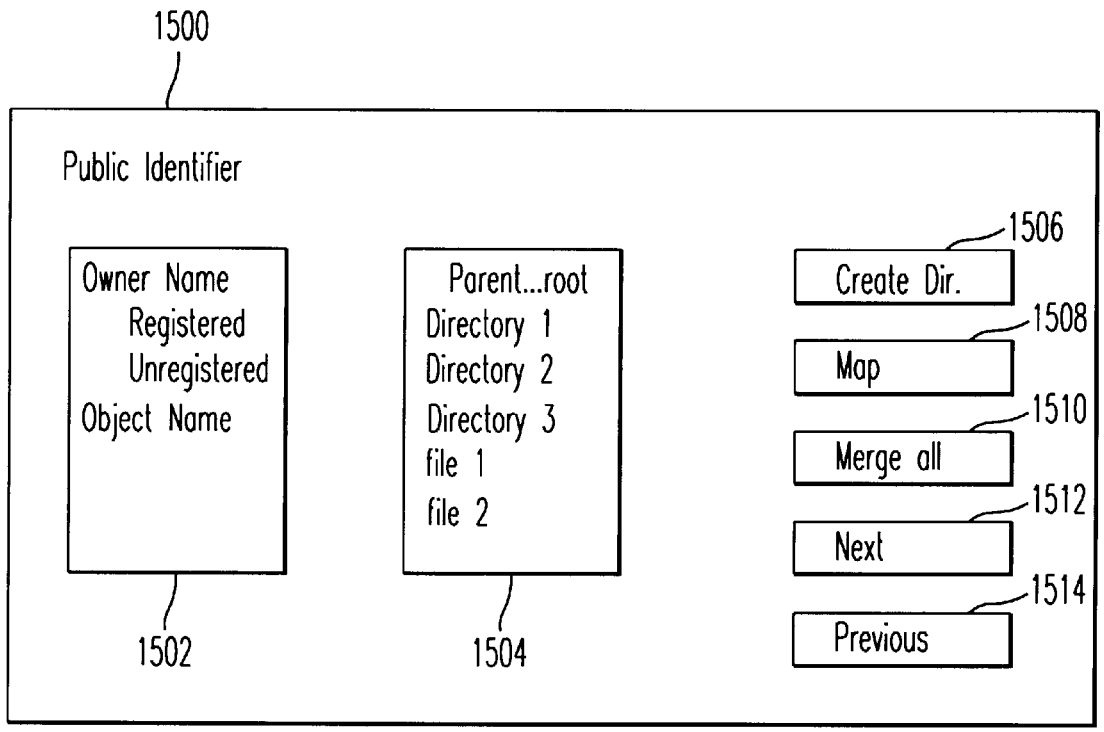
FIG. 20D illustrates an exemplary user interface display for mapping a public identifier in ISO/IEC 9070 format to a UNIX file name format.

FIG. 20D illustrates an exemplary user interface for mapping a public identifier 1502 of ISO/IEC 9070 to a UNIX file system format 1504. A map editor and creator 1500 maps names in the ISO/IEC 9070 convention to names in the UNIX file system convention. An exemplary mapping starts with system display 1502 of public identifier components and a display of valid UNIX file name components 1504. The public identifier components 1502 are registered owner name, unregistered owner name, and object name. A user selects one of these options. If owner name is selected, then the user is asked to select from prefix and owner-name components 1522 in FIG. 20E. User options presented are a create directory 1506, a map 1508, a merge all 1510, a next 1512, and a previous 1514. The create directory 1506 option allows the user to create a new directory name in the UNIX file system window 1504. The map option 1508 allows the user to request that a map be created at the time of request. The merge all 1510 option allows the user to create a UNIX file name 1504 by merging all the components of the public identifier name 1502 into a flat file name 1504. The next 1512 option allows the user to step to a next screen. The previous 1514 option allows the user to back up to the previous screen.

Figure 20E:
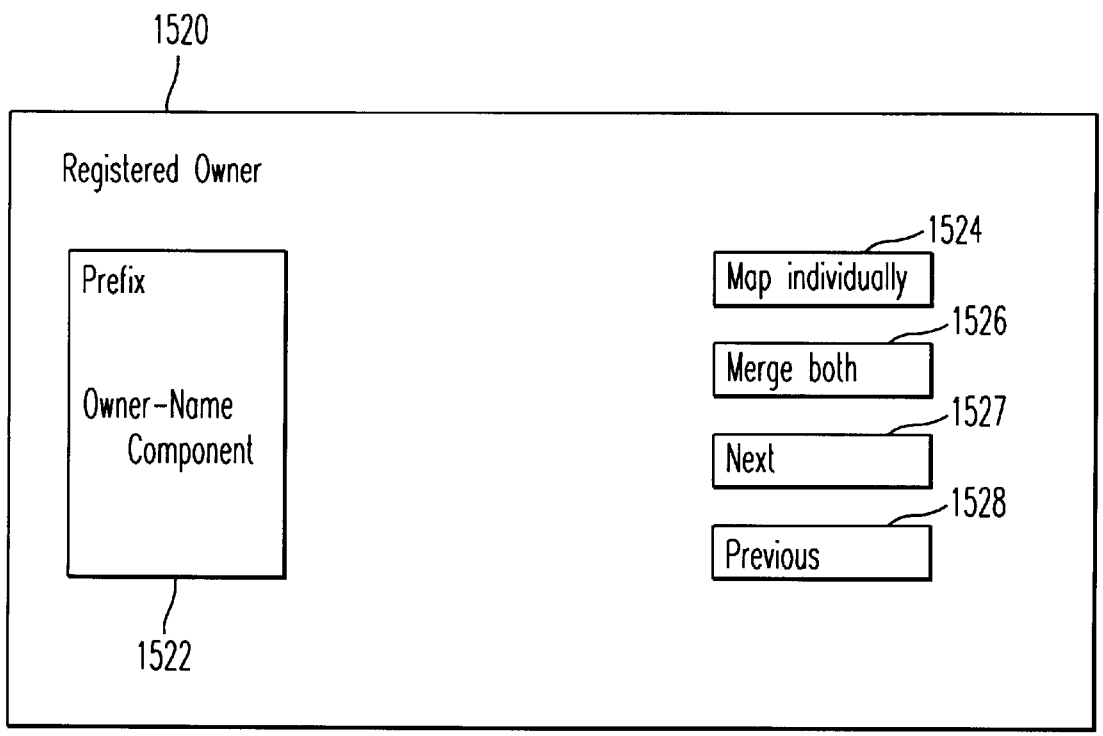
FIG. 20E illustrates an exemplary user interface display for mapping a registered owner field in ISO/IEC 9070 format to a UNIX file name format.

FIG. 20E illustrates an exemplary user interface 1520 for a registered owner 1522 component of the ISO/IEC 9070 public identifier 1502 of FIG. 20D. User interface 1520 options presented are a window 1522 showing a prefix and an owner-name component. User options are a map individually 1524, a merge both 1526, a next 1527, and a previous 1528. The map individually 1524 option allows the user to map individual components of the ISO/IEC 9070 name 1522 to individual components of the UNIX file system scheme 1504 of FIG. 20D. The merge both 1526 option allows the user to merge components of the registered owner name 1522 into one flat UNIX file name or directory name. The next 1527 option allows the user to step to a next screen. The previous 1528 option allows the user to back up to the previous screen.

Figure 20F:
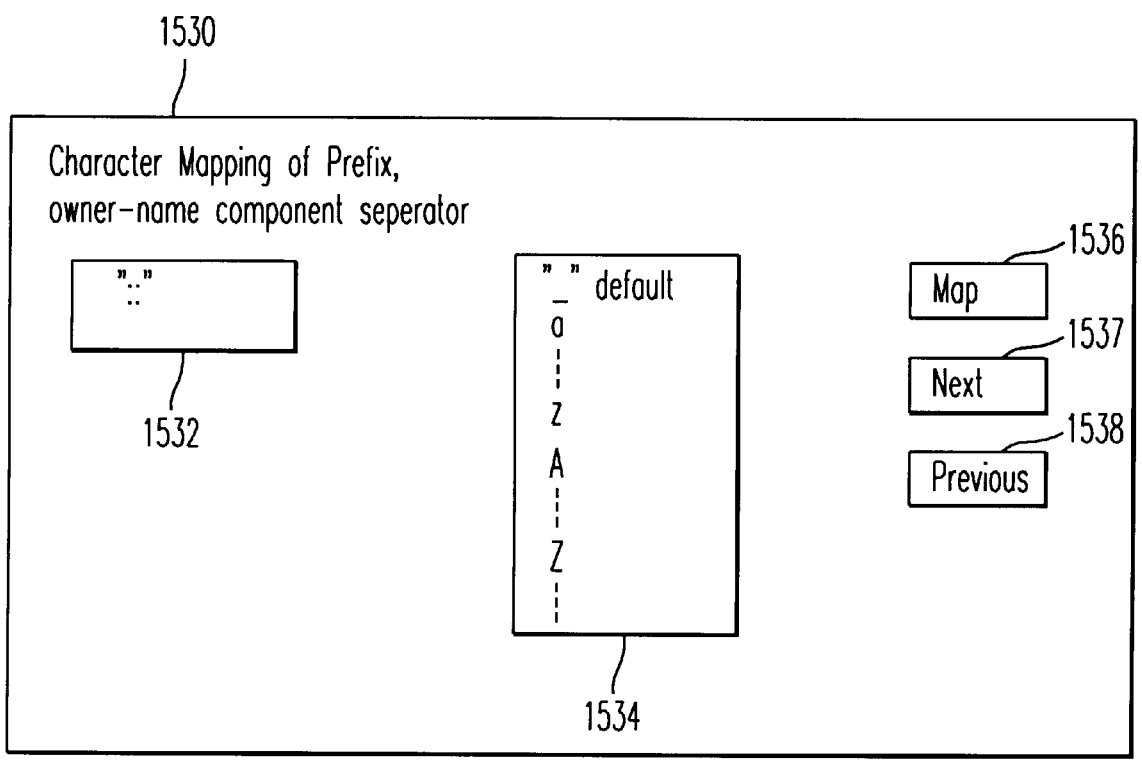
FIG. 20F illustrates an exemplary user interface for selections for a character mapping of a prefix, owner-name component separator in ISO/IEC 9070 format to the UNIX file name format.

FIG. 20F illustrates an exemplary user interface 1530 for mapping the prefix, owner name component separator to the UNIX legal character set format 1534. The registered owner component has a prefix and an owner-name component separator "::" 1532 which is not a widely used character string in the UNIX environment. The user is allowed to map the '::' separator 1532 to any of the valid characters in the UNIX file system character set 1534, with a mapping to '' as a default mapping. User options are a map 1536, a next 1537, and a previous 1538. The map 1536 option allows the user to select creating a map, with the assumption that the user has finished selecting options for creation of the map. The next 1537 option allows the user to step to a next screen. The previous 1538 option allows the user to back up to the previous screen.

Figure 20G:
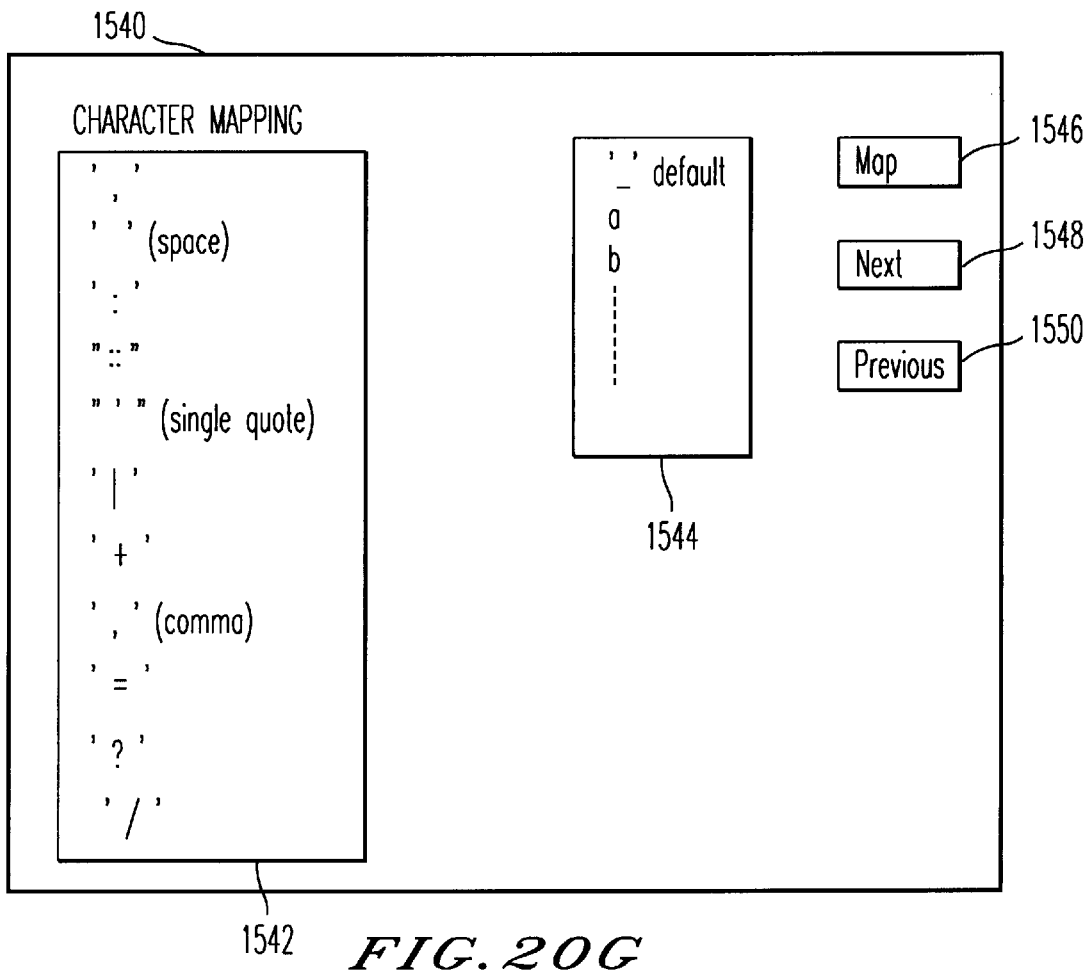
FIG. 20G illustrates an exemplary user interface for mapping an owner name character in ISO/IEC 9070 format to valid characters of the UNIX file name format.

FIG. 20G illustrates an exemplary user interface 1540 for mapping an owner name character 1542 to valid characters 1544 of the UNIX file system format. The user is given the options of mapping special characters 1542 which are valid in the ISO/IEC 9070 scheme to characters which are valid in the UNIX file system scheme 1544. A mapping of a character in the ISO/IEC 9070 scheme 1542 is set to '' as a default mapping. The user is given options of a map 1546, a next 1548, and a previous 1550. The map 1546 option allows the user to select creating a map, with the assumption that the user has finished selecting options for creation of the map. The next 1548 option allows the user to step to a next screen. The previous 1550 option allows the user to back up to the previous screen.

Figure 20H:
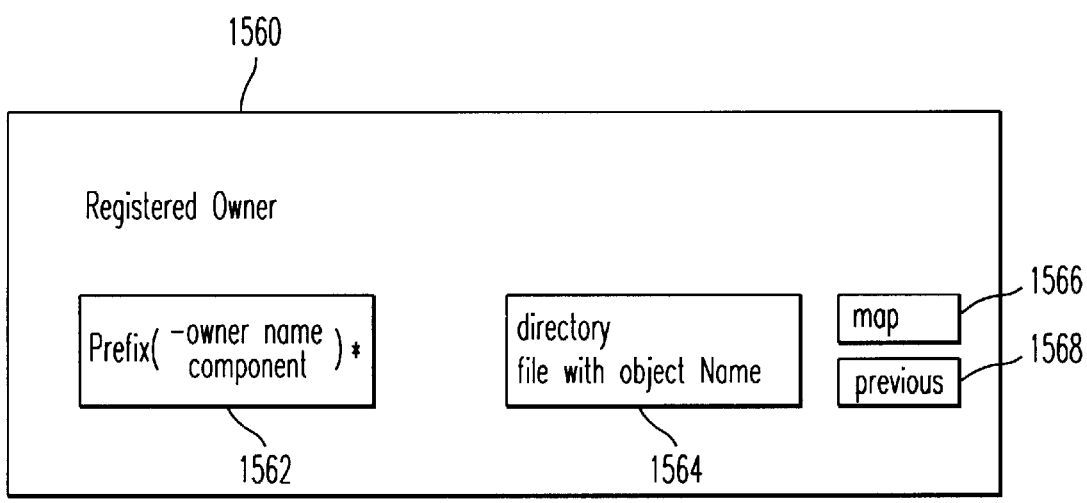
FIG. 20H illustrates an exemplary user interface for a user to map a registered owner component in ISO/IEC 9070 format to a UNIX file name format.

FIG. 20H illustrates an exemplary user interface 1560 for the user to map a registered owner component 1562 to a UNIX file scheme format 1564. The user is allowed to select a prefix component of the registered owner name or an owner name component other than prefix 1562. The user is allowed to select a directory option in the UNIX scheme 1564. The user is also allowed to select a file with object name option in the UNIX file scheme 1564. The user is given an option of a map 1566 for creating the map with the options currently selected. The user is also given an option of a previous 1568 to back up to the previous screen.

The present invention has been described using an exemplary implementation of a mapping creator and editor for an SGML to HTML transformer with user interaction for creation and editing of the map, and an exemplary mapping creator and editor for an ISO/IEC 9070 to a UNIX file format transformer. The example shown in this disclosure uses OOP and Windows GUI techniques to implement the user interface, map processing, and transformation. However, the user interface can be implemented using text line queries or menus. Programming methodologies other than OOP can be used for implementing the processing. References to storage areas can be made by techniques other than using pointers.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMS, EPROMs, EEPROMS, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise then as specifically described herein.

Appendix A

2<!doctype test [
4<!element test - o (front, section+)
6<!element front - o (title, author, keywords?)>
8<!element title - o (#PCDATA)>
10<!element author - o (frame, surname, title?)>
12<!element (fname, surname) - o (#PCDATA)>
14<!element keywords - o (#PCDATA)>
16<!element section - o (number?, title?, para*, subsec1*)>
18<!element subsec1 - o (number?, title?, para*, subsec2*)>
20<!element subsec2 - o (number?, title?, para+)>
22<!element number - o (#PCDATA)>
24<!element para - o (#PCDATA)>
26]>

Appendix B

30 Mapping
32 Front→Null
34 Title→H3
36 Author→Null
38 Frame→P
40 Surname→P
42 Keywords→P
44 Section→Null
46 Number→P strong
48 Para→P
50 Subsec 1→Null
52 Subsec 2→Null Appendix C 60<test>
62<front>
64<title>
66 Test mapping
68</title>
70<author>
72<fname>
74 Tester>
76</fname>
78<surname>
80 Giver
82</surname>
84</author>
86<keywords>
88 Mapping
90>/keywords>
92</front>
94<section>
96<number>
98 1
100</number>
102<title>
104 First Major Section
106</title>
108<para>
110 The first major section para.
112</para>
114<subsec1>
116<number>
118<1.1
120</number>
122<title>
124 Subsection 1.1
126</title>
128<para>
130 This is a para in the subsec1.1
132</para>
134</subsec1>
136<subsec1>
138<number>
140 1.2
142</number>
144<title>
146 Subsection 1.2

148</title>
150<para>
152 This is a subsection 1.2
154</para>
156</subsec1>
158</section>
160<section>
162<number>
164 2
166</number>
168<title>
170 Second Major Section
172 </title>
174<para>
176 The second major section para.
178</para>
180<subsec1>
182<number>
184 2.1
186</number>
188<title>
190 Subsection 2.1
192</title>
194<para>
196 This is a para in the subsec 2.1
198</para>
200</subsec1>
202<subsec1>
204<number>
206<2.2
208</number>
210<title>
212 Subsection 2.2
214</title>
216<para>
218 This is a subsection 2.2
220</para>
222</subsec1>
224</section>
226</test>

Appendix D

250<!DOCTYPE HTML PUBLIC "-//IETF//DTD HTML//EN">
252<html>
254<head>
256<meta http-equiv="Content-Type"
258 content="text/html; charset=iso-8859-1">
260<meta name="GENERATOR"content="Microsoft FrontPage 2.0">
262<title>test</title>
264</head>
266<body bgcolor="#FFFFFF">
268<h3>Test mapping</h3>
270<p>Tester</p>
272<p>Giver</p>
274<p>Mapping</p>
276<p><strong>1</strong></p>
278<h3>First Major Section</h3>
280<p>The first major section para.</p>
282<p><strong>1.1</strong></p>
284<h3>Subsection 1.1</h3>
286<p>This is a para in the subsec1.1</p>
288<p><strong>1.2</strong></p>
290<h3>Subsection 1.2</h3>
292<p>This is a subsection 1.2</p>
294<p><strong>2</strong></p>
296<h3>Second Major Section</h3>
298<p>The second major section para.</p>
300<p><strong>2.1</strong></p>
302<h3>Subsection 2.1</h3>
304<p>This is a para in the subsec 2.1</p>
306<p><strong>2.2</strong></p>
308<h3>Subsection 2.2</h3>
310<p>This is a subsection 2.2</p>
312</body>
314</html>

What is claimed as new and desired to be secured by Letters Patent of the United States is:

1. A computer implemented method to provide a graphical user interface for creating a mapping of a first structural description to a second structural description, comprising the steps of:

displaying an element for transformation of a first structural description;

displaying a list of candidate elements of a second structural description;

inputting, from a user, a first selection of one of the candidate elements of the second structural description which defines a correspondence between the element for transformation of the first structural description and the first selection of one of the candidate elements of the second structural description for a transformation of the element of the first structural description to the second structural description; and storing the correspondence between the element for transformation of the first structural description and the first selection of one of the candidate elements of the second structural description as a rule.

2. A method according to claim 1, wherein the first structural description includes an ISO/IEC 9070 public identifier naming format, the second structural description includes an operating system file name format, and the step of displaying the element for transformation comprises:

displaying the element for transformation which includes an element of the ISO/IEC 9070 public identifier naming format; and the step of displaying the list of candidate elements comprises:

displaying the list of candidate elements which includes a list of operating system file name candidate elements.

3. A method according to claim 1, wherein the first structural description includes a first database variable name format, the second structural description includes a second database variable name format, and the step of displaying the element for transformation comprises:

displaying the element for transformation which includes an element of the first database variable name format; and the step of displaying the list of candidate elements comprises:

displaying the list of candidate elements which includes a list of second database variable name format candidate elements.

4. A method according to claim 1, further comprising the steps of:
   obtaining the stored rule;
   displaying the element for transformation of the first structural description;
   displaying the first selected element of the second structural description which defines a correspondence between the element for transformation of the first structural description and the first selection of one of the candidate elements of the second structural description for a transformation of the element of the first structural description to the second structural description;
   displaying the list of candidate elements of the second structural description;
   inputting, from the user, a second selection of one of the candidate elements of the second structural description which defines a correspondence between the element for transformation of the first structural description and the second selection of one of the candidate elements of the second structural description for a transformation of the element of the first structural description to the second structural description; and
   storing the correspondence between the element for transformation of the first structural description and the second selection of one of the candidate elements of the second structural description as a rule.

5. A method according to claim 1, further comprising the steps of:
   displaying an icon for the user to input a request to clear the first selection which is being displayed;
   inputting the request to clear the first selection which is being displayed, when the user inputs the request to clear the first selection which is being displayed; and
   clearing the first selection which is being displayed, when the user inputs the request to clear the first selection which is being displayed.

6. A method according to claim 1, wherein the first structural description includes a first markup language, the second structural description includes a second markup language, and the step of displaying the element for transformation comprises:
   displaying the element for transformation which includes an element of the first markup language; and
   the step of displaying the list of candidate elements comprises:
      displaying the list of candidate elements which includes a list of second markup language candidate elements.

7. A method according to claim 6, wherein the first markup language includes a Standard Generalized Markup Language ("SGML"), the second markup language includes a HyperText Markup Language ("HTML"), and the step of displaying the element for transformation comprises:
   displaying the element for transformation which includes an element of SGML; and
   the step of displaying the list of candidate elements comprises:
      displaying the list of candidate elements which includes a list of HTML candidate elements.

8. A method according to claim 1, wherein the storing step comprises:
   storing the correspondence between the element for transformation of the first structural description and the first selection of one of the candidate elements of the second structural description as a rule in a list of rules for transformation.

9. A method according to claim 8, further comprising the steps of:
   displaying a second element for transformation of the first structural description;
   displaying a list of candidate elements of the second structural description;
   inputting, from the user, a second selection of one of the candidate elements of the second structural description which defines a correspondence between the second element for transformation of the first structural description and the second selection of one of the candidate elements of the second structural description for a transformation of the second element of the first structural description to the second structural description; and
   storing the correspondence between the second element for transformation of the first structural description and the second selection of one of the candidate elements of the second structural description as a rule in a list of rules for transformation.

10. A method according to claim 8, wherein the inputting step further comprises:
   displaying an icon for the user to input a request to store the first selection correspondence as a rule in the list of rules for transformation; and
   the storing step further comprises:
      inputting the request to store the correspondence as a rule in the list of rules for transformation, when the user inputs the request to store the first selection as a rule; and
      displaying a second element for transformation of the first structural description, when the user inputs the request to store the first selection as a rule.

11. A method according to claim 8, wherein the inputting step further comprises:
   displaying an icon for the user to input a request to store the correspondence as a rule in the list of rules for transformation; and
   the storing step further comprises:
      inputting the request to store the correspondence as a rule in the list of rules for transformation, when the user inputs the request to store the first selection as a rule in the list of rules for transformation; and
      storing the list of rules for transformation as a map.

12. A method according to claim 8, further comprising the steps of:
   displaying an icon for the user to input a request to delete the list of rules for transformation;
   inputting the request to delete the list of rules for transformation, when the user inputs the request to delete the list of rules for transformation; and
   deleting the list of rules for transformation, when the user inputs a request to delete the list of rules for transformation.

13. A method according to claim 1, further comprising the steps of:
   displaying the first selection of one of the candidate elements of the second structural description which defines the correspondence between the element for transformation of the first structural description and the first selection of one of the candidate elements of the second structural description for a transformation of the element of the first structural description to the second structural description.

14. A method according to claim 13, wherein the inputting step comprises:

inputting, from the user, a first ordered list of a plurality of the candidate elements of the second structural description which defines a correspondence between the element for transformation of the first structural description and the first ordered list of the plurality of the candidate elements of the second structural description for a transformation of the element of the first structural description to the second structural description;

the step of displaying the first selection comprises:

displaying the first ordered list of the plurality of the candidate elements of the second structural description which defines a correspondence between the element for transformation of the first structural description and the first ordered list of the plurality of the candidate elements of the second structural description for a transformation of the element of the first structural description to the second structural description; and the storing step comprises:

storing the correspondence between the element for transformation of the first structural description and the first ordered list of the plurality of the candidate elements of the second structural description for a transformation of the element of the first structural description to the second structural description as a rule.

15. A method according to claim 14, further comprising the steps of:

obtaining the stored rule;

displaying the element for transformation of the first structural description;

displaying the first ordered list of elements of the second structural description which defines a correspondence between the element for transformation of the first structural description and the first ordered list of the plurality of the candidate elements of the second structural description for a transformation of the element of the first structural description to the second structural description;

displaying the list of candidate elements of the second structural description;

inputting, from the user, a second ordered list of a plurality of the candidate elements of the second structural description which defines a correspondence between the element for transformation of the first structural description and the second ordered list of the plurality of the candidate elements of the second structural description for a transformation of the element of the first structural description to the second structural description; and storing the correspondence between the element for transformation of the first structural description and the second ordered list of the plurality of the candidate elements of the second structural description for a transformation of the element of the first structural description to the second structural description as a rule.

16. A method according to claim 14, further comprising the steps of:

displaying an icon for the user to input a request to clear the first ordered list which is being displayed;

inputting the request to clear the first ordered list which is being displayed, when the user inputs the request to clear the first ordered list which is being displayed; and clearing the first ordered list which is being displayed, when the user inputs the request to clear the first ordered list which is being displayed.

17. A method according to claim 1, further comprising the steps of:

displaying an attribute of the first selection of one of the candidate elements of the second structural description which corresponds to a transformation of the element of the first structural description to the second structural description, for assignment of an attribute value of the second structural description;

displaying a plurality of icons representing sources for obtaining the attribute value to be assigned to the attribute of the first selection which is being displayed;

displaying the element of the first structural description;

displaying an attribute list of the element of the first structural description;

inputting a user input of a selection of sources for obtaining the attribute value to be assigned to the attribute of the first selection which is being displayed; and processing the user input of the selection of sources for obtaining the attribute value to be assigned to the attribute of the first selection which is being displayed, when the user inputs the selection of sources for obtaining the attribute value to be assigned to the attribute of the first selection which is being displayed.

18. A method according to claim 17, wherein the processing step further comprises:

assigning a null value to the attribute of the first selection which is being displayed, when the selection of sources which has been input by the user indicates no source is to be used.

19. A method according to claim 17, wherein the processing step further comprises:

assigning a system value to the attribute of the first selection which is being displayed, when the selection of sources which has been input by the user indicates a system value is to be used.

20. A method according to claim 17, wherein the processing step further comprises:

assigning a first structural description attribute value to the attribute of the first selection which is being displayed, when the selection of sources which has been input by the user indicates a first structural description attribute value source is to be used.

21. A method according to claim 17, wherein the processing step further comprises:

assigning a first structural description content value to the attribute of the first selection which is being displayed, when the selection of sources which has been input by the user indicates a first structural description content value source is to be used.

22. A method according to claim 17, wherein the processing step further comprises:

assigning a user input value to the attribute of the first selection which is being displayed, when the selection of sources which has been input by the user indicates a user input value source is to be used.

23. A method according to claim 22, wherein the assigning step comprises:

displaying a text input area for the user to input a value to be assigned;

inputting the value entered by the user in the text input area; and assigning the value input by the user to the attribute of the first selection which is being displayed.

24. A method according to claim 1, wherein the step of displaying a list of candidate elements of a second structural description further comprises:

displaying a candidate for requesting removal of the first structural description element in the transformation; and displaying a candidate for requesting ignoring of the first structural description element in the transformation.

25. An apparatus for providing a graphical user interface for creating a mapping of a first structural description to a second structural description, comprising:

an element displaying means for displaying an element for transformation of a first structural description;

a list displaying means for displaying a list of candidate elements of a second structural description;

a user inputting means for inputting, from a user, a first selection of one of the candidate elements of the second structural description which defines a correspondence between the element for transformation of the first structural description and the first selection of one of the candidate elements of the second structural description for a transformation of the element of the first structural description to the second structural description; and a storing means for storing the correspondence between the element for transformation of the first structural description and the first selection of one of the candidate elements of the second structural description as a rule.

26. An apparatus according to claim 25, wherein the first structural description includes an ISO/IEC 9070 public identifier naming format, the second structural description includes an operating system file name format, and the element displaying means further comprises:

means for displaying the element for transformation which includes an element of the ISO/IEC 9070 public identifier naming format; and the list displaying means further comprises:

means for displaying the list of candidate elements which includes a list of operating system file name candidate elements.

27. An apparatus according to claim 25, wherein the first structural description includes a first database variable name format, the second structural description includes a second database variable name format, and the element displaying means further comprises:

means for displaying the element for transformation which includes an element of the first database variable name format; and the list displaying means further comprises:

means for displaying the list of candidate elements which includes a list of second database variable name format candidate elements.

28. An apparatus according to claim 25, further comprising:

means for obtaining the stored rule;

means for displaying the element for transformation of the first structural description;

means for displaying the first selected element of the second structural description which defines a correspondence between the element for transformation of the first structural description and the first selection of one of the candidate elements of the second structural description for a transformation of the element of the first structural description to the second structural description;

means for displaying the list of candidate elements of the second structural description;

means for inputting, from the user, a second selection of one of the candidate elements of the second structural description which defines a correspondence between the element for transformation of the first structural description and the second selection of one of the candidate elements of the second structural description for a transformation of the element of the first structural description to the second structural description; and means for storing the correspondence between the element for transformation of the first structural description and the second selection of one of the candidate elements of the second structural description as a rule.

29. An apparatus according to claim 25, further comprising:

means for displaying an icon for the user to input a request to clear the first selection which is being displayed;

means for inputting the request to clear the first selection which is being displayed, when the user inputs the request to clear the first selection which is being displayed; and means for clearing the first selection which is being displayed, when the user inputs the request to clear the first selection which is being displayed.

30. An apparatus according to claim 25, wherein the first structural description includes a first markup language, the second structural description includes a second markup language, and the element displaying means further comprises:

means for displaying the element for transformation which includes an element of the first markup language; and the list displaying means further comprises:

means for displaying the list of candidate elements which, includes a list of second markup language candidate elements.

31. An apparatus according to claim 30, wherein the first markup language includes an SGML, the second markup language includes an HTML, and the element displaying means further comprises:

means for displaying the element for transformation which includes an element of SGML; and the list displaying means comprises:

means for displaying the list of candidate elements which includes a list of HTML candidate elements.

32. An apparatus according to claim 25, wherein the storing means comprises:

means for storing the correspondence between the element for transformation of the first structural description and the first selection of one of the candidate elements of the second structural description as a rule in a list of rules for transformation.

33. An apparatus according to claim 32, further comprising:

means for displaying a second element for transformation of the first structural description;

means for displaying a list of candidate elements of the second structural description;

means for inputting, from the user, a second selection of one of the candidate elements of the second structural description which defines a correspondence between the second element for transformation of the first structural description and the second selection of one of the candidate elements of the second structural description for a transformation of the second element of the first structural description to the second structural description; and means for storing the correspondence between the second element for transformation of the first structural description and the second selection of one of the candidate elements of the second structural description as a rule in a list of rules for transformation.

34. An apparatus according to claim 32, further comprising:
means for displaying an icon for the user to input a request to store the first selection correspondence as a rule in the list of rules for transformation;
means for inputting the request to store the correspondence as a rule in the list of rules for transformation, when the user inputs the request to store the first selection as a rule; and
means for displaying a second element for transformation of the first structural description, when the user inputs the request to store the first selection as a rule.

35. An apparatus according to claim 32, further comprising:
means for displaying an icon for the user to input a request to store the correspondence as a rule in the list of rules for transformation;
means for inputting the request to store the correspondence as a rule in the list of rules for transformation, when the user inputs the request to store the first selection as a rule in the list of rules for transformation; and
means for storing the list of rules for transformation as a map.

36. An apparatus according to claim 32, further comprising:
means for displaying an icon for the user to input a request to delete the list of rules for transformation;
means for inputting the request to delete the list of rules for transformation, when the user inputs the request to delete the list of rules for transformation; and
means for deleting the list of rules for transformation, when the user inputs a request to delete the list of rules for transformation.

37. An apparatus according to claim 25, further comprising:
means for displaying the first selection of one of the candidate elements of the second structural description which defines the correspondence between the element for transformation of the first structural description and the first selection of one of the candidate elements of the second structural description for a transformation of the element of the first structural description to the second structural description.

38. An apparatus according to claim 37, wherein the user inputting means comprises:
means for inputting, from the user, a first ordered list of a plurality of the candidate elements of the second structural description which defines a correspondence between the element for transformation of the first structural description and the first ordered list of the plurality of the candidate elements of the second structural description for a transformation of the element of the first structural description to the second structural description;
the means for displaying the first selection comprises:
means for displaying the first ordered list of the plurality of the candidate elements of the second structural description which defines a correspondence between the element for transformation of the first structural description and the first ordered list of the plurality of the candidate elements of the second structural description for a transformation of the element of the first structural description to the second structural description; and
the storing means comprises:
means for storing the correspondence between the element for transformation of the first structural description and the first ordered list of the plurality of the candidate elements of the second structural description for a transformation of the element of the first structural description to the second structural description as a rule.

39. An apparatus according to claim 38, further comprising:
means for obtaining the stored rule;
means for displaying the element for transformation of the first structural description;
means for displaying the first ordered list of elements of the second structural description which defines a correspondence between the element for transformation of the first structural description and the first ordered list of the plurality of the candidate elements of the second structural description for a transformation of the element of the first structural description to the second structural description;
means for displaying the list of candidate elements of the second structural description;
means for inputting, from the user, a second ordered list of a plurality of the candidate elements of the second structural description which defines a correspondence between the element for transformation of the first structural description and the second ordered list of the plurality of the candidate elements of the second structural description for a transformation of the element of the first structural description to the second structural description; and
means for storing the correspondence between the element for transformation of the first structural description and the second ordered list of the plurality of the candidate elements of the second structural description for a transformation of the element of the first structural description to the second structural description as a rule.

40. An apparatus according to claim 38, further comprising:
means for displaying an icon for the user to input a request to clear the first ordered list which is being displayed;
means for inputting the request to clear the first ordered list which is being displayed, when the user inputs the request to clear the first ordered list which is being displayed; and
means for clearing the first ordered list which is being displayed, when the user inputs the request to clear the first ordered list which is being displayed.

41. An apparatus according to claim 25, further comprising:
means for displaying an attribute of the first selection of one of the candidate elements of the second structural description which corresponds to a transformation of the element of the first structural description to the second structural description, for assignment of an attribute value of the second structural description;
means for displaying a plurality of icons representing sources for obtaining the attribute value to be assigned to the attribute of the first selection which is being displayed;

means for displaying the element of the first structural description;

means for displaying an attribute list of the element of the first structural description;

means for inputting a user input of a selection of sources for obtaining the attribute value to be assigned to the attribute of the first selection which is being displayed; and an input processing means for processing the user input of the selection of sources for obtaining the attribute value to be assigned to the attribute of the first selection which is being displayed, when the user inputs the selection of sources for obtaining the attribute value to be assigned to the attribute of the first selection which is being displayed.

42. An apparatus according to claim 41, wherein the input processing means further comprises:

means for assigning a null value to the attribute of the first selection which is being displayed, when the selection of sources which has been input by the user indicates no source is to be used.

43. An apparatus according to claim 41, wherein the input processing means further comprises:

means for assigning a system value to the attribute of the first selection which is being displayed, when the selection of sources which has been input by the user indicates a system value is to be used.

44. An apparatus according to claim 41, wherein the input processing means further comprises:

means for assigning a first structural description attribute value to the attribute of the first selection which is being displayed, when the selection of sources which has been input by the user indicates a first structural description attribute value source is to be used.

45. An apparatus according to claim 41, wherein the input processing means further comprises:

an assigning means for assigning a first structural description content value to the attribute of the first selection which is being displayed, when the selection of sources which has been input by the user indicates a first structural description content value source is to be used.

46. An apparatus according to claim 41, wherein the input processing means further comprises:

means for assigning a user input value to the attribute of the first selection which is being displayed, when the selection of sources which has been input by the user indicates a user input value source is to be used.

47. An apparatus according to claim 46, wherein the assigning means comprises:

means for displaying a text input area for the user to input a value to be assigned;

means for inputting the value entered by the user in the text input area; and means for assigning the value input by the user to the attribute of the first selection which is being displayed.

48. An apparatus according to claim 25, wherein the list displaying means further comprises:

means for displaying a candidate for requesting removal of the element for transformation of the first structural description in the transformation; and means for displaying a candidate for requesting ignoring of the element for transformation of the first structural description in the transformation.

49. A computer program product including a computer readable medium for providing a graphical user interface for creating a mapping of a first structural description to a second structural description, comprising:

element displaying means for displaying an element for transformation of a first structural description;

list displaying means for displaying a list of candidate elements of a second structural description;

user inputting means for inputting, from a user, a first selection of one of the candidate elements of the second structural description which defines a correspondence between the element for transformation of the first structural description and the first selection of one of the candidate elements of the second structural description for a transformation of the element of the first structural description to the second structural description; and storing means for storing the correspondence between the element for transformation of the first structural description and the first selection of one of the candidate elements of the second structural description as a rule.

50. A computer program product according to claim 49, wherein the first structural description includes ISO/IEC 9070 public identifier format, the second structural description includes an operating system file name format, and the element displaying means comprises:

means for displaying the element for transformation which includes an element of the ISO/IEC 9070 public identifier format; and the list displaying means comprises:

means for displaying the list of candidate elements which includes a list of operating system file name candidate elements.

51. A computer program product according to claim 49, wherein the first structural description includes a first database variable name format, the second structural description includes a second database variable name format, and the element displaying means comprises:

means for displaying the element for transformation which includes an element of the first database variable name format; and the list displaying means comprises:

means for displaying the list of candidate elements which includes a list of second database variable name format candidate elements.

52. A computer program product according to claim 49, further comprising:

means for obtaining the stored rule;

means for displaying the element for transformation of the first structural description;

means for displaying the first selected element of the second structural description which defines a correspondence between the element for transformation of the first structural description and the first selection of one of the candidate elements of the second structural description for a transformation of the element of the first structural description to the second structural description;

means for displaying the list of candidate elements of the second structural description;

means for inputting, from the user, a second selection of one of the candidate elements of the second structural description which defines a correspondence between the element for transformation of the first structural description and the second selection of one of the candidate elements of the second structural description for a transformation of the element of the first structural description to the second structural description; and means for storing the correspondence between the element for transformation of the first structural description and the second selection of one of the candidate elements of the second structural description as a rule.

53. A computer program product according to claim 49, further comprising:

means for displaying an icon for the user to input a request to clear the first selection which is being displayed;

means for inputting the request to clear the first selection which is being displayed, when the user inputs the request to clear the first selection which is being displayed; and means for clearing the first selection which is being displayed, when the user inputs the request to clear the first selection which is being displayed.

54. A computer program product according to claim 49, wherein the first structural description includes a first markup language, the second structural description includes a second markup language, and the element displaying means comprises:

means for displaying the element for transformation which includes an element of the first markup language; and the list displaying means comprises:

means for displaying the list of candidate elements which includes a list of second markup language candidate elements.

55. A computer program product according to claim 54, wherein the first markup language includes SGML, the second markup language includes HTML, and the element displaying means further comprises:

means for displaying the element for transformation which includes an element of SGML; and the list displaying means further comprises:

means for displaying the list of candidate elements which includes a list of HTML candidate elements.

\* \* \* \* \*